US010468009B2

(12) United States Patent
Freear et al.

(10) Patent No.: US 10,468,009 B2
(45) Date of Patent: Nov. 5, 2019

(54) ULTRASOUND GENERATION

(71) Applicant: University of Leeds, Leeds, Yorkshire (GB)

(72) Inventors: Steven Freear, Manchester (GB); David Matthew Joseph Cowell, Guiseley (GB); Peter Raymond Smith, Newcastle-Upon-Tyne (GB)

(73) Assignee: The University of Leeds, Leeds (GB)

( * ) Notice: Subject to any disclaimer, the term of this patent is extended or adjusted under 35 U.S.C. 154(b) by 729 days.

(21) Appl. No.: 14/653,781

(22) PCT Filed: Dec. 13, 2013

(86) PCT No.: PCT/GB2013/053289

§ 371 (c)(1),
(2) Date: Jun. 18, 2015

(87) PCT Pub. No.: WO2014/096789

PCT Pub. Date: Jun. 26, 2014

(65) Prior Publication Data

US 2015/0348531 A1 Dec. 3, 2015

(30) Foreign Application Priority Data

Dec. 19, 2012 (GB) .................................. 1222882.1

(51) Int. Cl.

| | |
|---|---|
| ***G01K 11/18*** | (2006.01) |
| ***G10K 11/18*** | (2006.01) |
| ***B06B 1/02*** | (2006.01) |

(52) U.S. Cl.

CPC ............ *G10K 11/18* (2013.01); *B06B 1/0215* (2013.01); *B06B 2201/76* (2013.01)

(58) Field of Classification Search

CPC .... G10K 11/18; B06B 1/0215; B06B 2201/76

(Continued)

(56) References Cited

U.S. PATENT DOCUMENTS

| | | | |
|---|---|---|---|
| 5,625,539 | A | 4/1997 | Nakata et al. |
| 5,833,614 | A | 11/1998 | Dodd et al. |

(Continued)

FOREIGN PATENT DOCUMENTS

| | | | |
|---|---|---|---|
| CN | 101242171 | A | 8/2008 |
| EP | 1406096 | A1 | 4/2004 |

(Continued)

OTHER PUBLICATIONS

Search Report from the United Kingdom Intellectual Property Office for corresponding Great Britain Application No. GB1222882.1, dated Oct. 7, 2013, 3 pages.

(Continued)

*Primary Examiner* — Isam A Alsomiri
*Assistant Examiner* — Amie M Ndure
(74) *Attorney, Agent, or Firm* — Klarquist Sparkman, LLP

(57) ABSTRACT

An ultrasound generator having a signal generator; and to generate a pulsed drive signal from a modulating signal, the pulsed drive signal having at least a zero output level, a positive output level and a negative output level. The position and width of pulses are defined by at least first and second switching angles per half cycle of the modulating signal. In part of the range of the modulating signal one switching angle increases while the other switching angle decreases simultaneously such that the fundamental frequency of the pulsed drive signal increases or decreases with the modulating signal and such that a selected harmonic component of the generated pulsed drive signal is maintained below a first threshold. A transducer is arranged to generate ultrasound in response to the pulsed drive signal.

10 Claims, 22 Drawing Sheets

(58) Field of Classification Search
USPC .......................................................... 367/137
See application file for complete search history.

(56) References Cited

U.S. PATENT DOCUMENTS

| | | | | |
|---|---|---|---|---|
| 6,135,963 | A | 10/2000 | Haider | |
| 6,212,131 | B1 | 4/2001 | Oppelt et al. | |
| 6,432,055 | B1 | 8/2002 | Carp et al. | |
| 6,920,054 | B2 | 7/2005 | Florence et al. | |
| 7,022,074 | B2 | 4/2006 | Kristoffersen et al. | |
| 7,094,204 | B2 | 8/2006 | Bajanin et al. | |
| 8,147,409 | B2 * | 4/2012 | Shifrin | G01S 7/52046 600/407 |
| 2002/0005071 | A1 | 1/2002 | Song et al. | |
| 2002/0045818 | A1 | 4/2002 | Jeon | |
| 2002/0151798 | A1 | 10/2002 | Honda | |
| 2003/0209893 | A1 * | 11/2003 | Breed | B60J 10/00 280/735 |
| 2004/0039283 | A1 | 2/2004 | Banjanin et al. | |
| 2004/0113669 | A1 | 6/2004 | Wodnicki | |
| 2004/0130442 | A1 * | 7/2004 | Breed | B60C 11/24 340/443 |
| 2004/0254459 | A1 | 12/2004 | Kristoffersen et al. | |
| 2004/0254461 | A1 | 12/2004 | Ackerman, III | |
| 2004/0267119 | A1 | 12/2004 | Adams | |
| 2005/0007879 | A1 * | 1/2005 | Nishida | G01S 7/524 367/99 |
| 2005/0046584 | A1 * | 3/2005 | Breed | B60C 11/24 340/13.31 |
| 2005/0131607 | A1 * | 6/2005 | Breed | B60N 2/002 701/45 |
| 2005/0171431 | A1 | 8/2005 | Petersen | |
| 2005/0243650 | A1 | 11/2005 | Petersen et al. | |
| 2005/0261610 | A1 | 11/2005 | Mast et al. | |
| 2005/0273218 | A1 * | 12/2005 | Breed | B60C 11/24 701/2 |
| 2006/0025897 | A1 * | 2/2006 | Shostak | B60C 23/005 701/1 |
| 2006/0144173 | A1 | 7/2006 | Taghezout | |
| 2006/0180371 | A1 * | 8/2006 | Breed | G07C 5/008 180/197 |
| 2006/0264747 | A1 | 11/2006 | Freeman et al. | |
| 2006/0293595 | A1 | 12/2006 | Clark et al. | |
| 2007/0014190 | A1 | 1/2007 | Fehl et al. | |
| 2007/0193811 | A1 * | 8/2007 | Breed | B60R 21/01536 180/271 |
| 2007/0205881 | A1 * | 9/2007 | Breed | B60C 23/0433 340/447 |
| 2007/0262574 | A1 * | 11/2007 | Breed | B60R 1/00 280/735 |
| 2007/0271014 | A1 * | 11/2007 | Breed | B60J 10/00 701/31.9 |
| 2008/0008471 | A1 * | 1/2008 | Dress | G06E 3/006 398/66 |
| 2008/0036187 | A1 * | 2/2008 | Breed | B60R 21/01516 280/735 |
| 2008/0036580 | A1 * | 2/2008 | Breed | B60R 21/01536 340/438 |
| 2008/0065290 | A1 * | 3/2008 | Breed | G01L 17/00 701/31.4 |
| 2008/0086240 | A1 * | 4/2008 | Breed | G07C 5/008 701/1 |
| 2008/0119421 | A1 * | 5/2008 | Tuszynski | A61K 31/195 514/34 |
| 2008/0140278 | A1 * | 6/2008 | Breed | G07C 5/008 701/31.4 |
| 2008/0144944 | A1 * | 6/2008 | Breed | G06K 9/00832 382/224 |
| 2008/0156406 | A1 * | 7/2008 | Breed | B60C 23/041 152/415 |
| 2008/0157510 | A1 * | 7/2008 | Breed | B60N 2/002 280/735 |
| 2008/0200809 | A1 | 8/2008 | Shifrin | |
| 2008/0216567 | A1 * | 9/2008 | Breed | B60C 11/24 73/146.5 |
| 2008/0236275 | A1 * | 10/2008 | Breed | B60C 11/24 73/290 V |
| 2008/0242987 | A1 * | 10/2008 | Shifrin | G01S 7/52046 600/443 |
| 2008/0264171 | A1 | 10/2008 | Wodnicki | |
| 2008/0284575 | A1 * | 11/2008 | Breed | B60C 23/0493 340/438 |
| 2008/0292146 | A1 * | 11/2008 | Breed | B60N 2/002 382/118 |
| 2009/0043441 | A1 * | 2/2009 | Breed | G06K 7/10178 701/31.9 |
| 2009/0137903 | A1 | 5/2009 | Jin et al. | |
| 2010/0016719 | A1 | 1/2010 | Freiburger et al. | |
| 2010/0113933 | A1 | 5/2010 | Bouakaz | |
| 2010/0113936 | A1 | 5/2010 | Oguzman et al. | |
| 2010/0137720 | A1 | 6/2010 | Hanazawa et al. | |
| 2010/0185098 | A1 | 7/2010 | Kim | |
| 2011/0176390 | A1 | 7/2011 | Lei | |

FOREIGN PATENT DOCUMENTS

| | | | |
|---|---|---|---|
| EP | 2209019 | A1 | 7/2010 |
| JP | 2010162147 | A | 7/2010 |
| KR | 20080071771 | | 8/2008 |
| TW | 201025865 | A | 7/2010 |
| WO | WO1999/03400 | A1 | 1/1999 |
| WO | WO2000/057791 | | 10/2000 |
| WO | WO2006/039290 | A2 | 4/2006 |
| WO | WO2008/121267 | A1 | 10/2008 |
| WO | WO2010/003333 | A1 | 1/2010 |
| WO | WO2010/055427 | A1 | 5/2010 |

OTHER PUBLICATIONS

International Search Report and Written Opinion of the International Searching Authority, dated Jul. 29, 2014, for corresponding International Application No. PCT/GB2013/053289, 16 pages.

Agbossou, et al., "Class D Amplifier for a Power Piezoelectric Load," *IEE Transactions on Ultrasonics, Ferroelectrics, and Frequency Control*, vol. 47, No. 4, pp. 1036-1041, Jul. 2000.

Bowes et al., "Optimal Regular-Sampled PWM Inverter Control Techniques," IEEE Transactions on Industrial Electronics, vol. 54, No. 3, pp. 1547-1559, Jun. 2007.

Cincotti, et al., "Efficient Transmit Beamforming in Pulse-Echo Ultrasonic Imaging," *IEE Transactions on Ultrasonics, Ferroelectrics, and Frequency Control*, vol. 46, No. 6, pp. 1450-1458, Nov. 1999.

Cincotti et al., "A Novel Approach to the Aperture Windowing in Medical Imaging," *Ultrasonics*, 38, pp. 937-941, Sep. 2000.

Cowell, et al., "Quinary Excitation Method for Pulse Compression Ultrasound Measurements," *Ultrasonics*, 48, p. 98-108, Nov. 2007.

Cowell, et al., "Harmonic Cancellation in Switched Mode Linear Frequency Modulated (LFM) Excitation of Ultrasound Arrays," 2011 IEEE International Ultrasonics Symposium Proceedings, pp. 454-457, Oct. 18-21, 2011.

Cowell, et al., "Phase-Inversion-Based Selective Harmonic Elimination (PI-SHE) in Multi-Level Switched-Mode-Tone-and Frequency-Modulated Excitation," *IEE Transactions on Ultrasonics, Ferroelectrics, and Frequency Control*, vol. 60, No. 6, pp. 1084-1097, May 2013.

Frederick J. Harris, "On the Use of Windows for Harmonic Analysis with the Discrete Fourier Transform," Proceedings of the IEEE, vol. 66, No. 1, pp. 51-83, Jan. 1978.

Jorgen Arendt Jensen, "Field: A Program for Simulating Ultrasound Systems," Medical & Biological Engineering & Computing, vol. 34, Supplement 1, Part 1, pp. 351-353, Mar. 1996.

Jorgen Arendt Jensen, "Simulation of Advanced Ultrasound Systems Using Field II," Center for Fast Ultrasound Imaging, Technical University of Denmark, vol. 1, pp. 636-639, May 2004.

Misaridis et al., Use of Modulated Excitation Signals in Medical Ultrasound. Part I: Basic Concepts and Expected Benefits, *IEE*

(56) References Cited

OTHER PUBLICATIONS

*Transactions on Ultrasonics, Ferroelectrics, and Frequency Control*, vol. 52, No. 2, pp. 177-191, Feb. 2005.

Misaridis et al., Use of Modulated Excitation Signals in Medical Ultrasound. Part II: Design and Performance for Medical Imaging Applications, *IEE Transactions on Ultrasonics, Ferroelectrics, and Frequency Control*, vol. 52, No. 2, pp. 192-207, Feb. 2005.

Smith et al., "Ultrasound Array Transmitter Architecture with High Timing Resolution Using Embedded Phase-Locked Loops," *IEE Transactions on Ultrasonics, Ferroelectrics, and Frequency Control*, vol. 59, No. 1, pp. 40-49, Jan. 2012.

Tang and Clement, "A Harmonic Cancellation Technique for an Ultrasound Trandsucer Excited by a Switched-Mode Power Converter," *IEE Transactions on Ultrasonics, Ferroelectrics, and Frequency Control*, vol. 55, No. 2, pp. 359-367, Feb. 2008.

Xu et al., "A Low-Cost Bipolar Pulse Generator for High-Frequency Ultrasound Applications," *IEE Transactions on Ultrasonics, Ferroelectrics, and Frequency Control*, vol. 54, No. 2, pp. 443-447, Feb. 2007.

* cited by examiner

ULTRASOUND GENERATION

CROSS REFERENCE TO RELATED APPLICATIONS

This is the U.S. National Stage of International Application No. PCT/GB2013/053289, filed Dec. 13, 2013, which in turn claims the benefit of and priority to United Kingdom Patent Application No. GB1222882.1, filed Dec. 19, 2012.

The present invention relates to an ultrasound generator and a method of generating ultrasound. Particular embodiments of the present invention relate to the generation of ultrasound beyond the range of audible sound for humans, and preferably with a frequency greater than 0.5 MHz, though the invention is not limited to this.

BACKGROUND

Ultrasound is widely used in medicine and industry. Example applications include imaging to view internal structures of a patient or an industrial apparatus, and measurement, for instance measuring the size or movement of internal structures. An ultrasound generator uses a transducer to convert an electrical drive signal into ultrasound pressure waves. The ultrasound pressure waves propagate through a medium, for instance human tissue, and reflect back towards the transducer when encountering an impedance mismatch. The reflected pressure waves are converted back to electrical signals by the transducer. In an ultrasound imaging system the converted electrical signals are used to form an image.

An ultrasound generator may comprise a single transducer which is a single source of ultrasound pressure waves. However, ultrasound generators often contain an array of transducer elements. Each transducer element requires a transmitter circuit. For an array of transducer elements, multiple transmitter circuits are required if each element is to be separately drivable. Transmitter circuits typically require a combination of high power and high voltage. Excitation with arbitrary analogue waveforms requires the use of arbitrary waveform generators and high power precision amplifiers. High power and high voltage switched mode excitation can be achieved using Metal Oxide Semiconductor Field-Effect Transistors (MOSFET) based transmitter circuits. Multiple MOSFETs and their associated drive electronics can be combined within a single integrated circuit package to supply high currents to an ultrasound transducer element (in the form of a piezoelectric load), reducing component count and minimising cost per excitation channel. MOSFET based transmitter circuits use switched excitation to select between several positive and negative voltage levels. Switched excitation is well suited to portable systems and phased ultrasound transducer arrays, where size, complexity and cost are critical. Switched excitation results in square pulsed signals or staircase (stepped) pulsed signals which switch between discrete levels to approximate ideal sinusoidal signals. In the present patent specification the term “pulsed signal” is taken to include both square wave signals and stepped signals.

Advances in areas of ultrasound including high frequency imaging and a requirement for portable, low-cost systems, increases the complexity of ultrasound transmitter circuits. This problem is compounded by a trend towards the integration of both transmitter circuits and transducers into an ultrasound probe. Such integration is desirable because it improves impedance matching and reduces the size of a cable bundle between the ultrasound drive signal generator and the probe.

A limitation of MOSFET switched excitation is the use of fixed DC levels, which often results in fixed amplitude output. While it is possible to adjust switching levels in between drive signal pulses, it is desirable to be able to directly control ultrasound output pressure through the selection of the drive signal. Amplitude control is of particular importance for medical ultrasound applications, including for therapeutic and diagnostic ultrasound.

It is desirable to be able to control the form and properties of the ultrasound output pressure by adjusting the drive signal. To provide this control, it is known to use Pulse Width Modulation (PWM) techniques to adjust the drive signal. There is a continuing need to provide enhanced techniques for generating ultrasound transducer drive signals in order to provide enhanced control of ultrasound output pressure.

It is known that wide band drive signals, for instance an impulse or a small number of pulses, provides good axial resolution for reflected ultrasound signals at the expense of poor penetration. In contrast, a narrow band signal, for instance a longer duration pulse train, increases the penetration of ultrasound at the expense of reduced axial resolution. In order to increase the axial resolution for narrow band signals, it is known to use coded or frequency modulated drive signals, for instance a frequency coded pulse train. In particular, it is known to provide a linear frequency coded pulse train, in which the frequency is increased or decreased linearly over time. Such a Linear Frequency Modulated (LFM) drive signal is known as a linear chirp. A coded signal can be recovered using well known signal processing techniques, which will not be described here. However, it is difficult to accurately produce analogue chirp modulating signals through conventional PWM techniques due to poor correlation of analogue pulse cycles and drive signal pulses.

It is further known to provide pulse shaping for a LFM or other coded ultrasound drive signal, for instance by applying a standard windowing technique over the time duration of the drive signal, for instance a Hann window (which tapers the start and end of the drive signal). Such pulse shaping advantageously reduces sideband noise in the received ultrasound signal.

It is known for PWM in other fields, for instance power electronics, to be modified to reduce the Total Harmonic Distortion (THD) of the pulsed signal. However, there has been little progress towards satisfactorily reducing harmonic distortion for pulsed drive signals in ultrasonics.

“Quinary excitation method for pulse compression ultrasound measurements”, Cowell and Freear, Ultrasonics 48 (2008), 98-108, Elsevier proposes the generation of a switched excitation method for linear frequency coded excitation of ultrasonic transducers in pulse compression systems. Pulse compression sidelobes are reduced through the use of amplitude tapering at the beginning and end of the excitation signal. Amplitude tapering is achieved by the use of intermediate voltage switching levels, half of the main excitation voltages. The excitation signal is generated from an LFM analogue signal by applying multiple switching levels through use of a multi-level MOSFET circuit.

“Harmonic Cancellation in Switched Mode Linear Frequency Modulated (LFM) Excitation of Ultrasound Arrays”, Cowell et al., Ultrasonics Symposium (IUS), 2011 IEEE International, pp. 454-457, 18-21 Oct. 2011 discusses the application of switched excitation for ultrasound generation. It is noted that switched excitation introduces undesirable harmonics into the signal compared to analogue signals. The reduction of harmonics through the addition of intermediate switching levels and control of the switching timing is proposed, and in particular two, three, five and nine level switched excitation signals are described, and their harmonic performance simulated and experimentally verified. However, no detail is given regarding how the multi-level switched excitation signals are generated.

BRIEF SUMMARY OF THE DISCLOSURE

It is an aim of embodiments of the present invention to obviate or mitigate one or more of the problems associated with the prior art, whether identified herein or elsewhere.

Embodiments of the present invention allow ultrasound transducer drive signals to be defined and generated that provide particular improvements for ultrasound output pressure control. Embodiments of the present invention relate to the definition of pulsed drive signals using a carrier comparison method in which a carrier signal is defined and compared to a desired modulating signal. However, the scope of the present invention encompasses direct modulation schemes for generating pulsed drive signals from a modulating signal. In certain embodiments, the resulting pulsed drive signal is supplied to a MOSFET based transmitter circuit for an ultrasound transducer, which is arranged to switch a drive current to the transducer to generate ultrasound.

In accordance with embodiments of the present invention the linearity of the ultrasound output power from an ultrasound transducer is increased. This is enabled by recognising and measuring the manner in which the fundamental component of a square wave is transmitted by an ultrasound transducer.

Further embodiments of the present invention relate to pulsed drive signals in which pulse positioning and distribution is improved for frequency coded (modulated) modulating signals.

Further embodiments of the present invention relate to the generation of a pulsed drive signal to be supplied to an ultrasound transducer to generate an ultrasound pressure wave with selected frequency components, including the selective reduction of harmonic content, while retaining control over the amplitude of the output pressure.

Advantageously, embodiments of the present invention may be used to generate ultrasound drive signals that can be processed by a conventional MOSFET transmitter circuit.

Another aspect of the invention provides a computer program comprising instructions arranged, when executed, to implement a method and/or apparatus in accordance with any one of the above-described aspects. A further aspect provides machine-readable storage storing such a program.

According to a first aspect of the present invention there is provided an ultrasound generator comprising: a signal generator arranged to receive, generate or calculate when instructed a modulating signal with a magnitude that varies within a first range and to generate a pulsed drive signal having a predefined first relationship to the modulating signal, the pulsed drive signal having at least a zero output level, a positive output level and a negative output level, wherein the position and width of pulses are defined by at least first and second switching angles per half cycle of the modulating signal; and a transducer arranged to generate ultrasound in response to the pulsed drive signal; wherein the first relationship is selected such that within at least part of the range of magnitude of the modulating signal the first and second switching angles are adjusted simultaneously to provide for an increase or decrease in the magnitude of the fundamental frequency of the pulsed drive signal corresponding to an increase or decrease in the magnitude of the modulating signal; and wherein the first relationship is selected such that a selected harmonic component of the generated pulsed drive signal is maintained below a first threshold.

The first relationship may be selected such that throughout the full range of magnitude of the modulating signal the first and second switching angles are adjusted simultaneously to provide for an increase or decrease in the magnitude of the fundamental frequency of the pulsed drive signal corresponding to an increase or decrease in the magnitude of the modulating signal.

The first relationship may be selected such that throughout part of the range of magnitude of the modulating signal one switching angle increases while the other switching angle decreases simultaneously to provide for an increase or decrease in the magnitude of the fundamental frequency of the pulsed drive signal corresponding to an increase or decrease in the magnitude of the modulating signal.

The pulsed drive signal may have at least one additional intermediate positive output level and at least one additional intermediate negative output level.

The first relationship may be selected such that the third harmonic of the fundamental frequency of the pulsed drive signal is reduced.

The first relationship may be further selected such that the magnitude of the fundamental frequency of the pulsed drive signal is proportional to the magnitude of the modulating signal.

The signal generator may be arranged to generate the pulsed drive signal by comparing the modulating signal to a carrier signal.

The modulating signal magnitude may vary over time, and wherein the first relationship is selected to be a function of measured or simulated variation of the magnitudes of the fundamental component and the selected harmonic content of the transducer output with a linear increase of pulse width of a pulsed drive signal.

The first relationship may be selected such that the position of pulses and the number of pulses per half cycle of the modulating signal are functions of frequency coding of the modulating signal.

According to a second aspect of the present invention there is provided a method of generating ultrasound comprising: receiving, generating or calculating when instructed a modulating signal at a signal generator, the modulating signal having a magnitude that varies through a first range; generating, at the signal generator, a pulsed drive signal having a predefined first relationship to the modulating signal, the pulsed drive signal having at least a zero output level, a positive output level and a negative output level, wherein the position of pulses are defined by at least first and second switching angles per half cycle of the modulating signal; receiving the pulsed drive signal at a transducer; and generating, at the transducer, ultrasound in response to the pulsed drive signal; wherein the first relationship is selected such that within at least part of the range of magnitude of the modulating signal the first and second switching angles are adjusted simultaneously to provide for an increase or decrease in the magnitude of the fundamental frequency of the pulsed drive signal corresponding to an increase or decrease in the magnitude of the modulating signal; and wherein the first relationship is selected such that a selected harmonic component of the generated pulsed drive signal is maintained below a first threshold.

The modulating signal magnitude may vary over time and the first relationship may be selected to be a function of measured or simulated variation of the magnitudes of the fundamental component and the selected harmonic content of the transducer output with a linear increase of pulse width of a pulsed drive signal.

The first relationship may be selected such that the position of pulses and the number of pulses per half cycle of the modulating signal are functions of frequency coding of the modulating signal.

According to a third aspect of the present invention there is provided an ultrasound generator comprising: a signal generator arranged to receive, generate or calculate when instructed a modulating signal having a magnitude that varies over time and to generate a pulsed drive signal in which pulse width varies with the magnitude of the modulating signal according to a predefined first relationship; and a transducer arranged to generate ultrasound in response to the pulsed drive signal; wherein the first relationship is selected to be a function of measured or simulated variation of the magnitude of the fundamental component of the transducer output with a linear increase of pulse width of the pulsed drive signal.

The predefined first relationship may be selected such that the transducer output varies linearly or substantially linearly with the magnitude of the modulating signal.

The signal generator may be arranged to generate the pulsed drive signal by comparing the modulating signal to a carrier signal.

The first relationship may be selected such that the position of pulses and the number of pulses per half cycle of the modulating signal are functions of frequency coding of the modulating signal.

According to a fourth aspect of the present invention there is provided a method of generating ultrasound comprising: receiving, generating or calculating when instructed a modulating signal at a signal generator, the modulating signal having a magnitude that varies over time; generating, at the signal generator, a pulsed drive signal in which pulse width varies with the magnitude of the modulating signal according to a predefined first relationship; receiving the pulsed drive signal at a transducer; and generating, at the transducer, ultrasound in response to the pulsed drive signal; wherein the first relationship is selected to be a function of measured or simulated variation of the magnitude of the fundamental component of the transducer output with a linear increase of pulse width of the pulsed drive signal.

The first relationship may be selected such that the position of pulses and the number of pulses per half cycle of the modulating signal are functions of frequency coding of the modulating signal.

According to a fifth aspect of the present invention there is provided an ultrasound generator comprising: a signal generator arranged to receive, generate or calculate when instructed a frequency coded modulating signal and to generate a pulsed drive signal according to a predefined first relationship to the modulating signal; and a transducer arranged to generate ultrasound in response to the pulsed drive signal; wherein the first relationship is selected such that the position of pulses and the number of pulses per half cycle of the modulating signal are functions of the frequency coding of the modulating signal.

The signal generator may be arranged to generate the pulsed drive signal by comparing the modulating signal to a carrier signal, and wherein the carrier signal is frequency coded such that the frequency of the carrier signal is either the same as or has a predefined second relationship to the frequency of the modulating signal.

The carrier signal frequency may be equal to N times the frequency of the modulating signal, such that there are N pulses per half cycle of modulating signal, where N is a positive integer.

The carrier signal may have a predetermined phase shift relative to the modulating signal.

The carrier signal may have a $\pi/2$ phase shift relative to the modulating signal.

According to a sixth aspect of the present invention there is provided a method of generating ultrasound comprising: receiving, generating or calculating when instructed a frequency coded modulating signal at a signal generator; generating a pulsed drive signal according to a predefined first relationship to the modulating signal; receiving the pulsed drive signal at a transducer; and generating, at the transducer, ultrasound in response to the pulsed drive signal; wherein the first relationship is selected such that the position of pulses and the number of pulses per half cycle of the modulating signal are functions of the frequency coding of the modulating signal.

BRIEF DESCRIPTION OF THE DRAWINGS

Embodiments of the invention are further described hereinafter with reference to the accompanying drawings, in which.

DETAILED DESCRIPTION

Figure 1:
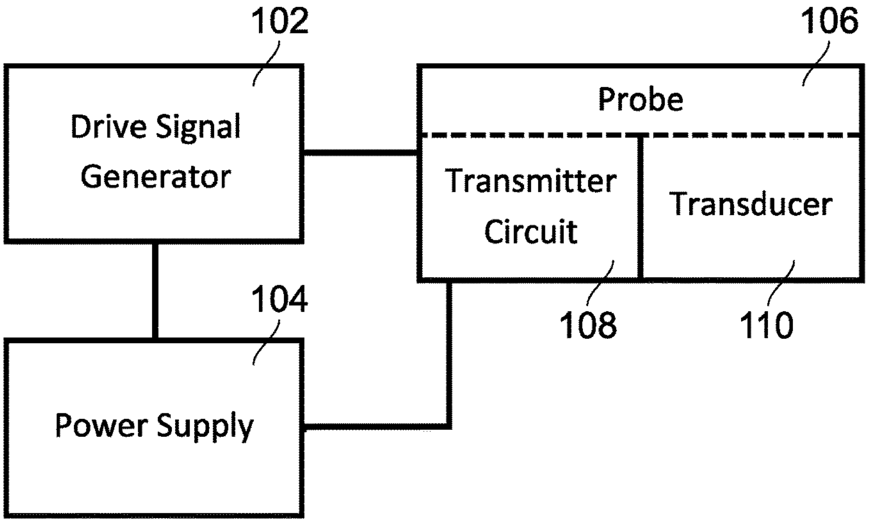
FIG. 1 illustrates the component parts of an ultrasound generator in accordance with an embodiment of the present invention.

Referring first to FIG. 1, this illustrates a sound generator, and in particular an ultrasound generator, in accordance with an embodiment of the present invention. The ultrasound generator comprises a signal generator 102 arranged to generate a drive signal. The signal generator 102 is coupled to a power supply 104 to receive electrical power, which also supplies electrical power to a probe 106. The frequency of the drive signal defines the frequency of the ultrasound pressure waves. The probe 106 comprises a transmitter circuit 108, for instance implemented using MOSFETs as discussed above in the background section. The transmitter circuit 108 is arranged to receive the drive signal from the signal generator 102 and to switch a high current received from the power supply to a transducer 110. The transmitter circuit 108 serves to amplify the drive signal for the transducer 110. It will be appreciated that in other embodiments of the invention the output from the drive signal generator may be supplied directly to the transducer such that no transmitter circuit is necessary, or the transmitter circuit is incorporated within the drive signal generator. It will be appreciated that the probe 106 may comprise an array of elements, each element comprising a separate transmitter circuit 108 and a transducer 110. For an array of elements the drive signal generator 102 may be arranged to supply a different drive signal to each transmitter circuit 108. In accordance with particular embodiments of the present invention the transducer 110 is arranged to generate ultrasound beyond the range of audible sound for humans, for instance greater than 20 kHz, and preferably with a frequency greater than 1 MHz, though the invention is not limited to any particular frequency range for ultrasound.

Figure 2:
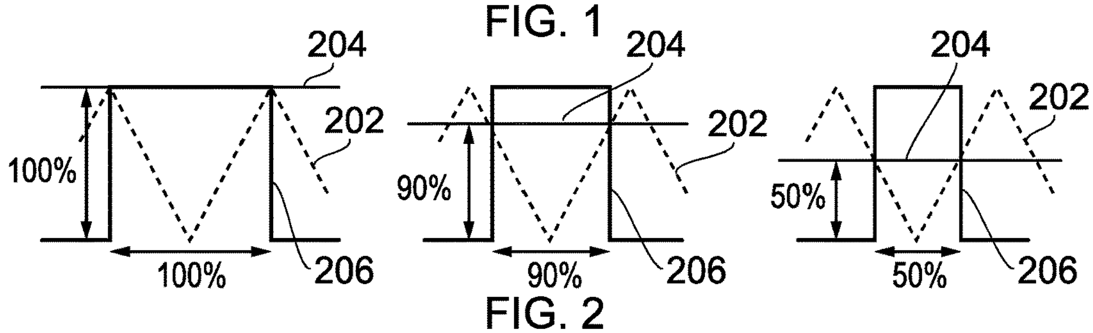
FIG. 2 illustrates amplitude control using conventional Pulse Width Modulation (PWM)

As noted above in the background section, it is known to use PWM to generate and to control a drive signal. Conventional carrier based PWM compares a carrier signal of known form to a desired output level or modulating signal, generating a pulsed drive signal having pulses which vary in width. FIG. 2 shows an example of a commonly used triangular wave carrier signal 202 generating a symmetrically modulated pulse 204 which forms a drive signal when the carrier signal 202 is compared with a desired DC voltage level (the modulating signal 206). Another frequently used carrier signal is a sawtooth signal, which is similar to a triangular wave, except that either the rising edge or the trailing edge is a step. The carrier signal 202 of FIG. 2 comprises a single constituent waveform. It will be understood that to generate a pulsed drive signal having positive and negative pulses (required for a modulating signal having positive and negative components), with an intermediate step such as ground, it is necessary for the carrier signal to have at least one positive and at least one negative constituent waveform. FIG. 2 shows three examples of pulses generated for differing DC levels during a single pulse period. Example (a) shows the pulse generated for a 100% DC level. The DC level (modulating signal 206) is above the carrier signal 202 the whole time during the pulse period (the time between consecutive peaks or other corresponding points of the carrier signal 202) and so the pulse is at the maximum level for 100% the available pulse width. Example (b) shows the pulse generated for a 90% DC level, which gives a pulse which is 90% as wide as pulse (a). Example (c) shows the generation of a pulse which is 50% as wide as pulse (a). Pulse width is determined by using the intersection of the carrier signal 202 with the modulating signal 204. For the triangular carrier signal of FIG. 2 the pulse width is linearly scaled, because the carrier function varies linearly over time.

The examples shown in FIG. 2 generate PWM sequences that fluctuate between two voltage levels, in this simple case ground and a positive voltage. The proportion of time for which the output drive signal 204 is at the positive voltage varies, and so when the drive signal is used to control the supply of electrical current to an ultrasound transducer the ultrasound pressure wave is switched on and off accordingly. The result is that power control is achieved by varying the duty cycle (the pulse width) such that the average output power of the ultrasound pressure varies according to the modulating signal. A PWM scheme can be extended to include other output levels. Multi-level PWM pulsed drive signals can be derived by using multiple carrier constituent waveforms separated by phase or amplitude (level shifted). The modulating signal is compared to each of the carrier signal constituent waveforms. Each carrier signal constituent then controls the switching of a particular set of voltage levels resulting in a stepped pulsed drive signal. For amplitude separated (level-shifted) carrier signal constituents, comparison of each constituent to the modulating signal determines exactly one voltage level at any one time within the drive signal. For instance, for the triangular carrier having two constituent triangular waveforms shown in FIG. 3 a modulating signal (w(t)) is compared to two constituents: $c_{POS}(t)$ and $c_{NEG}(t)$ labelled as 302 and 304 respectively. The output PWM pulsed drive signal (PWM(t)) has three levels (1, 0, −1) and is determined according to the carrier comparison algorithm of equation (1):

$$PWM(t) = \begin{cases} 1 & \text{if} \quad w(t) \geq c_{POS}(t) \\ -1 & \text{else if} \quad w(t) \leq c_{NEG}(t) \\ 0 & \text{else} \end{cases} \tag{1}$$

The form of the carrier signal determines not only pulse width, but also pulse position and pulse abundance (number of pulses per time period). Pulse abundance is characterised by the relationship between the carrier frequency, and the modulating frequency. As an example, a carrier signal with a frequency ten times greater than a modulating signal will produce ten PWM pulses per cycle of the modulating signal.

Figure 3:
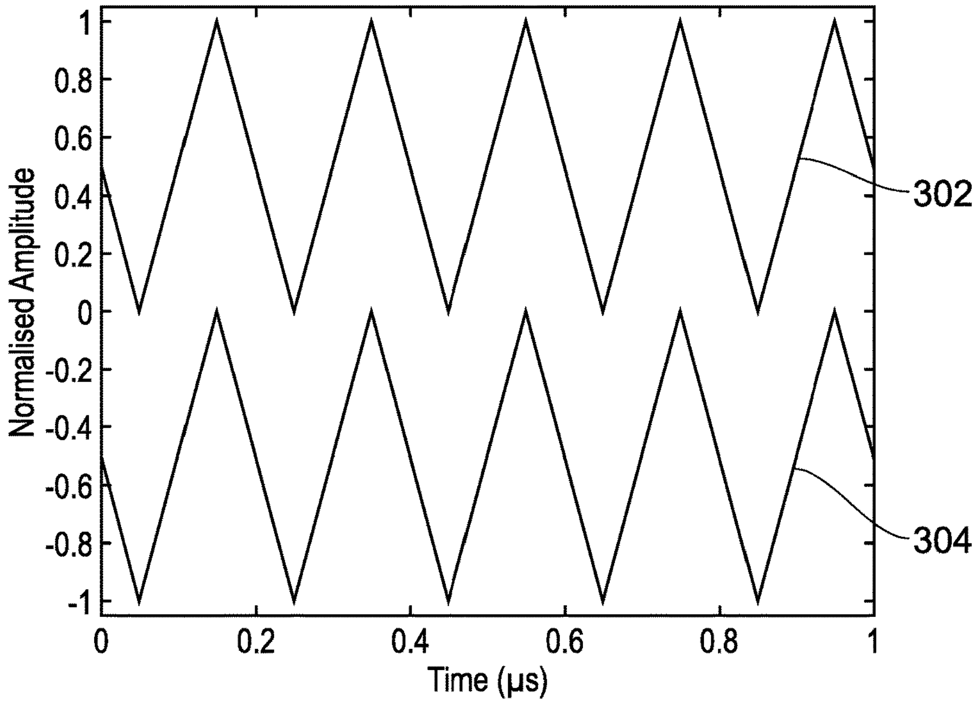
FIG. 3 illustrates an alternative carrier signal having two constituent waveforms for generating a three level pulsed drive signal using conventional PWM.

Pulse position, in this context, refers to whether a pulse is symmetrically or asymmetrically modulated. Symmetrical modulation uses a carrier, for instance a triangular carrier, which is symmetrical during the carrier period. The carrier signals 202, 302, 304 shown in FIGS. 2 and 3 are examples of symmetrical modulation. In symmetrical carrier based PWM, both edges of the output pulses are modulated with the centre of the pulse located at the centre of the carrier constituent waveform period. In asymmetric modulation, including when using a sawtooth carrier, one edge of the pulse is fixed, and either the leading or trailing edge is modulated.

For many applications of PWM, for instance power electronics and communications, the ratio between the carrier frequency, $f_c$, and the modulating frequency, $f_m$, is large (e.g. $f_c \geq 10 f_m$). In digital implementations of PWM, the carrier signal is a discrete version of a continuous waveform, and is therefore sampled itself by a clock of higher frequency, $f_s$. The relationship between $f_s$ and $f_c$ determines the number of available PWM states. In addition to this, the sampling frequency $f_s$ may dictate the specification of the modulator circuit, as the frequency $f_s$ defines the minimum pulse width or time to switch on and off. As an example, if a sampling frequency or system clock of 100 MHz is used, then the minimum pulse and minimum pulse increment would equal 10 ns.

Ultrasound frequencies are often defined in the kHz to tens of MHz range. To implement PWM with a modulating signal at these frequencies places a burden on the hardware required. A particular requirement of PWM for ultrasound generation is that it is preferred for the transmitter circuit to have a rapid switching response. Typically this leads to the use of MOSFET based transmitter circuits operating as Class D amplifiers, which gives high efficiency (desirable for maximum transmission of energy to the ultrasound wave).

MOSFET based circuits switch between large voltages at high speed but are restricted by a maximum switching frequency or rise and fall time. This maximum switching frequency limits the number of switching events that can be used to describe a cycle of ultrasound at its fundamental frequency. As an example, conventional PWM may switch ten times within a half cycle. At ultrasound frequencies, this requires MOSFET circuits capable of very fast switching. Faster switching MOSFETs are available, however a trade-off exists between speed of switching and switching amplitude range or power capability. Consequently, while it is known to implement an ultrasound generator using conventional PWM based upon a Class D MOSFET transmitter circuit, the constraint on the maximum available carrier signal frequency, and thus switching frequency, can result in a poor PWM approximation of the desired modulating signal.

Conventional PWM drive signals supplied to ultrasound transducers comprises square-wave excitation of transducers switching at close to the fundamental frequency, in the megahertz range. In accordance with embodiments of the present invention, an ultrasound transducer continues to use switching at close to the fundamental frequency. However, the present inventors have recognised that it is desirable to generate a pulsed drive signal in which the pulse width is modulated taking into account the characteristics of the transducer itself as a band-pass filter for the fundamental of a square wave, rather than assuming that the PWM drive signal perfectly reproduces the harmonic content of the original drive signal. Additionally, embodiments of the present invention recognise that an ultrasound transducer can only generate ultrasound reproducing the fundamental component of the square wave if the bandwidth of the transducers extends to the full bandwidth of the fundamental. It is desirable that the ultrasound output pressure magnitude conforms closely to the magnitude of the original modulating signal, or differs in a predetermined manner. It has not previously be recognised that failure to consider the fundamental response of a pulsed drive signal as transmitted by an ultrasound transducer results in ultrasound output pressure which does not in fact directly correspond to the drive signal applied to the transducer.

The carrier signals described above in connection with FIGS. 2 and 3 used in conventional PWM assign a linearly increasing pulse width to a linearly increasing desired output level (determined by the modulating signal). This can be seen in FIG. 2, as the width of the pulse is directly proportional to the desired DC level. It has been previously understood that a linear increase in pulse width for a PWM drive signal used to generate ultrasound leads to a linear increase in the output pressure of the ultrasound pressure wave. However, the present inventors have identified that this is not the case. Indeed, the present inventors have identified that the output pressure is not directly proportional to excitation pulse width. The output pressure does not follow a linear relationship with a linear increase in pulse width. It is understood that this is due to the bandwidth of an ultrasound transducer, within which it is sensitive to a particular range of frequencies and in particular may be sufficient to transmit the fundamental component of the pulsed drive signal, but not the full harmonic content of the pulsed drive signal. Frequencies outside of the transducer's bandwidth are heavily attenuated and are not transmitted within the transmission medium, such that the ultrasound output pressure is dominated by the fundamental component of the pulsed drive signal. It is, however, desirable to be able to generate ultrasound with an output pressure which does vary according to a desired pattern, for instance a linear increase in pressure for a linear increase in the modulating signal. The present inventors have identified that it is possible to achieve this linear relationship between the modulating signal and the ultrasound pressure (or indeed any arbitrary relationship between the two) by controlling the relationship between the modulating signal and drive signal pulse width according to the fundamental component of the pulsed drive signal as transmitted according to the particular properties of the particular ultrasound transducer which is to be used.

Figure 4:
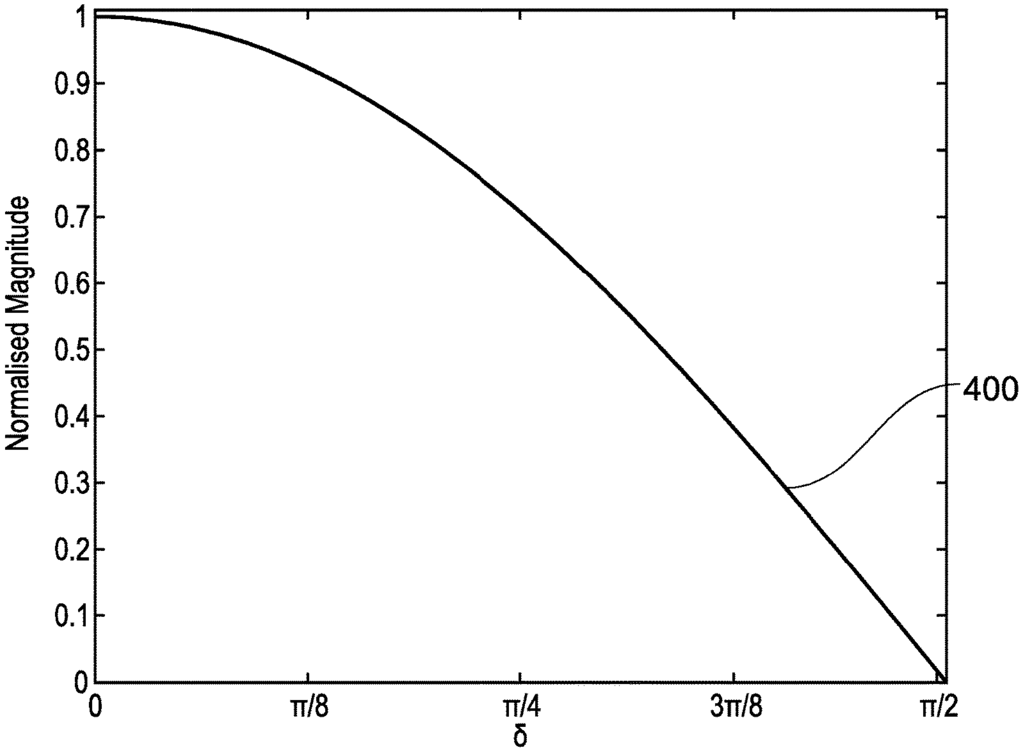
FIG. 4 illustrates the variation of output pressure from an ultrasound transducer with the switching angle of a pulsed drive signal applied to the transducer.

FIG. 4 shows the relationship 400 between a linearly reducing pulse width, and the normalised magnitude of the output ultrasound pressure from an ultrasound transducer. The output pressure response is broadly in line with the fundamental component of the pulse as this is transmitted by the transducer, with higher frequency components being attenuated by the transducer. This is equivalent to the relationship between ultrasound output pressure and the amplitude of the modulating signal for a pulsed drive signal generated according to conventional PWM. FIG. 4 shows the output pressure normalised to the maximum output pressure, which occurs when the pulse width is at its maximum. The X axis shows variation of the switching angle $\delta$ of the pulse signal from 0 to $\pi/2$. The switching angle $\delta$ is the angle at which a pulse is switched on when the pulse is centred at $\pi/2$, such that a switching angle of 0 represents a pulse width which is half of the pulse period and a switching angle of $\pi/2$ represents a pulse width of 0. It can be seen that the relationship between the pulse width and the output pressure at the fundamental is nonlinear. The relationship may be approximately trigonometric. The relationship could vary further if the bandwidth of the ultrasound transducer does extend to the full bandwidth of the fundamental component of the square wave.

Figure 5:
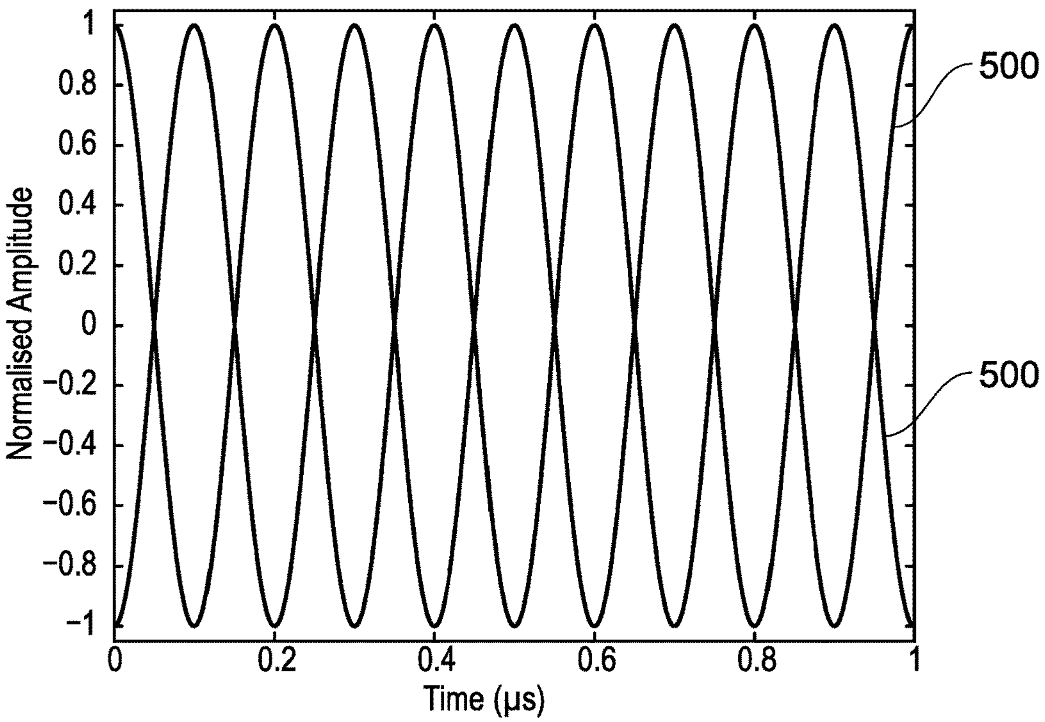
FIG. 5 illustrates a single frequency carrier signal having two constituent waveforms for generating a three level pulsed drive signal in accordance with an embodiment of the present invention.
Figure 6:
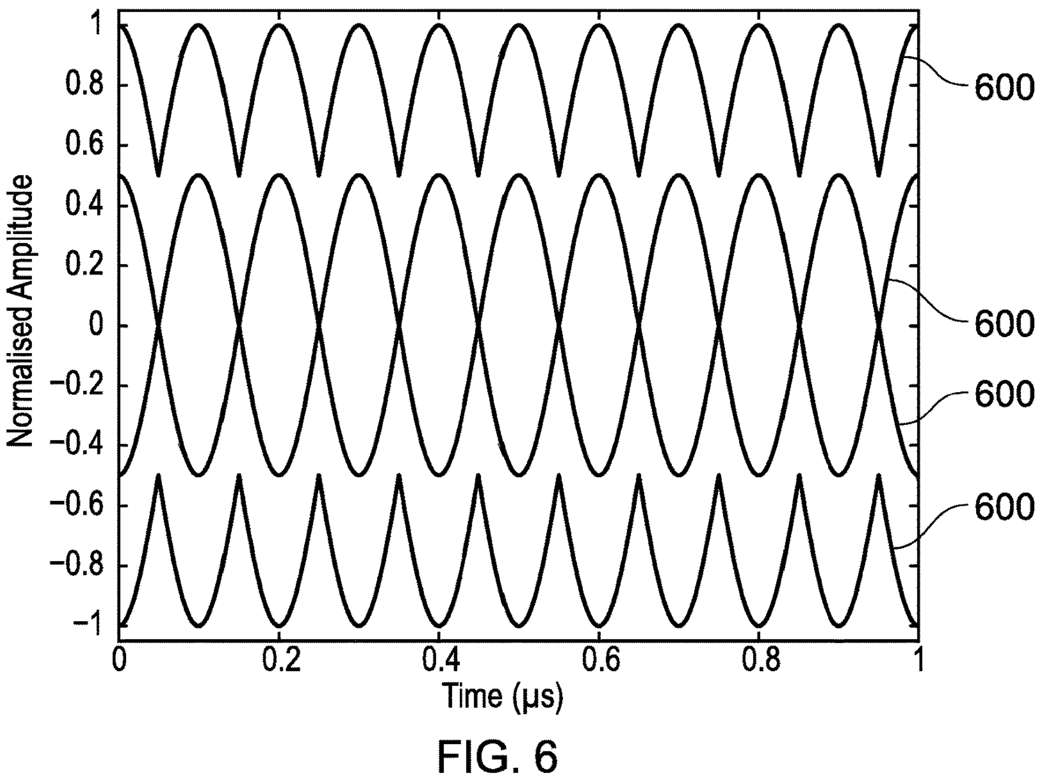
FIG. 6 illustrates a single frequency carrier signal having four constituent waveforms for generating a five level pulsed drive signal in accordance with an embodiment of the present invention.

Recognition of this trigonometric relationship allows a carrier signal to be optimised for a particular type of ultrasound transducer to obtain an output pressure which varies according to a desired function, most typically linearly with the modulating signal. To generate an appropriate pulsed drive signal according to a direct modulation strategy, a conversion could be to take the $\sin^{-1}$ or $\cos^{-1}$ of the desired output level (the modulating signal) for the transducer represented by FIG. 4, or some other appropriate function unique to the transducer, to determine the appropriate switching angle. According to certain embodiments of the present invention a carrier comparison method is used to generate a drive signal, and so the insight into the output pressure relationship gained through the graph of FIG. 4 for a particular transducer can be used to define a new carrier signal to give the desired output pressure relationship. To provide a linear relationship between modulating signal and the ultrasound output pressure for the transducer represented by FIG. 4, the carrier signal constituents may be changed from a triangular wave to a wave approximating a rectified cosine (and the inverse for negative carrier signal constituents). FIGS. 5 and 6 show optimised carrier signals for generation of three and five level pulsed (stepped) drive signals comprising two carrier signal constituents 500 and six carrier signal constituents 600 respectively. It will be appreciated that depending on the desired ultrasound output power relationship and the particular transducer the carrier signal constituents may differ significantly from the forms shown in FIGS. 4 and 5 where a linear relationship with the modulating signal is required. The level shifted carrier signal constituent waveforms shown in FIGS. 5 and 6 are defined by equation 2. It will be appreciated that alternative modifications could be applied to the carrier signal in order to generate an asymmetrically modulated pulsed drive signal in which the ultrasound output pressure varies appropriately with the modulating signal.

$$c(t)=A\cdot|\cos(\omega t+\phi)|+L \quad (2)$$

An carrier signal which has been optimised as described above in accordance with an embodiment of the present invention can be used to generate a multi-level pulsed or stepped drive signal of amplitude modulated or tapered signals, at a single frequency, equal to that of the carrier signal. However, as described above in the background section, it is often desirable to apply a coded drive signal to an ultrasound transducer.

Coded imaging is an established technique for increasing the Signal to Noise Ratio (SNR) in ultrasound imaging systems. In general, the technique relies upon the correlation between a transmitted pulse and a received signal to distinguish between low intensity echoes generated by small impedance changes within the transmission medium (which provide weak scattering of ultrasound energy) and the ambient noise floor. Most often, frequency modulation of drive signals is chosen over phase modulation as they do not require multiple transmissions and do not contain abrupt changes in phase. In the case of frequency coded (frequency modulated) signals, the embedded 'code' is the rate of the increase (or decrease) from a start frequency to the stop frequency, over time. At the receiver, a 'pulse compression' filter is necessary to detect the coded signal and indicate correlation or a matched response. One optimal design for the pulse compression filter is to use a matched filter—the inverse (or time-reversed, complex-conjugate) of the transmitted sequence. Tapering of the excitation pulse and applying a window to the filter can also provide additional benefits, as the nature of the taper or window function can offer gains in SNR at a cost of decreased axial resolution.

It is often desirable to generate a drive signal which changes frequency over the duration of the drive signal (for a drive signal which is applied to the transducer as a burst signal), in addition to amplitude modulation through the application of a windowing function as described above.

Ultrasound generated using a drive signal which is coded using frequency modulation to give a 'chirp' signal has been shown to give a number of advantages for ultrasound imaging. A Linear Frequency Modulated (LFM) drive signal is a chirp signal, though it will be appreciated that this is only one example and the frequency modulation need not be linear.

As discussed in detail above, a particular constraint when using pulsed signals to drive an ultrasound transducer is that the carrier signal frequency is similar to the modulating signal frequency. Without close control over the frequency of the carrier signal, the generation of pulses corresponding to the modulating signal may not be optimal. For instance, pulses may be absent entirely during a half cycle of the modulating signal. The relationship between carrier signal frequency and modulating signal frequency denotes pulse abundance. A carrier signal whose frequency is twice that of the modulating signal would generate two pulses per half cycle. The present inventors have realised that advantageously the frequency of the carrier signal may be matched to the frequency of the modulating signal (with a phase shift). Alternatively, the carrier signal frequency may be controlled such that it has a predefined relationship to the modulating signal frequency. As only one example, the relationship may be that the carrier signal frequency is an integer multiple of the modulating signal frequency. Alternatively, the predefined relationship may be that the frequency of the carrier signal is offset from the frequency of the modulating signal by a predefined amount. In some circumstances it may be desirable for there to be a degree of non-convergence between the two frequencies. Further examples where the frequency of the carrier signal is closely controlled as a function of the frequency of the modulating signal in order to optimise the generation of drive signal pulses will be readily apparent to the skilled person.

In accordance with an embodiment of the present invention, the carrier signal is frequency coded in tandem with the frequency modulation applied to the modulating signal. It will be understood that this may be applied to triangular, sawtooth or other conventional PWM carrier signals, as well as the form of modified carrier signal components described above in connection with FIGS. 4 to 6. As only one example, for an LFM chirp signal the carrier signal constituent waveforms may be described according to equation (3) which represents a modification to equation (2).

$$c(t)=A\cdot|\cos(\omega' t+\phi)|+L \quad (3)$$

In equation 2 $\omega'=(2\pi)\cdot(f-(B/2)+B/(2T))$, with B the bandwidth of the signal, f the centre frequency and T the signal duration.

Modulating the frequency of the carrier signal permits the generation of chirp coded pulsed drive signals and ensures that the symmetrically modulated pulses are generated at the centre of the carrier period. Examples of a frequency coded cosine carrier are shown in FIG. 7 (a frequency coded carrier signal having constituents 700 to generate a three level pulsed drive signal) and FIG. 8 (a frequency coded carrier signal having constituents 800 to generate a five level pulsed drive signal).

Figure 7:
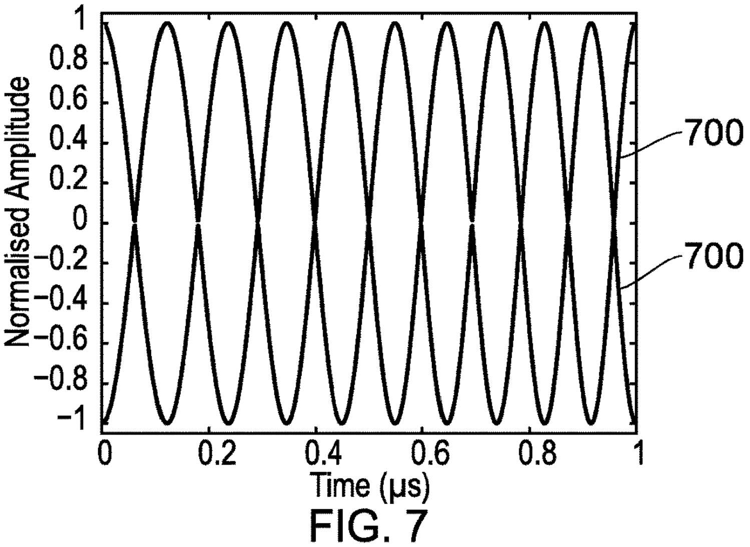
FIG. 7 illustrates a swept frequency (LFM chirp) carrier signal having two constituent waveforms for generating a three level pulsed drive signal in accordance with an embodiment of the present invention.
Figure 8:
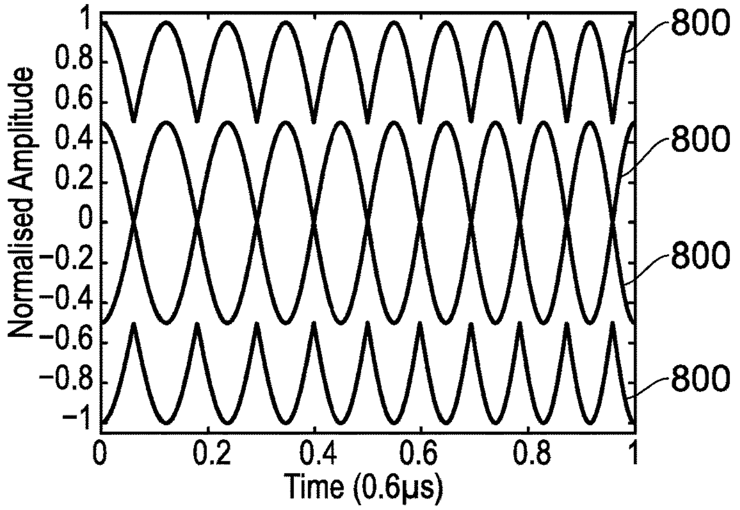
FIG. 8 illustrates a swept frequency (LFM chirp) carrier signal having four constituent waveforms for generating a five level pulsed drive signal in accordance with an embodiment of the present invention.

Carrier signals including those illustrated in FIGS. 7 and 8 allow the generation of pulsed drive signals that are selected both for required tone and then frequency coded. A window or amplitude function may also be applied. Such a frequency coded, rectified cosine carrier signal advantageously assigns symmetrically modulated pulses within the drive signal in a non-linear fashion based upon the output pressure response of an ultrasound transducer and also provides control of the phase and frequency information of the pulsed drive signal.

As briefly noted above, amplitude control of frequency coded drive signals is important, as the matched filtering process for reflected ultrasound introduces 'self-noise' in coded ultrasound imaging. This 'self-noise' can be seen as large sidelobes around the correlation peak, of which there are two main types, far and near sidelobes. The impact of sidelobes in ultrasound imaging is that weak reflectors may be masked by an increased overall noise level, or other artefacts may appear in the image that do not exist.

Near sidelobes, close to the main lobe peak, can be reduced by applying a window to the received filter. The choice of window or weighting function used in the filter design defines the reduction in sidelobe level at a cost of increased main lobe width, as will be well known by those skilled in the art.

Figure 9:
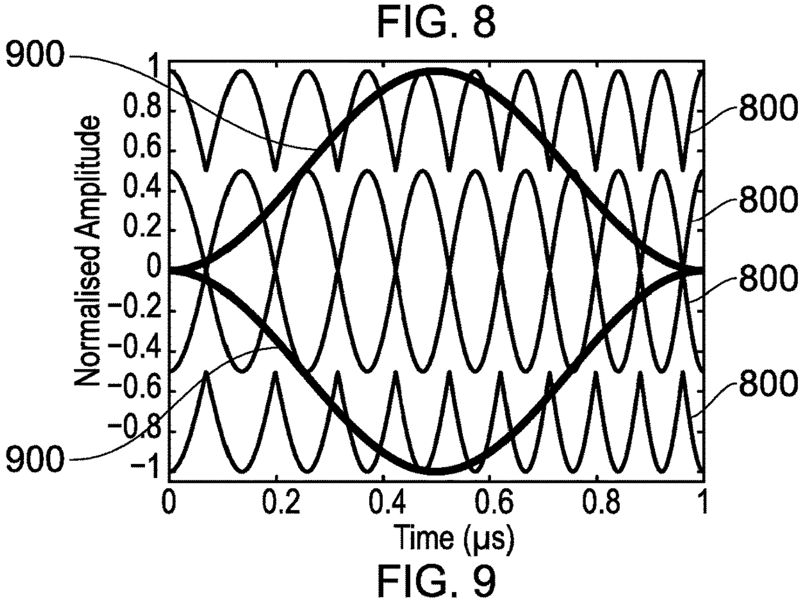
FIG. 9 illustrates positive and negative amplitude functions overlaid upon the swept frequency (LFM chirp) carrier signal of FIG. 8.

Far sidelobes are generated by Fresnel ripples present in the excitation due to the use of a rectangular envelope or window on the ultrasound drive signal burst. By applying an amplitude function or taper to the drive signal burst, the far sidelobes can be reduced. The combination of amplitude tapering on transmission, and matched filter weighting in receive that reduces sidelobes in coded imaging. FIG. 9 shows a multilevel, level shifted, swept frequency, cosine carrier having constituent waveforms 800 corresponding to FIG. 8 overlaid with a Hann window signal having positive and negative halves 900, 902.

Figure 10:
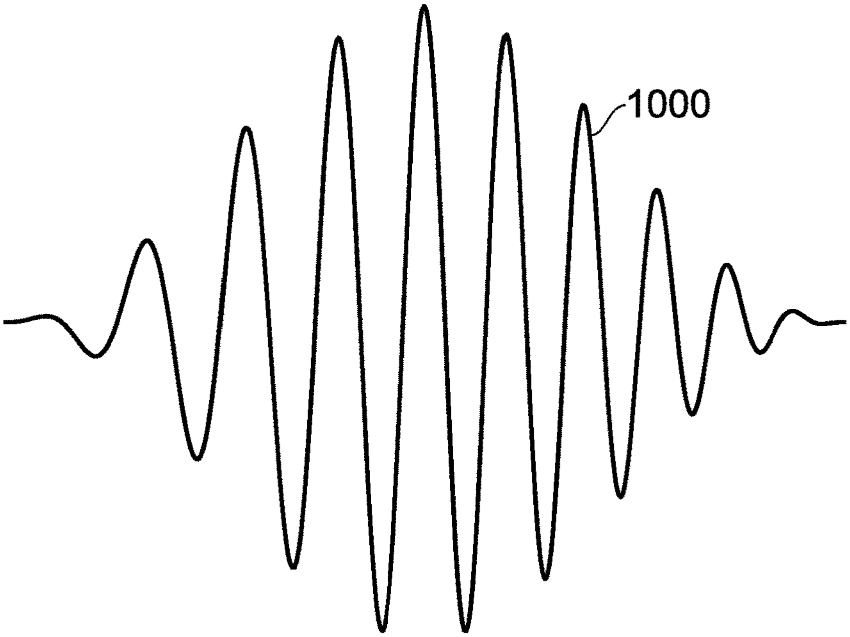
FIG. 10 illustrates an analogue amplitude windowed modulating signal.
Figure 11:
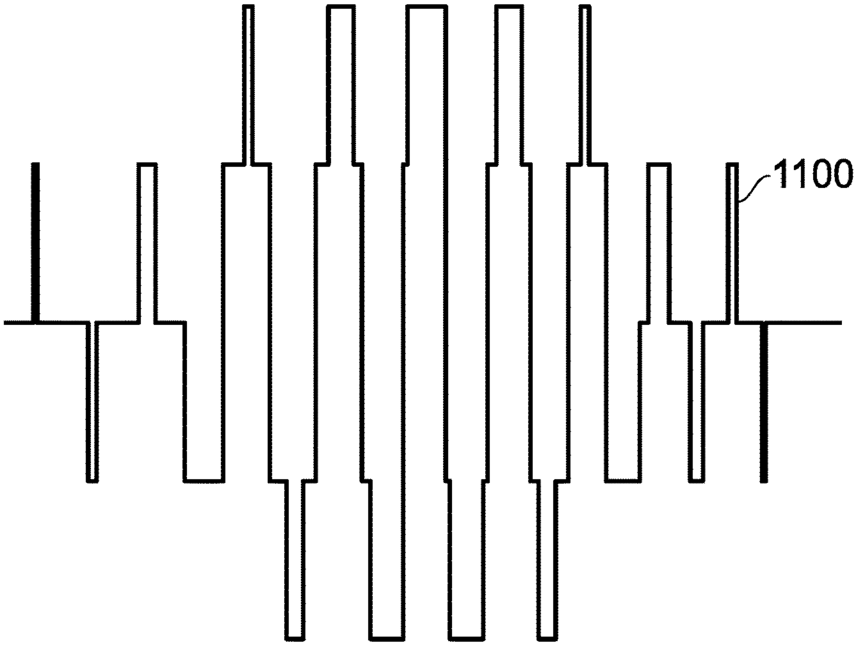
FIG. 11 illustrates a pulsed drive signal approximation to the analogue modulating signal of FIG. 10 generated according to an embodiment of the present invention.

In the design process for an optimised carrier signal, a positive and negative version of the amplitude function or window is generated (lines 900 and 902 in FIG. 9 cutting across the carrier signal constituents 800) and the carrier signal constituents 800 are compared alternately to the positive and negative versions of the amplitude function. Positive and negative comparisons can be alternated by using the sign of the modulating signal. FIG. 10 illustrates a LFM chirp modulating signal 1000: the ideal analogue signal which is to be approximated by the pulsed drive signal. FIG. 11 shows the resulting pulsed drive signal 1100 generated using the carrier signal of FIG. 8 in accordance with an embodiment of the present invention.

It will be appreciated that other combinations of window functions, frequency modulation of the carrier signal and phase shifts applied to the carrier signal relative to the modulating signal can be used in accordance with embodiments of the present invention. To achieve this, the frequency and phase information is included within the carrier signal, and a desired amplitude function is replicated to describe both positive and negative components. In accordance with one embodiment of the invention the process of generating a pulsed drive signal can be summarised as follows:

- Generate a frequency coded modulating signal (s(t)) of desired duration, centre frequency and bandwidth.
- Define a carrier signal constituent of the same duration, centre frequency, and bandwidth (but with a π/2 phase shift). The shape of the carrier signal may be selected according to a particular ultrasound transducer to which the drive signal is to be applied, as described above in connection with FIGS. 4 to 6.
- Scale and level shift the carrier signal components so they are contiguous and describe the range −1 to 1. The number of components is selected according the desired number of levels within the pulsed or stepped drive signal.
- Generate an appropriate window function, for instance the well-known Hann, Hamming or Raised Cosine window functions.
- Create positive and negative versions of the window function $W_{POS}$, $W_{NEG}$ respectively.
- Use s(t) to switch between comparisons of the positive window function to the positive carrier signal components, and comparisons of the negative window function to the negative carrier signal components in accordance with equation (4).

$$PWM(t) = \begin{cases} \text{if} \quad s(t) \geq 0 & \\ \quad \begin{array}{lll} 1 & \text{if} & w_{POS}(t) \geq c_{POS2}(t) \\ 0.5 & \text{else if} & w_{POS}(t) \geq c_{POS1}(t) \\ 0 & \text{else} & \end{array} & \\ \text{else} & \\ \quad \begin{array}{lll} -1 & \text{else if} & w_{NEG}(t) \leq c_{NEG2}(t) \\ -0.5 & \text{else if} & w_{NEG}(t) \leq c_{NEG1}(t) \\ 0 & \text{else} & \end{array} & \end{cases} \quad (4)$$

In alternative embodiment of the invention, in place of a carrier comparison technique a direct modulation scheme may be applied to a frequency coded modulating signal, in which the direct modulation takes account of the frequency modulation to obtain the same beneficial control over pulse position and pulse abundance per half cycle in the resulting pulsed drive signal. Specifically, the direct modulation may use the frequency variation in the modulating signal to determine pulse positioning within the pulsed drive signal. The modulating signal may also be used to switch between positive and negative pulses in the pulsed drive signal.

The generation of pulsed drive signals using the techniques highlighted above in order to generate drive signals, and the resulting ultrasound pressure waves have been both simulated and experimentally verified by the present inventors. An example of the results of the simulation and the experimentation is presented below. The experiments were conducted using a custom imaging system (University of Leeds Ultrasound Array Research Platform—UARP) and a 0.2 mm Needle Hydrophone (Precision Acoustics, Dorchester, UK) to be used as a broadband receiver and a LeCroy WaveRunner Oscilloscope to digitise the output of the hydrophone with the results saved for offline processing in MATLAB (Mathworks, Natick, Mass., USA). The UARP apparatus is designed and built by the University of Leeds and described in greater detail in P. Smith et al., "A PLL-Based Phased Array Method to Minimize Phase Quantization Errors and Reduce Phasing-Lobes", IEEE Ultrasonics Symposium (IUS), 2010, pp. 1837-1840 and also P. Smith et al, "Ultrasound Array Transmitter Architecture with High Timing Resolution using Embedded Phase-Locked Loops", Ultrasonics, Ferroelectrics and Frequency Control, IEEE Transactions on, vol. 59, no. 1, pp. 40-49, January 2012. Pulsed drive signals were generated with a 100 MHz sampling frequency. Experimental results were obtained using the UARP system in conjunction with either a linear array transducer (4.8 MHz centre frequency, 128 Elements, L3-8, Prosonic, Korea), or a single element immersion transducer with central frequency 0.5 MHz, element diameter of 25.4 mm (1 inch) and a far field distance of 52.7 mm. Measurement of the one-way transmitted ultrasound wave from each transducer type was performed using needle hydrophones (0.2 mm or 1.0 mm, Precision Acoustic, UK). For each measurement the hydrophone and transducer were aligned and placed within a tank of deionised and filtered water. Simulated results were obtained using MATLAB when the pulsed drive signal is convolved with a measured impulse response from the appropriate transducer (to simulate the filtering effect of the transducer).

Figure 12:
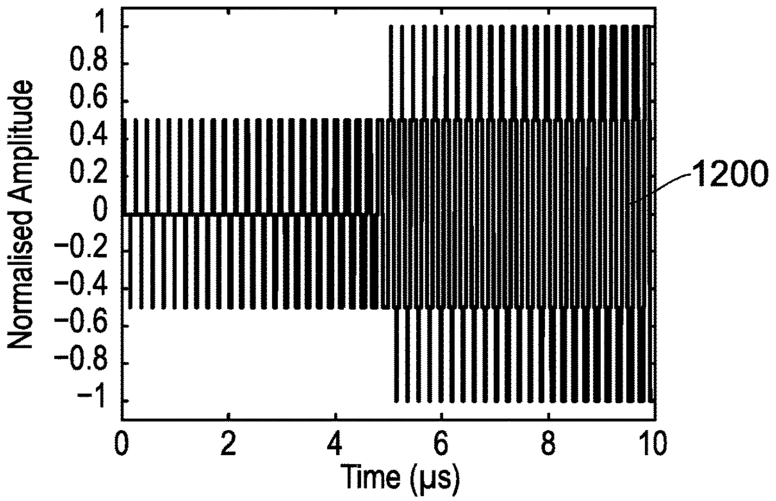
FIG. 12 illustrates a pulsed drive signal generated from a 4.8 MHz single frequency tone burst with a linearly increasing applied amplitude ramp modulating signal generated to an embodiment of the present invention.
Figure 13:
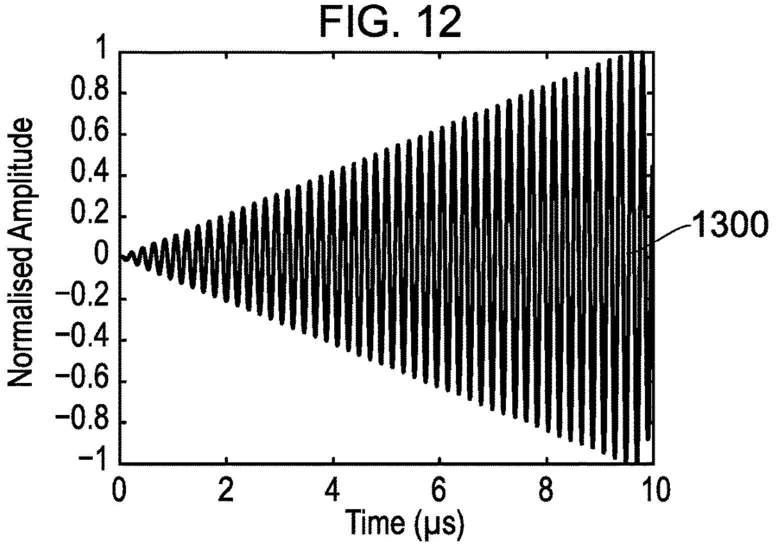
FIG. 13 is a simulation of the output pressure from an ultrasound transducer when driven by the pulsed drive signal of FIG. 12.
Figure 14:
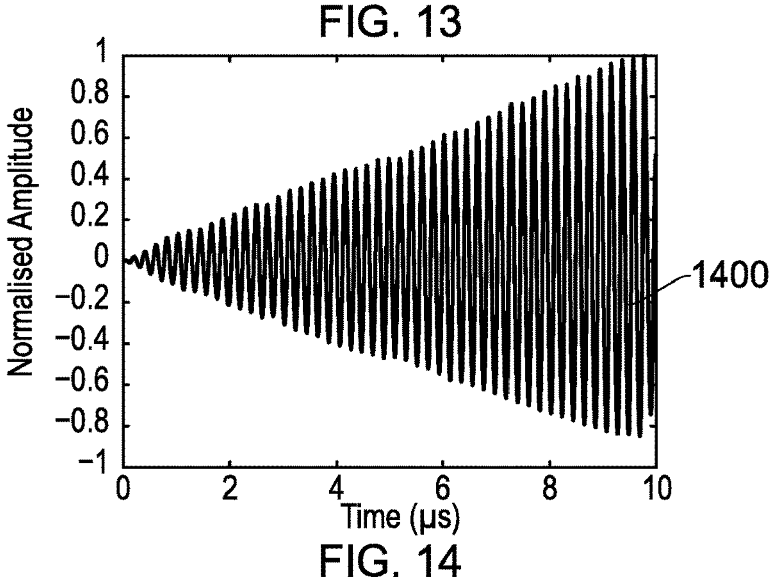
FIG. 14 is an experimentally measured plot of the output pressure from an ultrasound transducer when driven by the pulsed drive signal of FIG. 12.

FIG. 12 shows a pulsed drive signal 1200 at 4.8 MHz centre frequency and 10 μs duration, with a linearly increasing ramp amplitude signal applied in order to demonstrate linear control of output pressure amplitude. FIG. 13 shows the simulated ultrasound normalised output pressure 1300 and FIG. 14 shows the experimental measured ultrasound normalised output pressure 1400. It can be seen that there is a good match between the simulated output 1300 from the transducer and the experimentally measured result 1400. A slight difference between positive and negative amplitude of the experimentally measured output pressure 1400 can be seen in FIG. 14 due to non-linear propagation of the ultrasound. Other arbitrary amplitude functions can be applied and measured/simulated.

Figure 15:
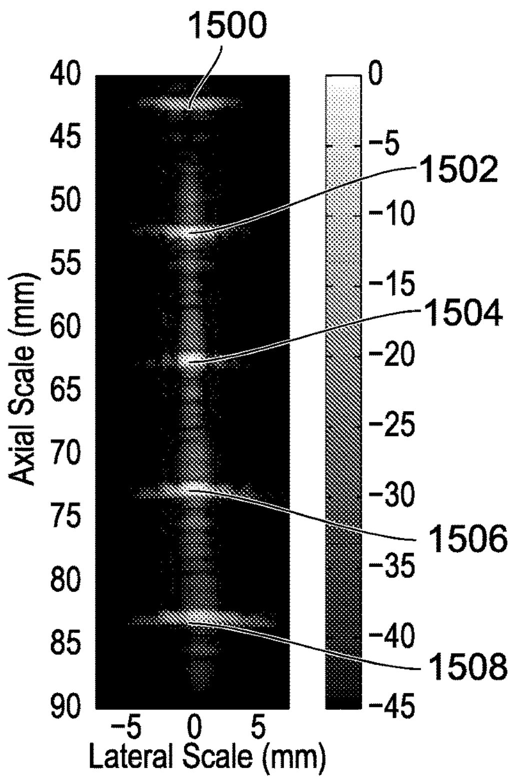
FIG. 15 is an image of a wire phantom generated using an imaging ultrasound transducer when driven by a bipolar (fixed width) pulsed drive signal (a pseudo-chirp signal) with a frequency varying linearly from 4-6 MHz during the drive signal burst, and with the reflected signal strength plotted on a log scale.
Figure 16:
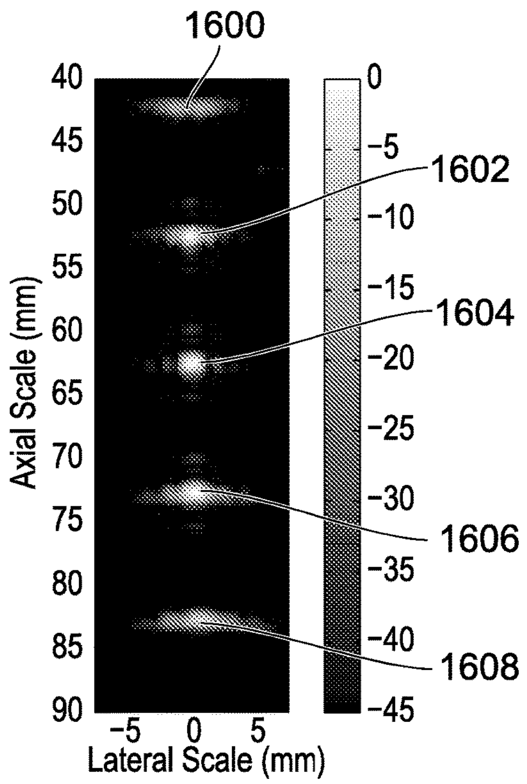
FIG. 16 is an image of a wire phantom generated using an imaging ultrasound transducer when driven by a five level pulsed drive signal generated according to an embodiment of the present invention with a frequency varying linearly from 4-6 MHz during the drive signal burst and with an applied Hamming amplitude window, and with the reflected signal strength plotted on a log scale.
Figure 17:
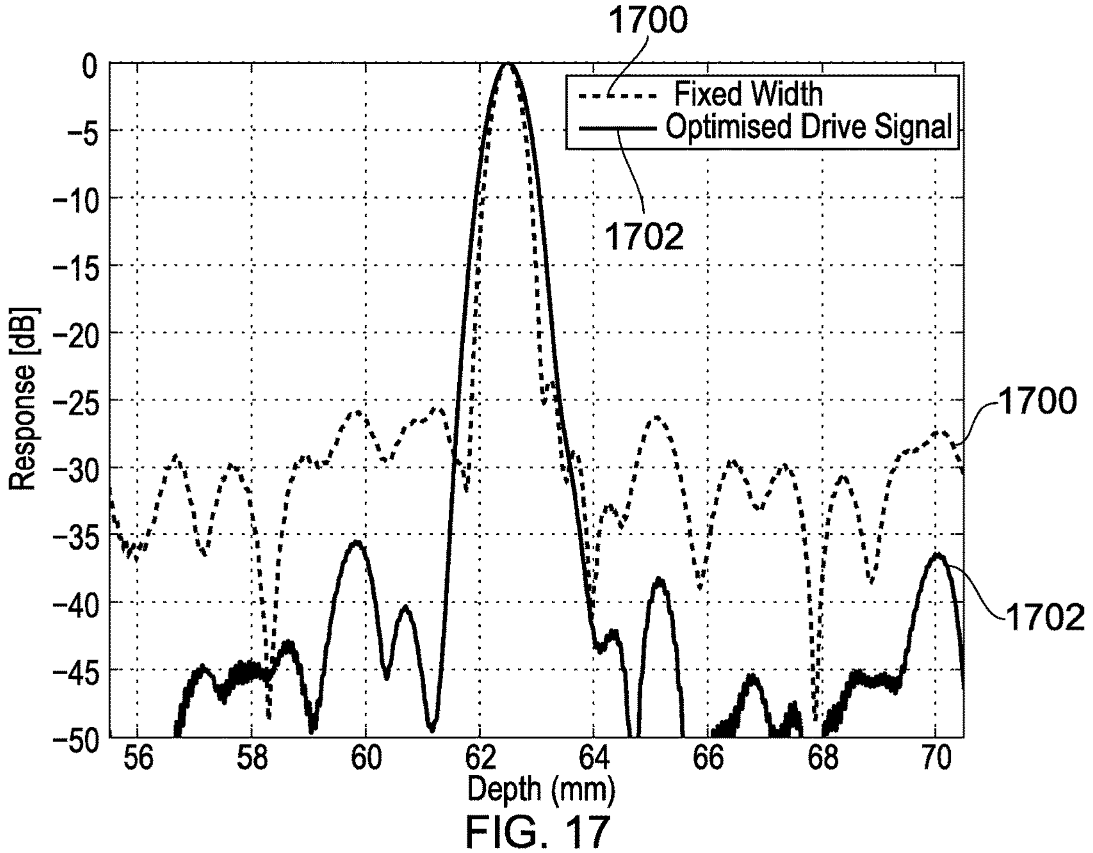
FIG. 17 illustrates the magnitude of the reflected ultrasound signals from the images of FIGS. 15 and 16 taken through a central wire along a vertical axis and plotted on a log scale.

In order to demonstrate the application of coding to the drive signal, for instance a LFM chirp signal, the results of experiments to image a wire phantom model using a pulsed drive signal are shown in FIGS. 15 to 17.

In these images, a wire phantom consisting of five wires submerged in water and separated by 1.27 mm was constructed, and imaged with a linear array transducer. Coded pulsed drive signals with tapering functions applied were used to excite 96 elements of a linear imaging transducer (128 Elements, L3-8, Prosonic, Korea). An aperture of 48 elements is sequentially moved across the 96 elements, with a focused beam (focal point 60 mm) transmitted toward the wire phantom. The transducer array was arranged transverse to the wires and above the wires such that the wires are spaced apart below the array and running across the array. The same 48 elements of the aperture was used in receive. The raw radio frequency data was then apodised and beamformed according to standard delay and sum principles to form a single line focused to 60 mm. The number of lines formed is equal to the total number of elements minus the size of the aperture, plus 1 (in this case 49 lines). A matched filter (the time reversed complex conjugate of the ideal desired windowed chirp) was applied to the beam-formed line to compress the coded signal. The applied matched filter was weighted in the time domain to reduce near sidelobes.

FIG. 15 shows an image of the wires 1500, 1502, 1504, 1506, 1508, representing a cross section through the wires, generated using a fixed width pulsed chirp drive signal for comparison (also referred to as a bipolar drive signal or a pseudo-chirp signal). The fixed width drive signal used to generate the image of FIG. 15 is generated by setting the drive signal to a positive maximum when the modulating signal is positive and the drive signal to a negative maximum when the modulating signal is negative. FIG. 16 shows an image of the wires 1600, 1602, 1604, 1606, 1608 generated using a pulsed drive signal which is generally the same as that shown in FIG. 11 and generated using a carrier signal similar to that of FIG. 9 according to an embodiment of the present invention. The carrier signal constituent waveforms were also optimised to give a linear ultrasound output pressure response for the selected transducer. Both drive signals were LFM chirp signals ranging from 4-6 MHz. The drive signal for FIG. 16 has a Hamming amplitude window function applied to the chirp. It is not possible to apply an amplitude window function to the fixed width drive signal of FIG. 15.

FIGS. 15 and 16 show the experimentally obtained images of the wire phantom plotted with a 45 dB dynamic range. Each of the 5 wires 1500-1508, 1600-1608 appears as a bright spot. Only one of the wires (the centre wire 1504, 1604) appears at the focal point, with the result that the other wires that are not in focus appear blurred. The drive signal used for both FIGS. 15 and 16 is a Hamming windowed chirp of 3.5 MHz centre frequency, 1 MHz bandwidth, and 10 μs duration. The pulsed sequences have been generated with 100 MHz sampling frequency.

For the fixed width pulse results shown in FIG. 15, high sidelobes are apparent between the wires. These appear as lighter grey regions. In comparison, the pulsed drive signal of FIG. 16 in accordance with an embodiment of the present invention has much reduced sidelobes, though the wire at the focal point (seen at approximately 65 mm in the reconstructed image) shows a decrease in axial resolution. This is as a consequence of the windowing function and is expected as described in a variety of literature on pulse compression and signal coding (this being missing from FIG. 15 where a widowing function is not used).

The drive signals used to generate the images of FIGS. 15 and 16 are both switched-mode square wave excitations which are subject to the same band-pass characteristics of the transducer and also have the same weighted filter applied. Any difference between the sidelobe level and the main lobe width between the images of FIGS. 15 and 6 is therefore as a result of the different pulse sequences, and so the improvements in the clarity of ultrasound imaging in accordance with embodiments of the present invention can be observed.

Sidelobe levels are compared in FIG. 17 by plotting the central line of the image which intersects the five wires through the centre wire as this appears at the focal point of the transducer array. FIG. 17 that the side lobes are significantly reduced throughout most of the plot of FIG. 17 for the five level pulsed drive signal 1702 (the lower line) compared with the results for the bipolar drive signal 1700. The experimental result of FIG. 17 is confirmed by simulation of the imaging conducted using MATLAB as described above.

As discussed above, switched mode operation of an ultrasound transducer (including through the use of carrier signal optimisation techniques discussed above) advantageously allows the miniaturisation of ultrasound transmitter circuits. However, as is well known in the art, switched mode excitation to approximate an analogue excitation signal introduces unwanted harmonics and harmonic distortion.

Harmonic distortion in an ultrasound drive signal creates harmonic distortion in the ultrasonic wave. During tissue harmonic imaging (THI), an ultrasound wave at the fundamental frequency interacts with biological tissue or contrast agents generating harmonics. THI takes relies upon the accurate reception of the reflected harmonics. The presence of harmonics in the transmitted ultrasound wave will reduce image contrast during THI. It can be desirable to reduce the harmonic content of an ultrasound drive signal. In particular, it can be desirable to selectively eliminate particular harmonic components from a pulsed drive signal applied to an ultrasound transducer.

An ideal analogue tone excitation signal is harmonic and distortion free and is described by equation (5)

$$f(x)=V\sin(\phi t) \tag{5}$$

V is the peak voltage, ω=2πf and f is frequency.

Figure 19:
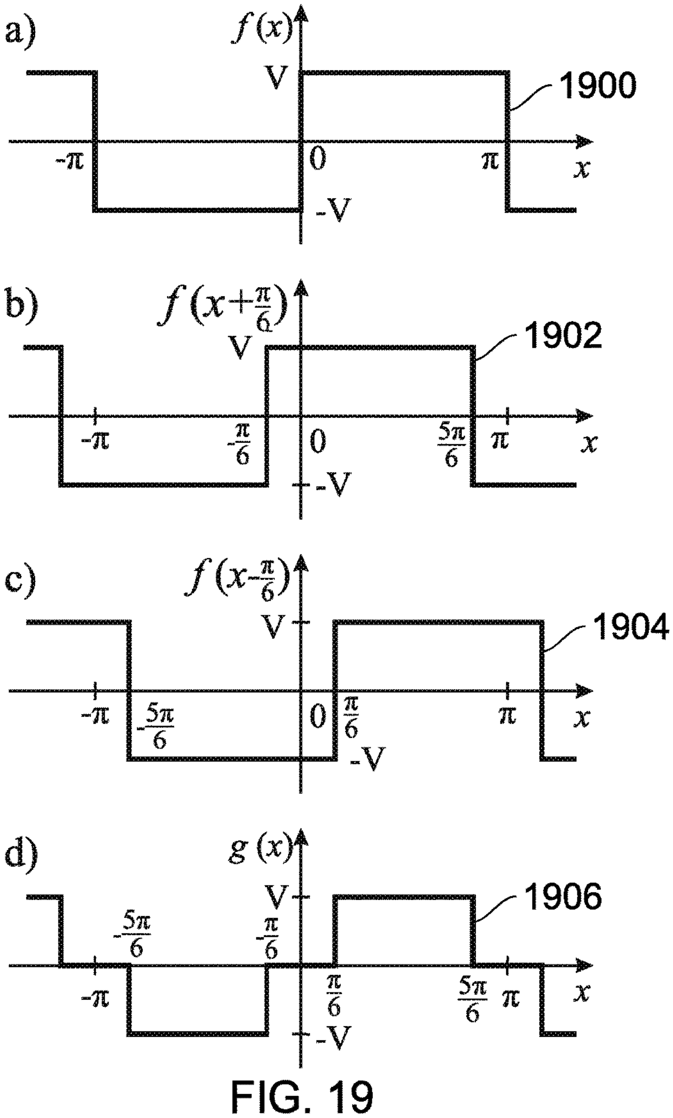
FIG. 19 illustrates Selective Harmonic Elimination (SHE) applied to a bipolar switched tone drive signal to generate a three level pulsed drive signal.

A pulsed approximation of an analogue tone excitation signal, termed a bipolar switched tone excitation signal (illustrated as pulsed signal 1900 in FIG. 19 part (a)), can be generated by applying the signum function of equation (6) to the waveform of equation (5) and results in a square wave having the same frequency f and which is at +V for half the pulse period and at −V for the other half of the pulse period $$\operatorname{sgn}(x)=\begin{cases}-1 & x<0\\ 0 & x=0\\ 1 & x>0\end{cases} \tag{6}$$

Figure 18:
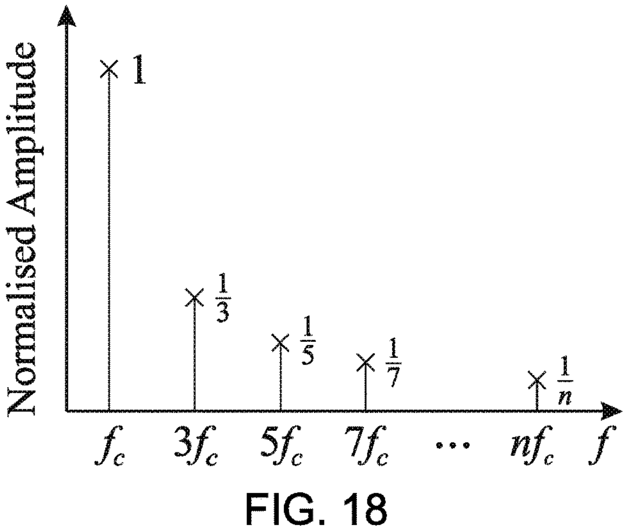
FIG. 18 illustrates the spectrum of a bipolar switched tone drive signal.

Fourier series analysis performed upon the resulting bipolar switched tone excitation signal shows that the bipolar switched tone excitation signal contains energy at all odd harmonics (3rd, 5th, etc.) as illustrated by the line spectrum shown in FIG. 18.

Total harmonic distortion (THD) is a metric commonly used to compare the energy of the fundamental frequency to the total energy contained in all other harmonics. THD is defined by equation (7). Applying equation (7) to a bipolar switched tone drive signal gives a THD of 0.473 (the amplitude of the fundamental frequency $f_c$ being normalised to 1), which is high due to the large third, fifth and seventh harmonics (0.42, 0.25, 0.18).

$$THD = \sqrt{\frac{\sum (\text{amplitude of all harmonic voltages})^2}{(\text{amplitude of the fundamental voltage})^2}} \tag{7}$$

Particular harmonic components can be removed from a periodic pulsed or stepped waveform through a process of Selective Harmonic Elimination (SHE) using a process of phase inversion. When a periodic waveform is shifted in phase (or time) the amplitude of the waveform's spectrum remains unchanged but the phase of the spectrum is shifted. Phase inversion of a harmonic frequency, n, and integer multiples thereof (2n, 3n, etc.) can be achieved by phase shifting a waveform with period 2π radians by an angle of θ where θ is defined by equation (8).

$$\theta = \frac{\pi}{n} \tag{8}$$

Addition of the original and phase shifted waveforms eliminates the selected harmonic, and integer multiples thereof, as the harmonics are inverted. The resulting waveform is shifted in phase by θ/2 and doubled in amplitude. The absolute phase and symmetry of the original waveform can be maintained by adding together two waveforms, phased shifted by ±θ/2, and then halving the amplitude of the resulting waveform.

Performing this process of SHE on periodic switched waveforms allows the selective elimination of harmonics, improving THD, but at the cost of introducing new switching levels, as shown in FIG. 19 as will now be described.

Selective third harmonic cancellation of the bipolar square waveform 1900 using the above described technique is achieved by the addition of two similar bipolar square waveforms with phase shifts of δ=±π/6. FIG. 19 part (a) shows the bipolar square waveform 1900 which contains all odd harmonics (as illustrated in FIG. 18). Parts (b) and (c) show the two phase shifted waveforms 1902, 1904. Part (d) shows the resulting waveform 1906 which introduces a third voltage level equal to zero due to cancellation of the waveforms of (b) and (c) between ±π/6.

Fourier series analysis performed on the waveform 1906 of FIG. 19 part (d) allows the calculation of the harmonics present after third harmonic cancellation is applied to the bipolar switched signal. The THD of waveform 1906 of FIG. 19 part (d) is 0.3 which compares favourably to the THD of FIG. 19 part (d) noted above (0.473). Application of SHE for the third harmonic through the addition of a third switching level reduces the amplitude of the fundamental frequency from 1.27 to 1.10, but, the third harmonic and integer multiples thereof ($3^{rd}$, $6^{th}$, $9^{th}$, $12^{th}$, $15^{th}$ etc.) are completely eliminated. If the power of the harmonics are normalised to the power of the fundamental, it is found that elimination of the third harmonic has no effect on the amplitude of the remaining harmonics ($5^{th}$, $7^{th}$, $11^{th}$, $13^{th}$, $17^{th}$, $19^{th}$ etc.).

Figure 20:
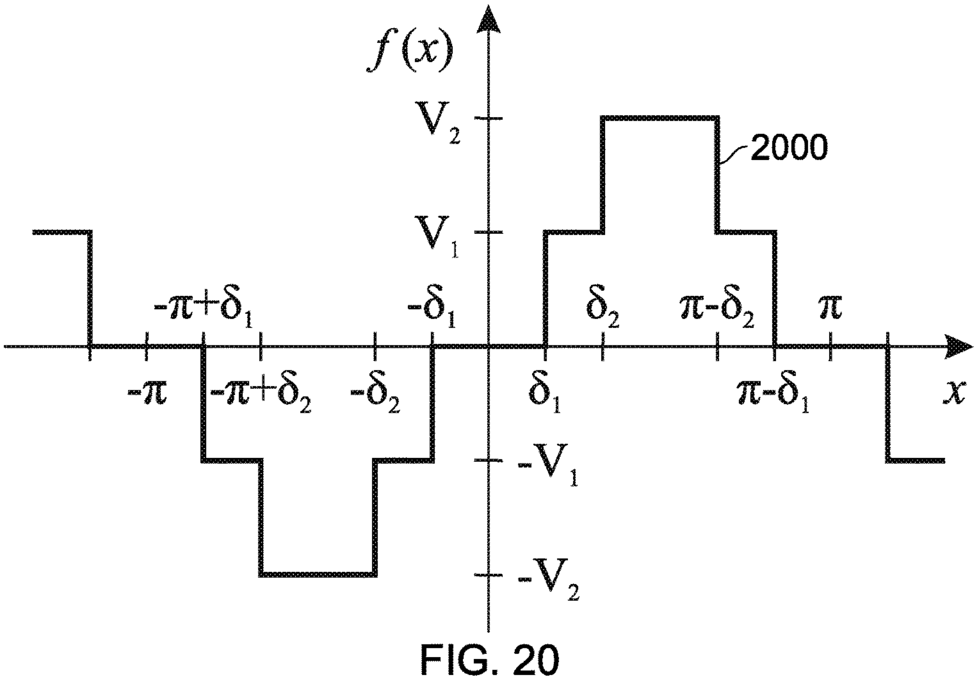
FIG. 20 illustrates the result of applying SHE to the three level pulsed drive signal of FIG. 19 to generate a five level pulsed drive signal.

SHE can be applied multiple times to a waveform in order to successively remove undesired harmonics and reduce THD, at the expense of introducing additional switching levels. For instance, if SHE is applied twice to the bipolar switched waveform 1900 the result is a five level waveform 2000 as shown in FIG. 20. Fourier series analysis performed on waveform 2000 of FIG. 20 proves a further reduction in the THD to 0.164 (compared with 0.300 for the three level waveform with third harmonic cancellation and 0.473 for the bipolar two level waveform without harmonic cancellation). The third and fifth harmonics (and integer multiples thereof: $6^{th}$, $9^{th}$, $10^{th}$, $12^{th}$, $15^{th}$ etc.) are completely eliminated, and the amplitude of the $7^{th}$, $13^{th}$ and $17^{th}$ harmonics is reduced.

Figure 21:
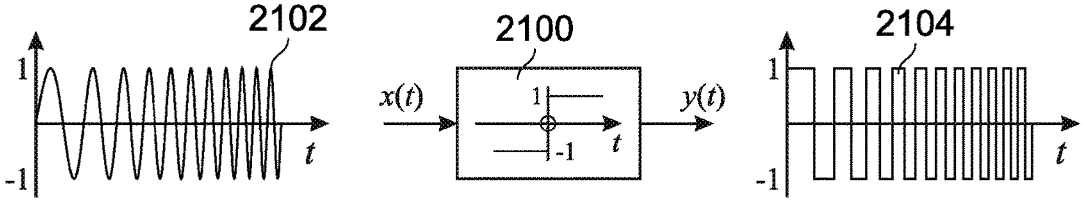
FIG. 21 illustrates the generation of a bipolar switched LFM drive signal.

SHE may be applied to an LFM signal. As illustrated in FIG. 21, application of the signum function of equation (6) (schematically represented by box 2100) to an analogue LFM signal 210 defined by equation (9) generates a bipolar switched LFM signal 2104 as illustrated in FIG. 21.

$$x(t) = \begin{cases} V\sin\left[2\pi\left(\frac{B}{2T}t^2 + \left(f_c - \frac{B}{2}\right)t\right)\right] & 0 \le t \le T \\ 0 & \text{otherwise} \end{cases} \tag{9}$$

V is the signal amplitude, B is bandwidth, T is duration and $f_c$ is the central frequency.

The bipolar switched LFM signal suffers from high spectral distortion. In order to apply SHE to the bipolar switched LFM signal the spectral properties of the bipolar switch LFM signal must be established. Due to the presence of a time squared term, the LFM signal is not periodic and cannot be described by a Fourier series or represented as a line spectrum. Additionally, the signum function is nonlinear; hence, the switched bipolar LFM waveform cannot be described in a closed form in either the time or frequency domains. The present inventors have identified a heuristic derivation of the spectral properties of multilevel switched LFM signals. This approach uses the Fourier coefficients, $a_n$, $b_n$, calculated for a tone burst and applies a time transformation from linear to quadratic to modulate the LFM signal. Expressions for the bandwidth and spectral amplitude of the energy at harmonics of the fundamental can be derived and time domain LFM waveforms can be reconstructed based upon this theory.

First, consider the LFM waveform, x(t), defined by equation (9). As the bandwidth approaches zero the waveform approaches that of a tone as defined by x'(t) as shown in equation (10).

$$x(t) = \sin\left[2\pi\left(\frac{B}{2T}t^2 + \left(f_c - \frac{B}{2}\right)t\right)\right] \xrightarrow[B \to 0]{} x'(t) = \sin[2\pi(f_c t)] \tag{10}$$

Application of the signum function to x'(t) defines a bipolar switched tone waveform according to equation (11).

$$v(t) = \mathrm{sgn}(x'(t)) \tag{11}$$

The bipolar switched tone waveform, v(t), of equation (11) can be expressed by the Fourier series representation defined by equation (12).

$$v(t) \approx \sum_{n=1}^{\infty} \underbrace{\frac{2V}{\pi n}[1-\cos(n\pi)]}_{Amplitude}\sin\left(2\pi \underbrace{nf_c}_{Harmonic} t\right) \tag{12}$$

A transformation is required such that the phase of x'(t), a zero bandwidth LFM signal, is equal to the phase of the original LFM waveform with non-zero bandwidth, x(t). From equation (10), the phase transformation can be defined by equation (13).

$$2\pi f_c t \rightarrow 2\pi\left(\frac{B}{2T}t^2 + \left(f_c - \frac{B}{2}\right)t\right) \tag{13}$$

The transformation in phase can be represented as a transformation in time such according to equation (14).

$$t \rightarrow \frac{B}{2f_cT}t^2 + \left(1 - \frac{B}{2f_c}\right)t \tag{14}$$

Using this time transformation, the Fourier series representation of a bipolar switched tone signal, defined by equation (12), can be modulated to describe a bipolar switched LFM signal, y(t) according to equations (15) and (16)

$$y(t) \approx v\left(\frac{B}{2f_cT}t^2 + \left(1 - \frac{B}{2f_c}\right)t\right) \tag{15}$$

$$y(t) \approx \sum_{n=1}^{\infty} \frac{2V}{\pi n}[1-\cos(n\pi)]\sin\left(2\pi n\left[\frac{B}{2T}t^2 + \left(f_c - \frac{B}{2}\right)t\right]\right) \tag{16}$$

SHE can be directly applied to the approximation y(t) to yield three or five level switched LFM waveforms where each pulse cycle is similar to those shown in FIGS. 19 and 20 for single frequency bipolar switched signals.

For a bipolar switched frequency coded signal where the bandwidth of the fundamental is non-zero, for instance an LFM signal, the energy is spread across the bandwidth of the signal. In addition, the bandwidth of each harmonic increases such that the bandwidth of the $n^{th}$ harmonic is n times that of the fundamental. This spectral spreading of the harmonics means the Fourier series coefficients do not equal the spectral amplitude of each harmonic for LFM waveforms. It is known that the energy contained in each harmonic remains constant for any value of n when transforming between domains according to equation (17).

$$\int_{-\infty}^{-\infty} x^2(t)dt = \int_{-\infty}^{-\infty} |X(f)|^2 df \qquad 17)$$

Figure 22:
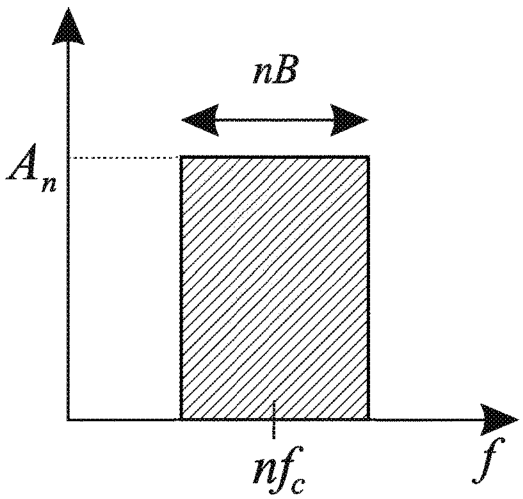
FIG. 22 illustrates the spread spectrum form of the $n^{th}$ harmonic of the bipolar switched LFM drive signal of FIG. 21.

The spectral amplitude, $A_n$, for the $n^{th}$ harmonic is determined by the bandwidth, nB, over which the total energy contained is spread for a given harmonic, n, as illustrated in FIG. 22 where $nf_c$ is the central frequency of the $n^{th}$ harmonic. The energy in a given harmonic remains constant as the bandwidth changes according to equation (18). Therefore it follows that the amplitude of the $n^{th}$ harmonica can be calculated according to equation (19).

$$A_n^2 Bn = \text{constant} \tag{18}$$

-continued $$A_n \propto \frac{1}{\sqrt{n}} \tag{19}$$

The spectral amplitude of each harmonic in a switched LFM signal is 1/√n times that of the same harmonic in the switched tone signal.

From equation (12) the spectral amplitude of each harmonic in a bipolar switched LFM signal can be expressed according to equation (20)

$$A_n = \frac{1}{n}[1-\cos(n\pi)]\frac{1}{\sqrt{n}} \tag{20}$$

Since the amplitude of even harmonics is zero due to the (1−cos(nπ)) term the normalised spectral amplitude can be expressed according to equation (21).

$$A_n = \begin{cases} \frac{1}{n\sqrt{n}} & \text{for all even } n \\ 0 & \text{for all odd } n \end{cases} \tag{21}$$

Figure 23:
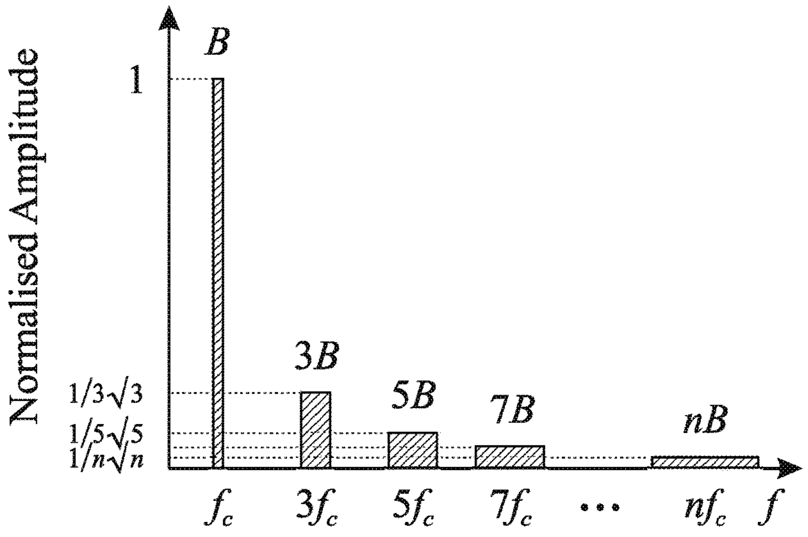
FIG. 23 illustrates the spectrum of a bipolar switched LFM drive signal.

The spectrum of a two level bipolar switched LFM waveform, y(t), can be interpreted graphically as shown in FIG. 23. Comparison of FIG. 23 with FIG. 18 reveals that the effect of frequency modulating the bipolar switched waveform is to reduce the amplitude of the fundamental and each harmonic, while spreading the bandwidth of the fundamental and each harmonic. The THD is also reduced relative to bipolar switched tone waveforms.

The spectral amplitude of each harmonic, $A_n$, and THD for two, three and five level switched LFM waveforms can be calculated. Due to harmonic bandwidth spreading, the amplitude of each harmonic and the THD are both less than that of switched tone waveforms. The application of SHE to bipolar switched LFM waveforms provides the same benefits in terms of reduction of reduction of the THD and elimination of selected harmonics at the expense of an increase in the number of switching levels as illustrated by FIG. 24.

Figure 24:
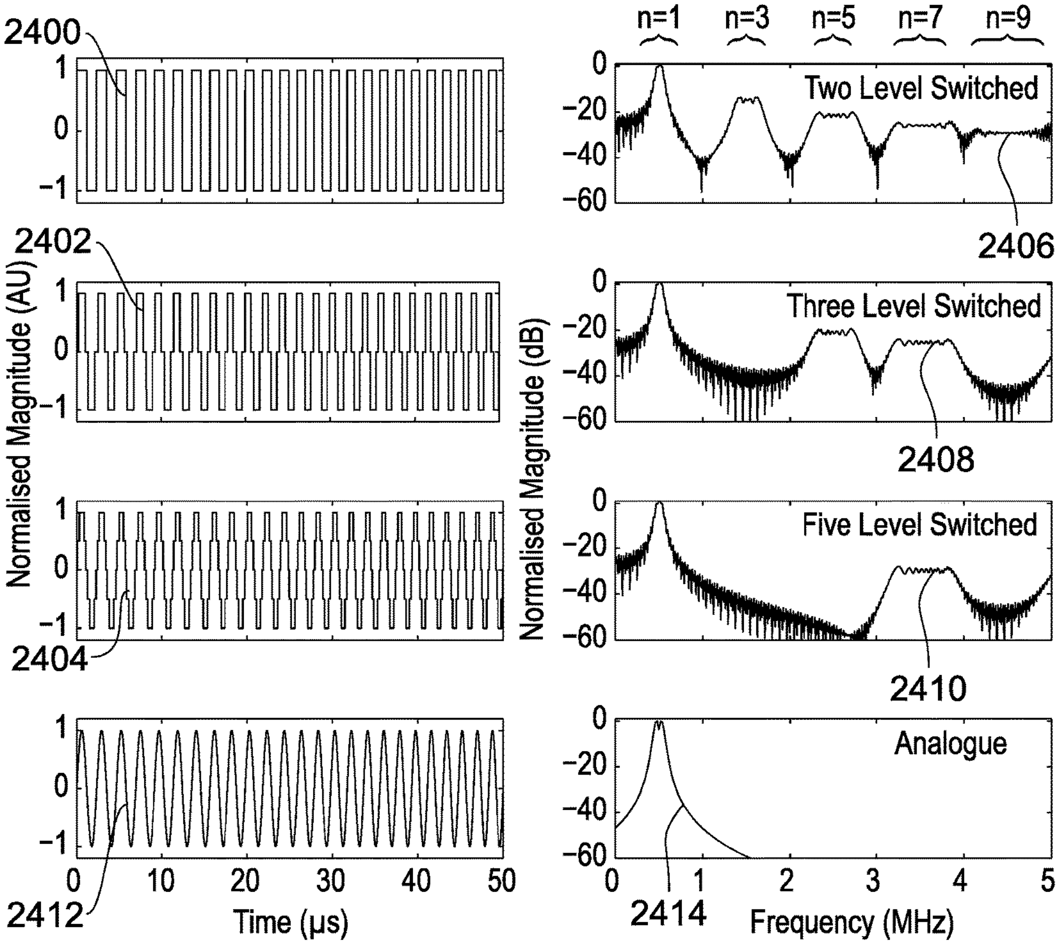
FIG. 24 illustrates simulated waveforms and corresponding spectra for an analogue LFM drive signal and a bipolar switched LFM drive signal, and three and five level pulsed LFM drive signals generated using SHE.

FIG. 24 illustrates two, three and five level switched LFM waveforms (2400, 2402 and 2404 respectively) and their associated spectra (2406, 2408, 2410 respectively) generated through simulation. For comparison, the corresponding analogue LFM waveform 2412 and its spectrum 2414 are also shown. Distortion visible in the seventh and ninth harmonics of the two level switched waveform 2400 is caused by the seventh, ninth and eleventh harmonics overlapping due to bandwidth spreading. Examination of the spectra shows cancellation of the third and ninth harmonics, centred at 1.5 MHz and 4.5 MHz, for three level switched excitation, and cancellation of the third, fifth and ninth harmonics, centred at 1.5 MHz, 2.5 MHz and 4.5 MHz, for five level switched excitation.

SHE has been described above as being applicable to both tone and LFM excitation using multilevel switched waveforms. Once the required number of levels and associated switching angles has been selected to achieve elimination of the unwanted harmonics, a phase or voltage threshold comparison technique may be used to calculate the actual switched waveforms.

Figure 25:
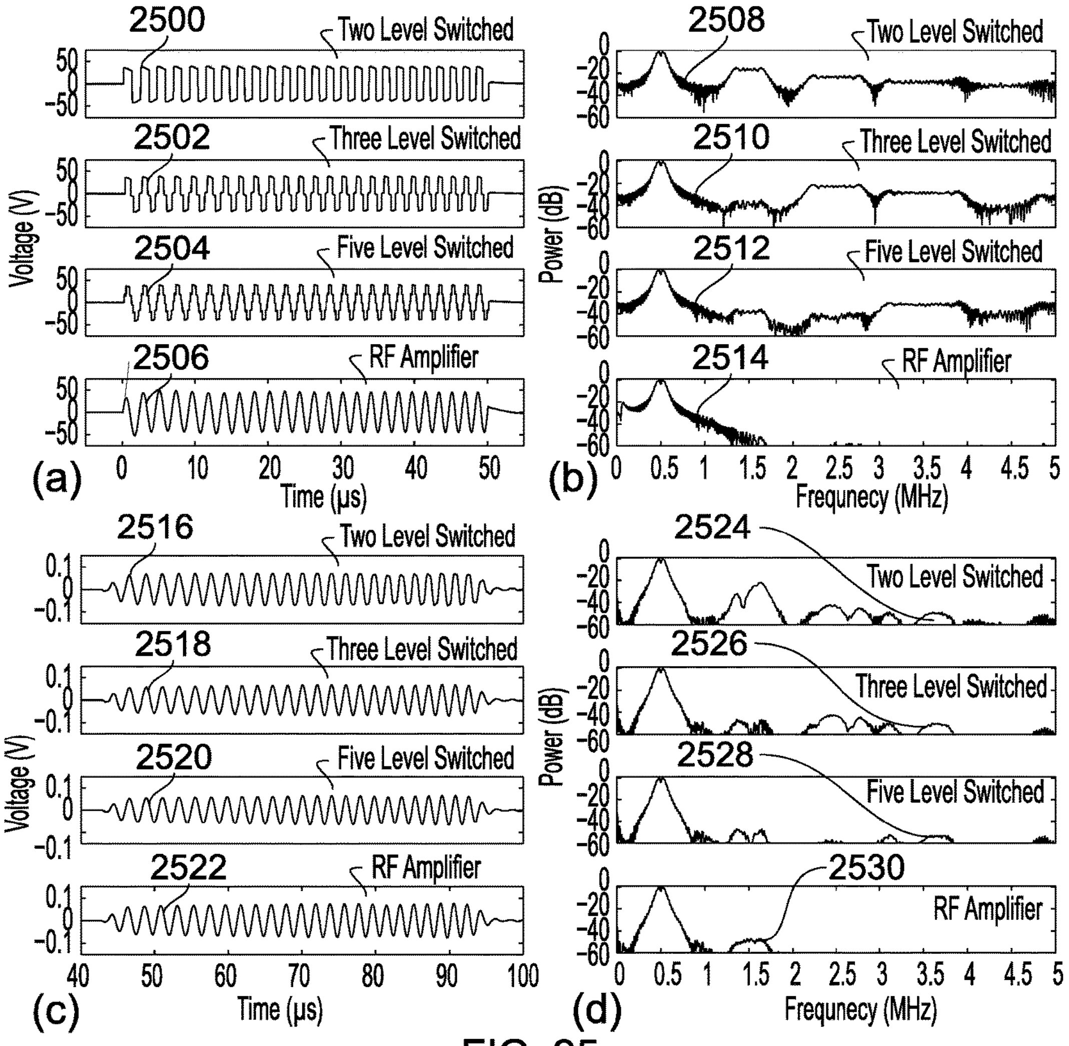
FIG. 25 illustrates at part (a) generated analogue and bipolar LFM drive signals, and three and five level pulsed LFM drive signals generated using SHE; at part (b) the corresponding spectra of the LFM drive signals of part (a); at part (c) the voltage output from a hydrophone which has received an ultrasound signal from a coupled ultrasound transducer which is driven by the LFM drive signals of part (a); and at part (d) the corresponding spectra of the hydrophone output signal.

SHE techniques for switched waveforms in accordance with embodiments of the present invention can be assessed experimentally. The harmonic content of an ultrasound wave generated by exciting an ultrasound transducer immersed in water can be assessed for the two, three and five level switched waveforms and the analogue waveforms generated using an arbitrary waveform generator and power amplifier for both tone and LFM drive signals. FIG. 25, described below, shows the experimentally obtained results for LFM drive signals corresponding to the simulation results illustrated in FIG. 24.

As discussed previously, bipolar and multilevel switched drive signals can be created using MOSFETs provided with driver circuit to interface to low voltage digital circuits for instance microprocessors or field programmable gate arrays (FPGAs). Semiconductor manufacturers have combined multiple MOSFETs and driver circuits into single semiconductor packages forming highly integrated and miniaturised ultrasound excitation circuits. The experiments were performed using the Maxim MAX4811 which is an integrated circuit that contains eight MOSFETS and driver circuits to allow unipolar or bipolar excitation of two channels with a peak to peak voltage of 220 volts and current of 1.3 amps in a 7×7 mm surface mount package. Each channel features an active clamp circuit to ground the output allowing three level excitation at ±110 and 0 volts. As the power supply to each channel is independent, both channels can be combined to create a single channel five level excitation circuit operating at ±110, ±55 and 0 volts as required for third and fifth harmonic cancellation.

An Altera Cyclone III FPGA was used to generate the five control signals required to drive the MAX4811 in a five level mode. The FPGA contains a custom digital signal synthesis (DSS) system capable of generating both tone and LFM signals in real time. The DDS system generates a 12 bit signal to which an amplitude threshold scheme was applied to define the three and five level switched drive signals. The FPGA based DDS system operates at 100 MHz and unlike microprocessor based DDS, generates a new output every clock cycle allowing a timing resolution of 10 ns.

The experimental setup was generally the same as that described above in connection with FIG. 14, in which an immersion transducer and a hydrophone are immersed in water. The needle used this time had an active element diameter of 1.0 mm. A custom computerised actuator system was used to align the transducer and hydrophone with a separation of 60.0 mm. A 0.5 MHz immersion transducer was selected to maintain the maximum measured harmonic within the bandwidth of the hydrophone.

The aforementioned MAX4811 based switched drive signal generator was used to excite the transducer with tone and LFM waveforms. The tone waveform had a central frequency of 0.5 MHz and duration of 20 μs, with the burst extending for 10 cycles. The LFM waveform also had a central frequency of 0.5 MHz to allow direct comparison, a bandwidth of 0.15 MHz and duration of 50 μs. The bandwidth was limited for the LFM signals to 0.15 MHz to maintain separation of the high order harmonics. To generate the analogue LFM drive signal the transducer was driven by a programmable function generator (33250A Agilent, 80 MHz, Santa Clara, Calif., USA) with the output amplified by an RF power amplifier (A150 E&I, gain 55 dB, Rochester, N.Y., USA) to 100 $V_{pk-pk}$. During these experiments the excitation voltage was limited to 100 $V_{pk-pk}$ such that the peak pressure ultrasound pressure remained below 100 kPa to minimise harmonics created by the non-linear propagation of the ultrasound wave in water.

Referring now to FIG. 25 this illustrates at part (a) experimentally measured two, three and five level switched LFM drive signals and an analogue LFM drive signal (2500-2506 respectively). The three and five level switched LFM drive signals (2502, 2504) are generated using SHE as described above in accordance with an embodiment of the present invention. At part (b) FIG. 25 illustrates the corresponding measured spectra (2508-2514 respectively) of the LFM drive signals of part (a). Parts (a) and (b) correspond to the simulated results of FIG. 24. Part (c) illustrates the voltage outputs (2516-2522 respectively) from a hydrophone which has received an ultrasound signal from the coupled ultrasound transducer which is driven by the LFM drive signals 2500-2506 of part (a). Part (d) illustrates the corresponding spectra 2524-2530 respectively of the hydrophone output signal. In part (a), discrete voltage levels are clearly visible for the switched LFM drive signals 2502, 2504. The analogue LFM signal 2506 is generated by the RF amplifier and is continuous and sinusoidal.

The spectra 2510, 2512 of the LFM drive signals in part (b) are normalised to the power of the fundamental frequency. The spectra were generated by performing a fast Fourier transform (FFT) on the entire excitation waveform. As for the simulated spectra 2406-2410 in FIG. 24, bandwidth spreading is clearly visible in the switched drive signal harmonics such that the seventh and ninth harmonics begin to overlap in the spectrum 2508 of the bipolar switched (two level) LFM drive signal.

Comparison of the normalised power of the harmonics of the LFM drive signals of part (b) measured experimentally (2524-2530) with the simulated harmonics (2508-2514) reveals that the experimental results conform closely to the simulated results. During two level excitation, the third, fifth, seventh and ninth harmonics are present with powers of −17, −23, −28 and −31 dB compared to −14.3, −21.0, −25.4 and −28.6 dB as predicted. During three level excitation where multiples of the third harmonic are selectively eliminated, the power of the third and ninth harmonics are reduced to −39 and −43 dB from −17 and −31 dB respectively. The fifth and seventh harmonics are −23 and −29 dB respectively compared to the predicted values of −21.0 and −25.4 dB. During five level excitation, the third, fifth and ninth harmonics are selectively eliminated resulting in powers of −39, −43 and −41 dB respectively. The power of the seventh harmonic is −32 dB compared to the predicted value of −29.5 dB. Where a harmonic component is selectively eliminated residual harmonic powers of the order of −30 dB may be considered to be effectively completely eliminated, and so the experimental results of FIG. 25 verify the efficacy of the SHE process of embodiments of the present invention.

Hydrophone measurements show the effect of harmonics in the drive signal on the ultrasound wave generated by the transducer. The waveform measured at the output of the hydrophone for each drive signal is shown in FIG. 25 part (c). The associated spectra are shown in FIG. 25 part (d). The power of the harmonics is significantly less at the hydrophone than in the drive signal. For a two level drive signal the measured power of the third harmonic at the hydrophone is −25 dB. As third harmonic elimination is applied to the drive signal the power of the third harmonic at the hydrophone is reduced to −48 and −49 dB using three and five level drive signals respectively, a reduction of 23 or 24 dB. For two and three level drive signals the power of the fifth harmonic at the hydrophone is −42 dB. As fifth harmonic elimination is applied to the drive signal the power of the fifth harmonic is −57 dB, a reduction of 15 dB.

Comparing the ultrasound harmonics produced by a transducer driven by a five level drive signal with those resulting from a transducer driven by analogue LFM drive signal produced by the RF amplifier shows that the performance of two systems are largely comparable up to the fifth harmonic. This is a very significant improvement through the techniques of SHE over conventional bipolar switched LFM drive signals for ultrasound transducers. The requirement for additional switching levels somewhat increases the complexity and cost of transmitter circuits for ultrasound transducer elements, though this negative effect is minimised through the use of MOSFET technology. The SHE system described above is especially suited to applications where precise control of harmonics are required, for instance harmonic tissue imaging, applications where combining LFM excitation and pulse compression would provide improvements in signal to noise ratio, and applications requiring compact advanced multi-channel excitation, for instance portable phased array imaging systems.

The SHE techniques described above in accordance with embodiments of the present invention apply to the generation of pulsed or stepped ultrasound drive signals in which pulse width, frequency and position are directly related to the frequency of a corresponding tone or LFM analogue signal. Furthermore, the drive signals are at a fixed amplitude. However, as discussed above, it is frequently desirable to be able to generate a pulsed ultrasound drive signal based upon a modulating signal that may be frequency coded and amplitude modulated using a windowing technique, for instance to produce a pulsed drive signal approximation of the modulating signal 1000 illustrated in FIG. 10.

Additionally, as described above, it is desirable to be able to generate a pulsed drive signal in which pulse width is not necessarily linearly related to the amplitude of the modulating signal. There will now be described an extension to the SHE techniques described above. According to an embodiment of the present invention, it is possible to generate a pulsed drive signal which varies in amplitude and which has a reduced harmonic content. Particular embodiments allow the generation of a pulsed drive signal which also: takes account the fundamental response of the ultrasound transducer; and is frequency coded. In particular, there will now be described an embodiment of the present invention in which a carrier signal is optimised to allow the generation of a pulsed drive signal with a reduced third harmonic, and in particular chirp coded, windowed, pulsed drive signals with reduced third harmonic content. It is particularly desirable to be able to reduce the third harmonic content of a transmitted ultrasound signal for Tissue Harmonic Imaging in which the third harmonic of the reflected ultrasound signal may be used for imaging. Also, depending on the bandwidth of the signal, the third harmonic may overlap with the second harmonic thereby distorting a second harmonic image. Additionally, it is desirable to be able to reduce the third harmonic for wider bandwidth ultrasound transducers, including proposed Capacitive Micro-machined Ultrasonic Transducers (as such transducers are more susceptible to transmitting near higher order harmonics including the second and third harmonics). While it is known in the art in fields other than ultrasonics to reduce the second harmonic in order to reduce the THD, it is not known to do so for a sufficiently large bandwidth signal in which the third harmonic can overlap the second harmonic. The second, and all other "even" harmonics are eliminated in transmit by using a bipolar signal, with no DC component. Second harmonic imaging relies on harmonics generated by the medium, for instance human tissue. Therefore if a third harmonic (generated by the transmitter) extends into the second harmonic band then the image will be distorted. This "harmonic leakage" or harmonic overlap can occur in short duration tone burst signals as well as chirp coded sequences. For a very short-time duration signal the bandwidth is large, therefore a method of controlling the large bandwidth to avoid harmonic overlap is to elongate pulse duration thus narrowing the bandwidth of the pulse. For conventional imaging this is disadvantageous as axial resolution is dependent on pulse duration. However, for chirp coded imaging axial resolution is dependent on the bandwidth of the signal. There are additional benefits when using a large time-bandwidth product. Therefore, as chirp signals are longer in duration, harmonics are more distinct then their pulsed equivalents although their −3 dB bandwidths may be equal.

The carrier signal optimisation described above in connection with FIGS. 3 to 6 converts a linear carrier signal to a trigonometric carrier signal (or other arbitrary shape to give a desired relationship between modulating signal amplitude and ultrasound output pressure). This is needed as the fundamental response of an ultrasound transducer to a linear increase in desired modulating signal amplitude, and thus square-wave pulse width, is a trigonometric function (or other function particular to the transducer). The rectified cosine function shown in FIGS. 5 and 6 generates symmetrically modulated PWM sequences, with the pulses centred at the middle of the carrier periods, while alternative modifications to the carrier signal can generate asymmetrically modulated pulsed drive signals. The graph of FIG. 4 for the ultrasound transducer output pressure considers only the fundamental magnitude of the ultrasound transducer.

The SHE techniques described above show that it is possible to reduce the third harmonic content of a drive signal by generating a three or five level switched drive signal for both tone and frequency coded modulating signals, and controlling the switching angles δ. FIG. 26 illustrates again the switching angles $\delta_1$ and $\delta_2$ for a five level pulsed drive signal 2600. The five level pulsed drive signal 2600 has positive and negative pulses at an intermediate level $V_1$ (pulses 2602) and at a higher level $V_2$ (pulses 2604). Reducing the first switching angle $\delta_1$ causes pulses 2602 to broaden as shown by arrow 2606. Similarly, reducing the second switching level $\delta_2$ causes pulses 2604 to broaden as shown by arrow 2608. It will be appreciated that the second switching angle $\delta_2$ can never be less than the first switching angle $\delta_1$ as pulses 2604 are always superimposed upon pulses 2602.

Advantageously, the use of a five level drive signal (compared to a three level drive signal) provides a greater number of states, and so increases the effectiveness of SHE. It will be appreciated, however, that the present invention is not limited to the case of a five level drive signal. Specifically, while the introduction of additional levels within the drive signal provides a greater number of switching states, allowing for greater flexibility when seeking to minimise harmonic content, the introduction of additional switching instants can provide additional switching states. Specifically, for a three level pulsed drive signal, by controlling pulse abundance to allow for two pulses per half cycle of the modulating signal, the result is two switching angles which can be controlled. It will be appreciated by the appropriately skilled person that this embodiment of the invention is extensible to an arbitrary number of pulse levels and an arbitrary number of switching angles. It will be appreciated that it may desirable to select an odd number of switching levels to allow the reproduction of a zero or low amplitude modulating signal. Following the graphical techniques for determining appropriate switching angle paths described below, it is possible to selectively eliminate desired harmonic content while preserving amplitude control for the output pulsed drive signal. In order to provide amplitude control whilst selectively eliminating even order harmonics, and a single selected odd harmonic the present inventors have identified that a three level drive signal with two switching angles is required as a minimum. Increasing the pulsed drive signal to five levels provides for a larger range of output amplitudes and can enable the elimination of more than one selected harmonic, at the expense of increased complexity. However, for typical ultrasound transducers the transducer bandwidth is unlikely to extend beyond the third harmonic, and so the necessity to reduce higher order harmonic content is removed as any such harmonic content that is present is filtered by the transducer. Additionally, if a larger number of switching angles is used then this may be impractical to implement due to the necessary increase in switching frequency.

Figure 26:
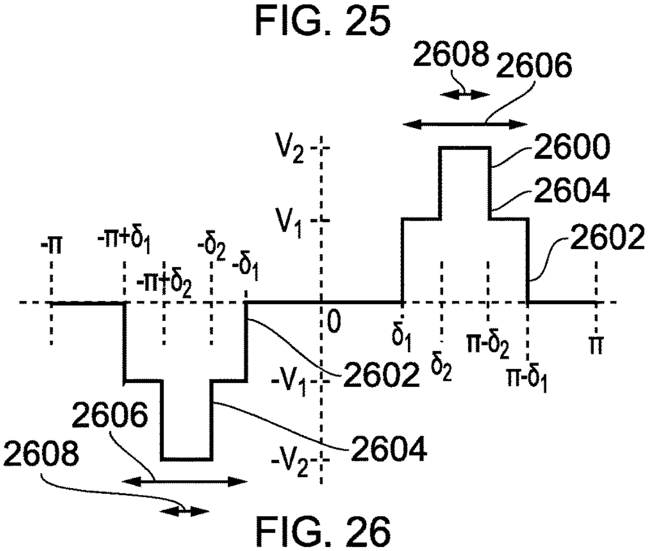
FIG. 26 defines the switching angles $\delta_1$ and $\delta_2$ for a five level pulsed drive signal.
Figure 27:
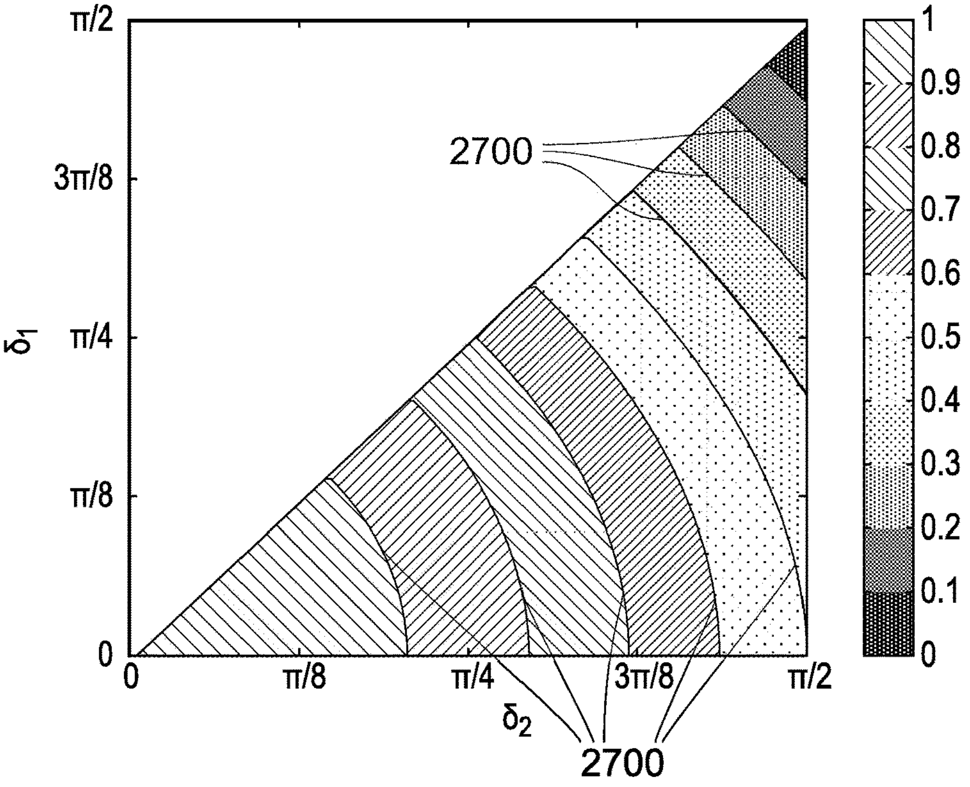
FIG. 27 is a graph showing variation of the magnitude of a fundamental frequency of the five level pulsed drive signal of FIG. 26 with variation of the switching angles $\delta_1$ and $\delta_2$ between $\pi/2$ and zero.
Figure 28:
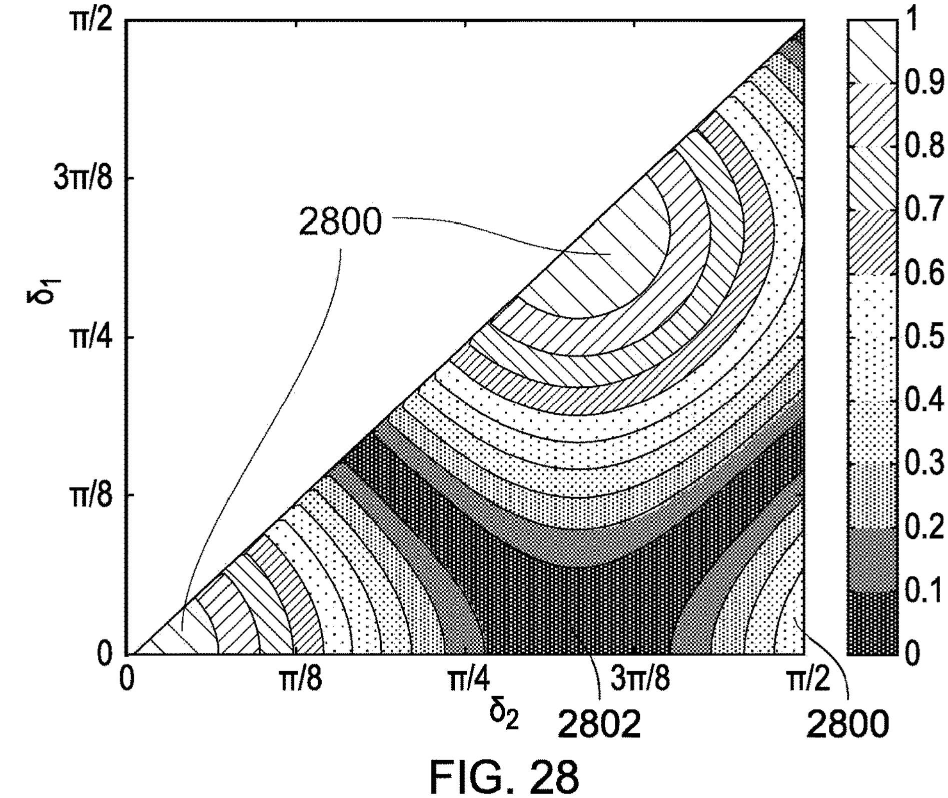
FIG. 28 is a graph showing variation of the magnitude of a third harmonic of the five level pulsed drive signal of FIG. 26 with variation of the switching angles $\delta_1$ and $\delta_2$ between $\pi/2$ and zero.

For the five level square wave drive signal illustrated in FIG. 26 the variation of the magnitude of the fundamental frequency or the third harmonic can be simulated or experimentally verified as switching angles $\delta_1$ and $\delta_2$ are varied. FIGS. 27 and 28 respectively illustrate this variation for the fundamental frequency and the third harmonic as the switching angles are varied between 0 and $\pi/2$. FIGS. 27 and 28 have been generated by considering Fourier series coefficients for the five level switched drive signal of FIG. 26 as the switching angles are varied. The first switching angle $\delta_1$ extends along the Y axis and the second switching angle $\delta_2$ extends along the X axis. The magnitude of the fundamental frequency and the third harmonic are shown in the lower right half below the diagonal. The fundamental and third harmonic magnitudes are normalised to their maximum values.

FIG. 27 reveals that the fundamental frequency magnitude increases to its maximum as the switching angles tend towards 0 and decreases to its minimum as the switching angles tend towards $\pi$. FIG. 27 includes lines of equal magnitude 2700 which show that the fundamental magnitude increases as either switching angle is decreased. This relationship can be appreciated by considering that the fundamental magnitude is highest when the square wave is at its maximum for half the pulse period (the pulse period being $2\pi$) and at its minimum for the other half of the pulse period. There is no pulse at all when the switching angles are both at $\pi/2$ and so the fundamental magnitude is at a minimum.

FIG. 28 reveals that the third harmonic magnitude has a more complex relationship as the switching angles vary. It can be seen that there are regions of high third harmonic 2800 and regions of low third harmonic 2802, and the regions of low third harmonic 2802 are contiguous such that a path of minimum third harmonic can be followed between the regions of high third harmonic. Lines of equal magnitude are shown.

For a conventional five level PWM pulsed drive signal for an ultrasound transducer, as amplitude is increased from zero to maximum and initially only the first switching angle $\delta_1$ is adjusted and it reduces from $\pi/2$ to zero. Only then is the second switching angle $\delta_1$ reduced from $\pi/2$ to zero. In other words, with reference to FIG. 26, starting from zero amplitude a narrow pulse 2602 centred at $\pi/2$ expands until the signal is at $V_1$ from zero to $\pi$ and then $-V_1$ until $2\pi$. At that point a narrow pulse 2604 centred at $\pi/2$ is superimposed upon pulse 2602 and the pulse 2604 expands until the signal is at $V_2$ from zero to $\pi$ and then $-V_2$ until $2\pi$. In the plots of FIGS. 27 and 28 this can be understood as a switching angle path starting at the upper right corner, proceeding straight to the lower right corner and then straight to the lower left corner. By inspection of FIG. 27 it can be seen that following this switching angle path causes the magnitude of the fundamental frequency to increase continuously from zero to maximum. By inspection of FIG. 28 it can be seen that the same switching angle path passes through relatively high and relatively low regions of magnitude for the third harmonic. The physical manifestation of the above described switching angle path is that for each half cycle of the pulsed signal there is exactly one (or none) pulse at each output level centred at centre of the half cycle ($\pi/2$ and $3\pi/2$).

Figure 29:
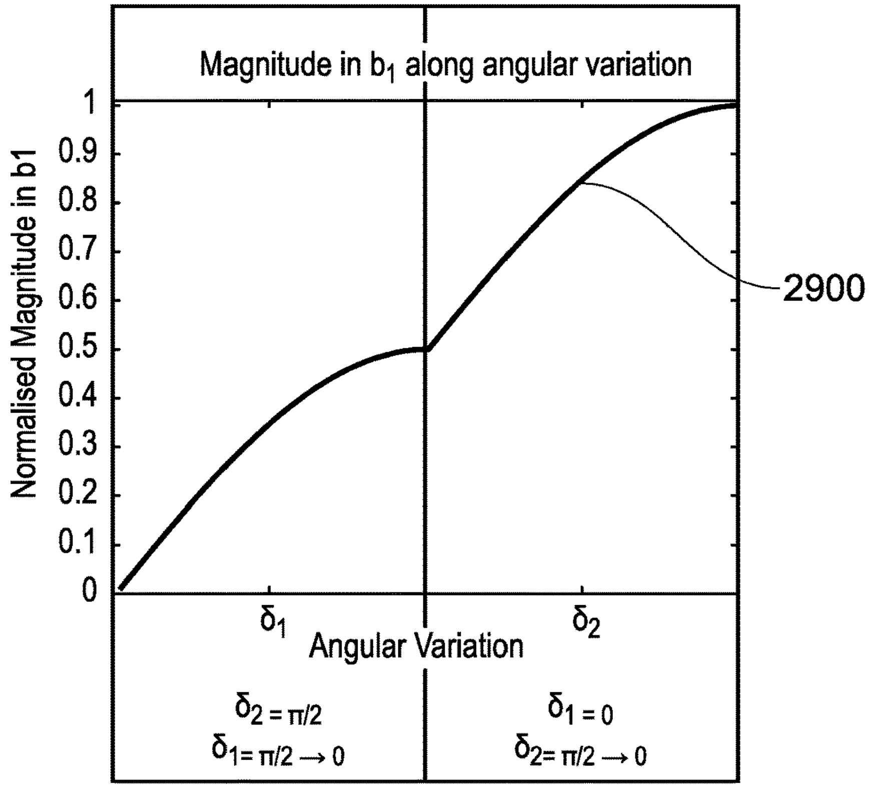
FIG. 29 is a graph showing variation of the magnitude of a fundamental frequency of the five level pulsed drive signal of FIG. 26 as first switching angle $\delta_1$ is reduced from $\pi/2$ to zero and then switching angle $\delta_2$ is reduced from $\pi/2$ to zero in accordance with conventional PWM for a switching angle path following the right hand and then lower edge of the graph of FIG. 27.

The increase in the fundamental frequency following the switching angle path can be seen in line 2900 in FIG. 29, which shows that the increase in the fundamental frequency magnitude is not linear. The variation of fundamental frequency magnitude with switching angles shown in FIG. 29 is produced through use of a carrier signal in which a linear increase in the modulating signal produces a linear increase in pulse width: specifically a triangular wave as shown in FIGS. 2 and 3. Following the techniques for producing an optimised carrier signal described above in connection with FIGS. 4 to 6 the present inventors have realised that for a five level PWM signal, a carrier signal may be defined in accordance with an embodiment of the present invention in which as the modulating signal increases in amplitude linearly, the fundamental frequency magnitude for the drive signal increases linearly as the first and second switching angles $\delta_1$, $\delta_2$ are decreased from $\pi/2$ to zero. Such an optimised carrier signal may take the form of a carrier signal having rectified cosine components, similar to that shown in FIG. 6 (which ensures linear variation of the ultrasound output pressure). If the PWM drive signal is to be used to drive an ultrasound transducer then the carrier signal may require further optimisation as described above to ensure that as the amplitude of the modulating signal increases linearly the output pressure from the ultrasound transducer also increases linearly (or according to some predetermined function). The effect of this second optimisation step may be that the fundamental frequency magnitude of the drive signal no longer increases linearly with a linear amplitude increase for the modulating signal.

The present inventors have further realised that for an improved pulsed signal in accordance with an embodiment of the present invention, the magnitude of the third harmonic of the five level pulsed signal may be minimised by varying the switching angle path. Taking, for the moment, the initial condition that the switching angles $\delta_1$, $\delta_2$ must both begin at $\pi/2$, inspection of FIG. 28 reveals that to minimise the third harmonic magnitude, the switching angle path begins at the top right hand corner and then follows the right hand side until the region of minimum third harmonic 2802 is reached, at which point the path follows the centre of the region of minimum third harmonic 2802 is reached. This improved switching angle path is shown in line 3000 in FIG. 30. Switching angle path 3000 is selected such that the magnitude of the fundamental frequency starts from zero (to allow the pulsed drive signal to reproduce a low level modulating signal) and follows the minimum magnitude of the third harmonic to a point at which the fundamental frequency magnitude is as high as possible without an unacceptable deterioration in the performance of the third harmonic. It will be appreciated that the reduction in the maximum magnitude of the third harmonic following the switching angle path 3000 of FIG. 30 may be compensated for by increasing the absolute magnitude of output levels $v_1$, $V_2$.

Figure 30:
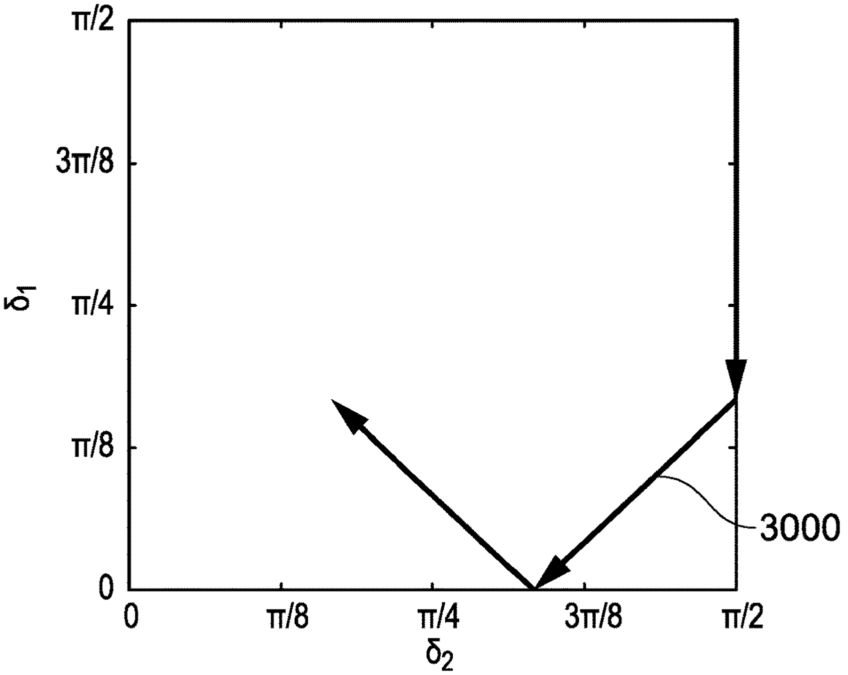
FIG. 30 is an optimised switching angle path progressing through regions of minimised third harmonic in the graph of FIG. 28 in accordance with an embodiment of the present invention.

Comparison of FIGS. 27 and 30 reveals that following the improved switching angle path 3000 the magnitude of the fundamental frequency still increases continuously, though the maximum magnitude is not reached. As noted in the paragraph above, careful selection of the shape of the of the carrier signal may be used to ensure that the rate of increase of the fundamental frequency magnitude (or the increase in ultrasound output pressure) with a linear increase in modulating signal magnitude remains linear (or some other desired function of the amplitude of the modulating signal).

The physical effect of the improved switching angle path illustrated in FIG. 30 is that as the modulating signal amplitude increases the pulses no longer continuously increase in width at $V_1$. The $V_1$ pulse 2602 increases continuously until the path turns when $\delta_1$ reaches zero, and then the width of the $V_1$ pulse 2602 reduces again. This is a counterintuitive variation in pulse width, and a surprising result of the minimisation of the third harmonic in accordance with embodiments of the present invention.

Comparison of FIGS. 28 and 30 reveals that while third harmonics are minimised at lower switching angles (high amplitude modulating signals), at higher switching angles (low amplitude modulating signals) the switching angle path continues to pass through regions of relatively high third harmonic. The present inventors have realised that by removing the initial condition that the switching angle path begins with both switching angles $\pi/2$ the switching angle path may be changed such that it passes continuously through the region of minimum third harmonic. The physical effect of removing this initial condition is that it is no longer necessarily the case that there is only one (or no) pulse at each voltage level per half cycle of the pulsed drive signal, and it is no longer necessarily the case that pulses at each output level are centred about $\pi/2$. This again is a counterintuitive step for the skilled person considering how PWM to generate a drive signal may be improved, in view of the fact that for conventional multilevel PWM that first the lower level pulses are expanded until they are maximised before higher level pulses are added (when the desired output magnitude increases).

In order to define such a further optimised switching angle path the graphs of FIGS. 27 and 28 may be extended to consider switching angles greater than $\pi/2$ to obtain a broader range of options for defining a switching path. As discussed above, a pulsed drive signal may be considered to be composed of the summation of a plurality of sine and cosine waves. Functions of sine and cosine are repetitive through periods of $2\pi$. Therefore, the pattern shown in FIGS. 27 and 28 for the fundamental frequency and the third harmonic (and also, higher order harmonics) is repeated as the graphs are extended.

Figure 31:
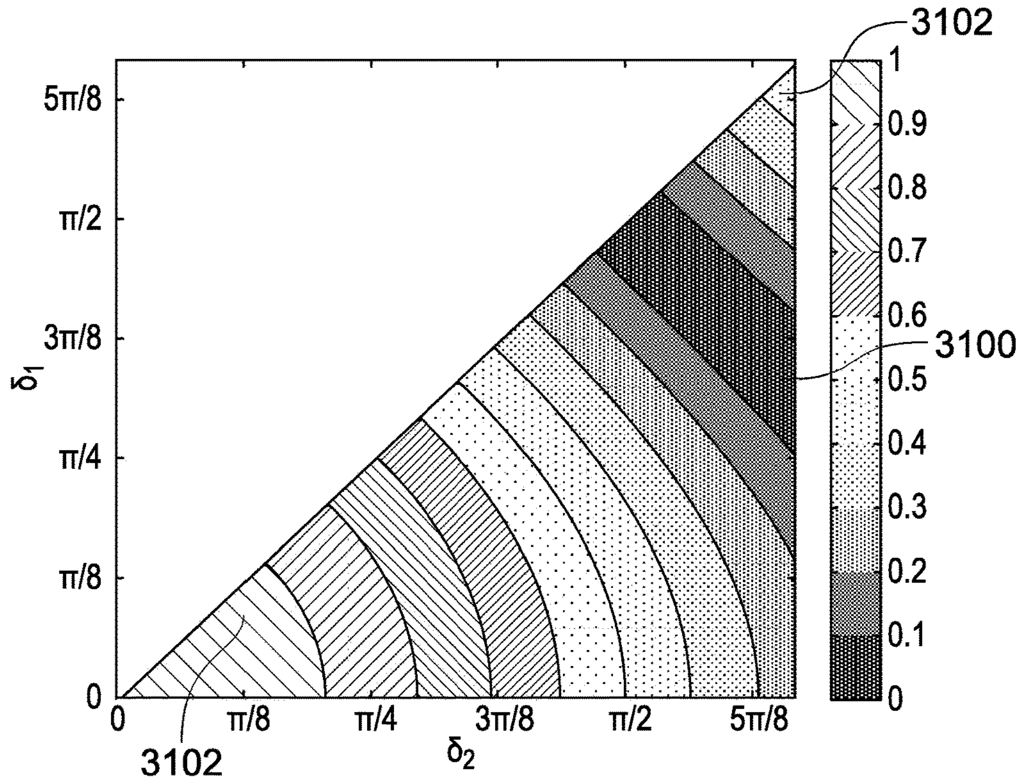
FIG. 31 is a graph showing variation of the magnitude of a fundamental frequency of the five level pulsed drive signal of FIG. 26 with variation of the switching angles $\delta_1$ and $\delta_2$ between approximately $2\pi/3$ and zero.
Figure 32:
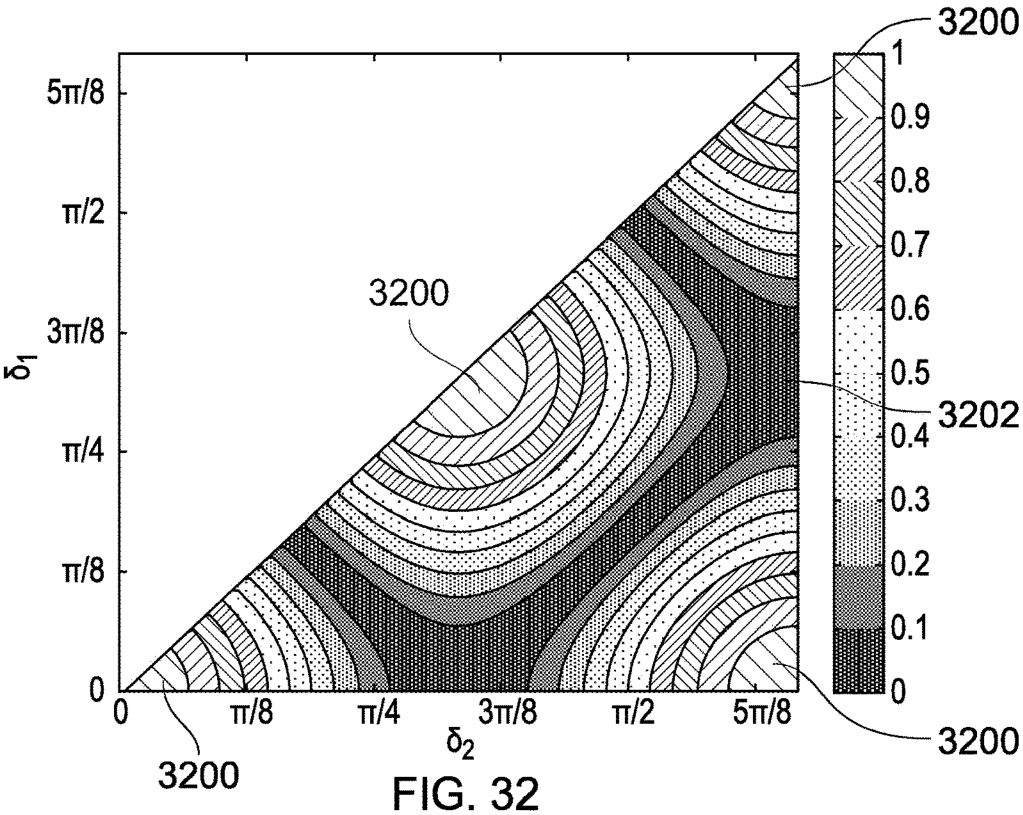
FIG. 32 is a graph showing variation of the magnitude of a third harmonic of the five level pulsed drive signal of FIG. 26 with variation of the switching angles $\delta_1$ and $\delta_2$ between approximately $2\pi/3$ and zero.

Referring now to FIGS. 31 and 32 these graphs show respectively the variation in the fundamental frequency magnitude and the third harmonic for switching angles between zero and $3\pi/2$. FIG. 31 shows a region of low magnitude 3100 and regions of high magnitude 3102. The fundamental frequency magnitude begins to decrease again if both switching angles are increased at the same rate beyond $\pi/2$. FIG. 32 again reveals a more complex pattern for magnitude of the third harmonic with regions of high magnitude 3200 and a region of low magnitude 3202 as the switching angle extends beyond $\pi/2$. However, it remains the case that the region of minimum third harmonic 3202 is contiguous. If the graph of FIG. 31 is extended further then the magnitude of the fundamental frequency again tends towards its maximum value as $\delta_1$ and $\delta_2$ both tend towards $\pi/2$. For each graph (and also for graphs of higher order harmonics) the graphs are mirrored about a line extending between $\delta_1=\pi$, $\delta_2=0$ and $\delta_1=0$, $\delta_2=\pi$. If the graphs are extended further then this mirroring is repeated about lines extending between $\delta_1=n\pi$, $\delta_2=0$ and $\delta_1=0$, $\delta_2=n\pi$ where n is an integer. By inspection of FIGS. 30 to 32 it can be seen that if the line of minimum third harmonic is extended in the same direction beyond $\delta_1=\pi/3$ and $\delta_2=2\pi/3$ then the magnitude of the fundamental would initially reduce to zero and then would begin to increase again. Therefore there is no benefit in extending the graphs further than $3\pi/2$ as shown in FIGS. 31 and 32, if it remains the case that it is necessary to select a switching angle path for which the magnitude of the fundamental increases continuously.

Figure 33:
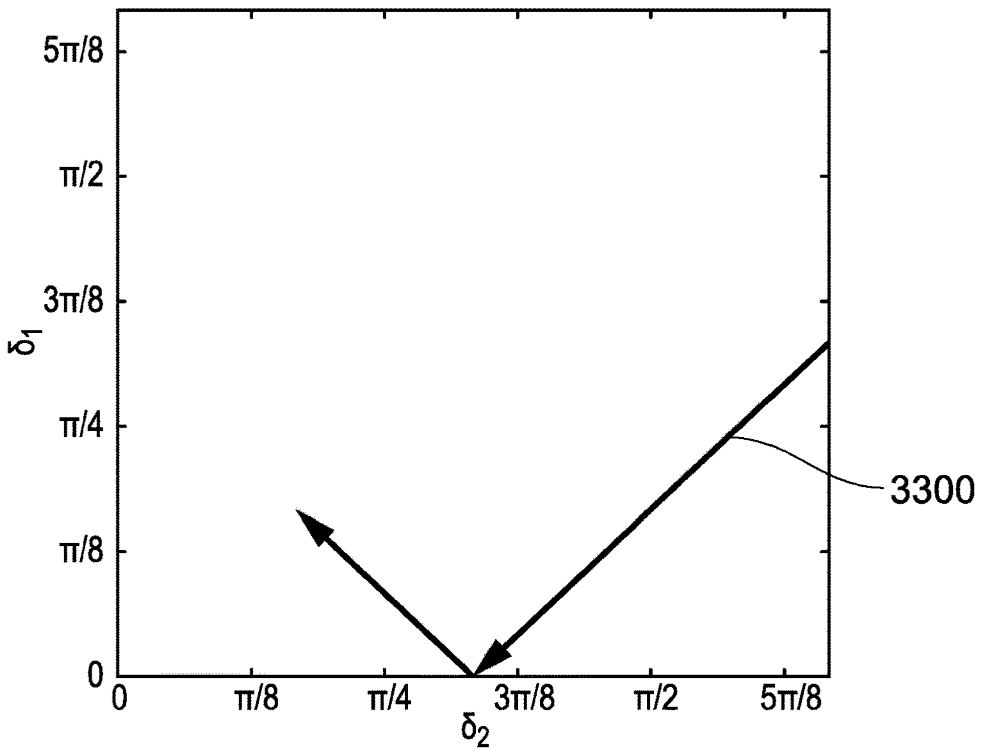
FIG. 33 is an optimised switching angle path progressing through regions of minimised third harmonic in the graph of FIG. 32 in accordance with an embodiment of the present invention.

The graph extensions shown in FIGS. 31 and 32 reveal that the fundamental frequency and the third harmonic frequency are at their minimums approximately when $\delta_1=5\pi/16$ and $\delta_2=5\pi/8$. This coincidence of regions of minimum magnitude is unexpected and results from the counterintuitive consideration of switching angles greater that $\pi/2$. Advantageously, a new switching angle path 3300 can be defined as shown in FIG. 33, which no longer begins with both switching angles being equal to $\pi/2$. Instead, the new switching angle path 3300 begins at an alternative position where the fundamental magnitude is at its minimum, and then progresses continuously through regions of minimum third harmonic until the fundamental magnitude is maximised without causing a deterioration in the performance of the third harmonic and such that the magnitude of the third harmonic continuously increases. It will be appreciated that the third harmonic component should be minimised. Preferably a switching path is selected such that the harmonic component selected for elimination is maintained below a predetermined threshold. As discussed above, the magnitude of the fifth harmonic (or any selected higher order harmonic) may be plotted as the switching angles $\delta_1$, $\delta_2$ vary. A new switching angle path may be selected which passes through a region for which the selected harmonic is minimised (and if appropriate, the magnitude of the fundamental frequency continuously increases). However, with two switching angles available to be controlled, it is not possible for two harmonics to be minimised in this way (for instance, the regions of minimum third harmonic are not aligned with the regions of minimum fifth harmonic).

The Fourier series which describes the stepped waveform as shown in FIGS. 20 and 25 contains a summation of cosine terms. The cosine function is positive in the range $-\pi/2$ to $\pi/2$, and in the ranges $-\pi$ to $-\pi/2$ and $\pi/2$ to $\pi$. For the switching angle path 3300 of FIG. 33 $\delta_1$ always lies within the range 0 to $\pi/2$. However, $\delta_2$ starts higher than $\pi/2$. Consequently, the values of the cosine terms containing $\delta_2$ will be inverted until $\delta_2$ reaches $\pi/2$, which causes an inversion in the output. This can be seen later in the pulsed drive signals of FIGS. 36 and 37 which show two pulses at the lower 0.5 output level. This appearance of two pulses is due to the presence of a single broad positive pulse generated by the $\delta_1$ cosine terms and a single narrower negative pulse generated by the $\delta_2$ cosine terms. With further reference to FIGS. 36 to 40, the result is that when following path 3300 of least third harmonic the angle for $\delta_2$ increases continuously along the length of the path, however the second level pulse is not seen until $\delta_2$ is less than $\pi/2$ and is contributing positively. When $\delta_2$ passes through $\pi/2$ there is a switch from there being a pair of pulses at the lower output level to there being a single pulse at the lower output level and a narrow pulse at the higher output level.

Referring back to FIG. 33 (and also for the switching angle path of FIG. 30), as discussed above the function of the path is to move from a region of low or zero amplitude for the fundamental frequency through to a higher amplitude. On inspection of FIG. 31, the lowest fundamental amplitude is in the region between approximately $\pi/2>\delta_1>\pi/4$ and $2\pi/3>\delta_2>\pi/2$, with the highest amplitude towards the bottom left of the plot. Therefore the value of angle $\delta_2$ always decreases regardless of angle $\delta_1$ to describe increasing amplitude. $\delta_1$ changes direction because it is required in order to maintain the elimination of the third harmonic whilst further increasing the fundamental amplitude. Indeed $\delta_1$ does not need to change direction, and the path could stop when it reaches the region at $\delta_1=\pi/3$. However, the effect of this would be to restrict the maximum drive signal amplitude.

The principle constraint on the selection of a switching angle path is that the fundamental frequency increases continuously from its minimum to its maximum as the modulating signal varies. The variation of the fundamental frequency with a linear change in the modulating signal can then be used to select an appropriate carrier waveform, as will be described below (in addition to considering the variation of the ultrasound transducer output pressure with a linearly varying modulating signal, as described above). It will be appreciated that alternative switching angle paths could be selected in order to minimise a selected harmonic, which fail to produce a desirable fundamental frequency response. Plotting regions of minimum and maximum harmonics in this way enables a graphical solution to SHE which incorporates amplitude control. If control of the amplitude of the fundamental frequency is not needed (for a situation in which there is no amplitude variation within the modulating signal) then this graphical method may be used to select an appropriate switching angle or combinations of switching angles (discrete angles, as opposed to a switching angle path) which eliminate multiple harmonics, but provide options for discrete amplitude control suitable for use with a thresholding technique.

Figure 34:
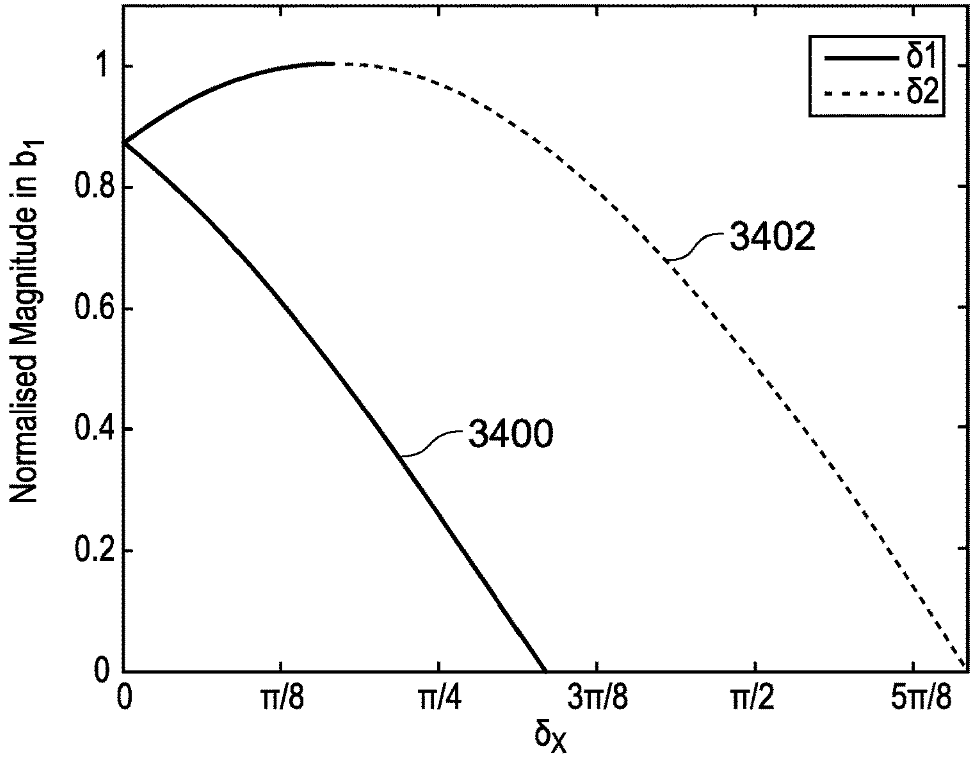
FIG. 34 shows variation of the components of the fundamental frequency magnitude of the five level pulsed drive signal of FIG. 26 with variation of switching angles $\delta_1$ and $\delta_2$ following the switching angle path of FIG. 33.

Comparison of the new switching angle path of FIG. 33 with the graph of the fundamental frequency magnitude of FIG. 31 allows the magnitude of the fundamental frequency for each output level ($V_1$ and $V_2$) to be plotted according to variation in the first switching angle $\delta_1$ (line 3400) or the second switching angle $\delta_2$ (line 3402) as shown in FIG. 34. That is, FIG. 33 plots the angle of switching versus the magnitude of the fundamental frequency separately for each switching angle. It can be seen that the two lines connect at only a single point (the end point of switching angle path 3300) as this is the only point at which the switching angles are the same. This graph can be used to choose the correct switching angles δ1 and δ2 for a desired output magnitude. FIG. 34 considers the fundamental output separately for each switching angles $\delta_1$ and $\delta_2$. For some possible angles of $\delta_2$ (above $\pi/2$), the higher level pulse $V_2$ is not present. However, for these angles the contribution of $\delta_2$ defines the missing region in $V_1$ (where there appears two pulses at the lower output level). For this reason we take the contribution of both the angles, and develop a carrier and algorithm accordingly.

Figure 35:
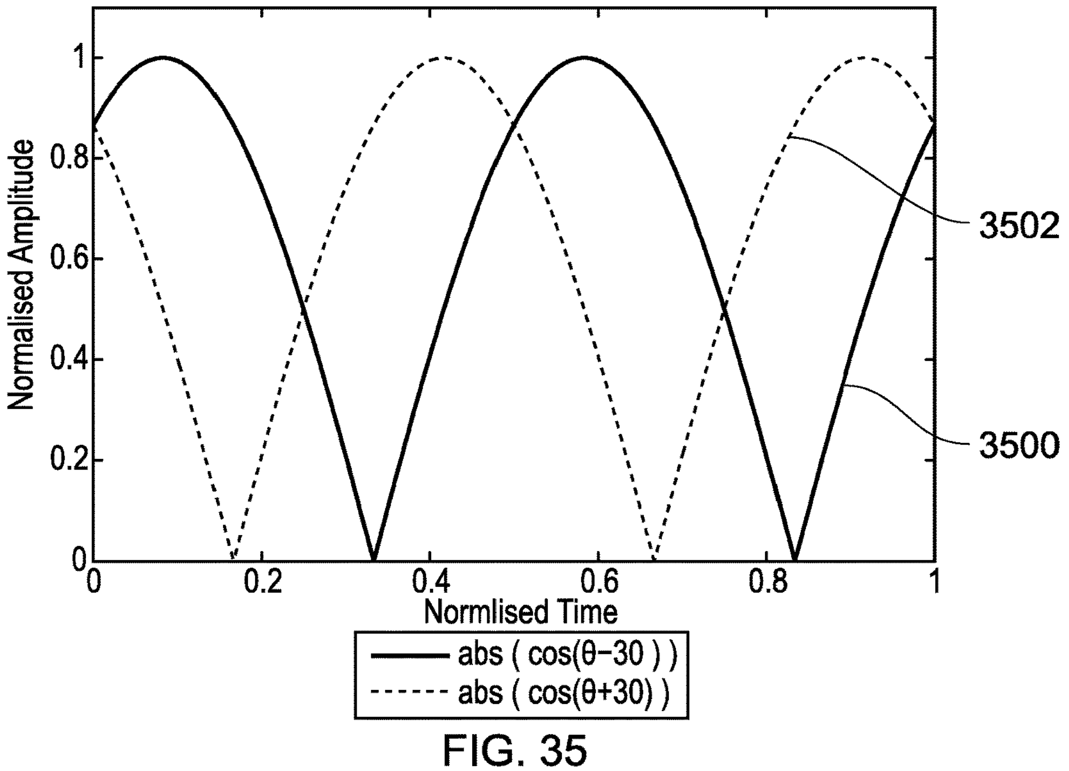
FIG. 35 shows two rectified cosine signals each phase shifted by ±30° which together define carrier signal constituents for a five level pulsed drive signal allowing the fundamental magnitude to be approximately linear with a linear increase in modulating signal amplitude when following the switching angle path of FIG. 33.

The variation of the fundamental magnitude with switching angle can be used to select the shape of the carrier signal (in a carrier comparison method to generate a pulsed drive signal) in which the total magnitude of the fundamental frequency varies linearly according to a linear increase in desired amplitude of the modulating signal. FIG. 35 shows two waveforms 3500, 3502 that can be used to describe the magnitude of the fundamental frequency when following the switching angle path of FIG. 33. The two waveforms are combined to describe the carrier signal constituent waveforms 3600, 3602 illustrated in FIGS. 36 to 40 described below.

FIG. 34 is analogous to FIG. 4. FIG. 4 shows that the relationship of ultrasound output fundamental magnitude with a linear increase in width of a single square wave is trigonometric. This trigonometric relationship was used to generate an appropriate non-linear carrier waveform. The carrier has an abs(cos) function which generates symmetrically modulated pulses about $\pi/2$. With respect to FIG. 34, the process to generate an appropriate carrier signal waveform is the same. The required drive signal is still pulsed, and the aim is still to consider the fundamental magnitude within these square-wave pulses (for the drive signal, not the ultrasound output pressure, though this is also possible). Therefore, the cosine output relationship is still appropriate. Therefore FIG. 35 shows two phase-separated cosines which line up with the plots of fundamental frequency output for angles $\delta_1$ and $\delta_2$ of FIG. 34, which are then rectified to generate symmetrically modulated pulses as shown in FIG. 35.

Figure 39:
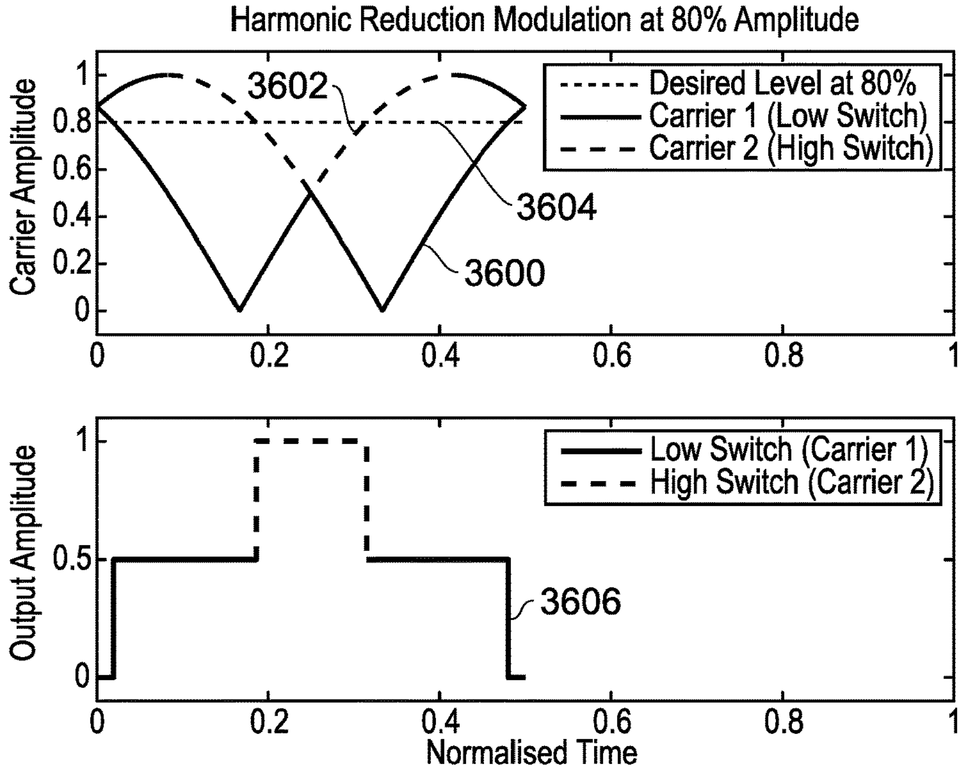
Figure 40:
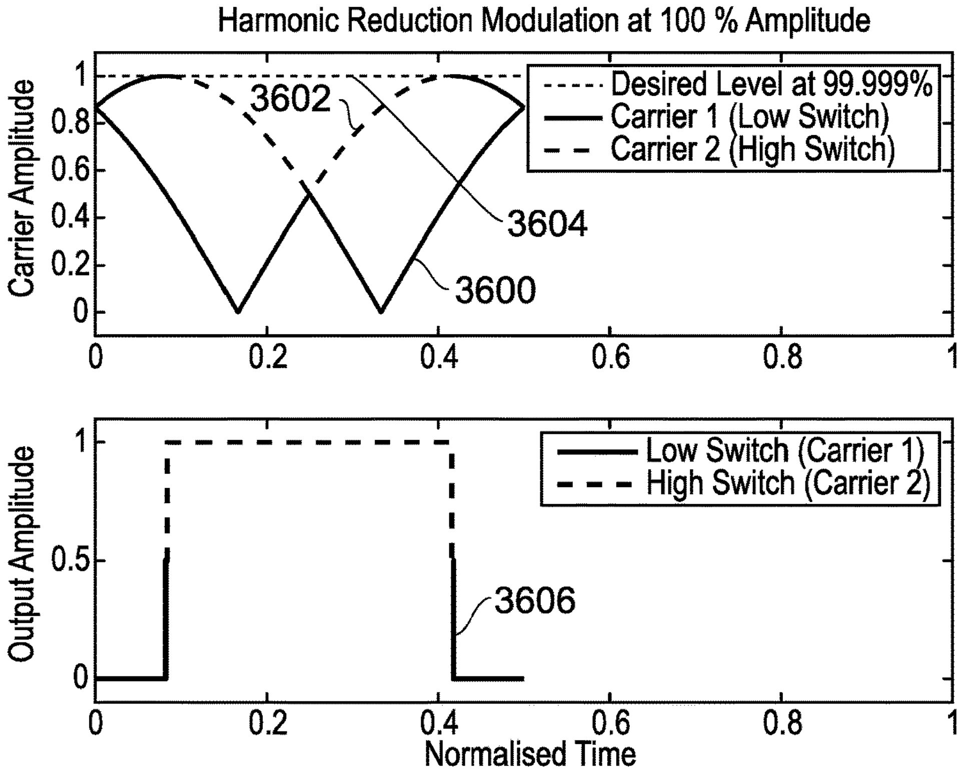

Inspection of FIGS. 34 and 35 shows that the output generated by the $\delta_2$ constituent can be mapped to the abs(cos−30) line 3500 in FIG. 35. Also, the lower region of $\delta_1$ in FIG. 34 can be mapped to the abs(cos+30) line 3502 in FIG. 35. For the region of δ1 line 3400 above 0.866 or √(3)/2 in FIG. 34, the line overlaps values underneath it. The physical manifestation of this is that the width of the lower pulse reduces at the higher values of the amplitude of the fundamental frequency, as can be seen in FIGS. 39 and 40 discussed below. A region of the abs(cos−30) line 3500 may be used to modulate the width of the lower pulse separately. It will be appreciated by inspection of FIGS. 33 to 35 that in accordance with an embodiment of the present invention because the switching angle path is not parallel to the horizontal or vertical axis at any point, the switching angles change simultaneously throughout the full output amplitude range. In other embodiments of the present invention the switching angle path may be parallel to the horizontal or vertical axis for part of its length and so for part of the amplitude range of the fundamental frequency only one or other switching angle may vary.

The two phase separated and rectified cosine signals can be used to define four carrier signal components (two positive and two negative) collectively forming a carrier signal for generating a five level pulsed drive signal with a reduced third harmonic component suitable for driving an ultrasound transducer in accordance with an embodiment of the present invention. Considering the positive case only: the two carrier signal components 3600 and 3602 are shown in FIGS. 36 to 40. The first carrier signal 3600 modulates the low switch. It can be considered that this consists of two subcarriers, with subcarrier 1a for the range 0 to √(3)/2 and subcarrier 1b for the range √(3)/2 to 1. It is necessary to define the subcarriers Carrier 1a and Carrier 1b due to the pulse width increasing and then decreasing again. The second carrier signal 3602 (Carrier 2) modulates the high switch in the range 0.5 to 1. The following is an example algorithm for generating each of the carriers. It will be apparent to the skilled person that there may be alternative algorithms and combinations to achieve the same output.

The first step of the algorithm is to define the two phase separated cosine functions 3500 and 3502, named in this case as $C_L(t)$ and $C_T(t)$, according to equations (22) and (23):

$$C_L(t)=|\cos(\omega t-\pi/6)| \quad (22)$$

$$C_T(t)=|\cos(\omega t+\pi/6)| \quad (23)$$

Equations (22) and (23) can then be used to define positive carriers. Carrier 1a is defined by equations (24), Carrier 1b is defined by equation (25) and Carrier 2 is defined by equation (26):

$$\text{Carrier } 1a(t) = \begin{cases} C_T(t), & \text{if } C_T(t) \le C_L(t) \\ C_L(t), & \text{otherwise} \end{cases} \quad (24)$$

$$\text{Carrier } 1b(t) = \begin{cases} \text{if } C_L(t) > \sqrt{3}/2 & \\ \quad 1, & \text{if } C_T(t) < 0.5 \\ \quad C_L(t), & \text{otherwise} \\ \text{else if } C_T(t) > \sqrt{3}/2 & \\ \quad 1, & \text{if } C_L(t) < 0.5 \\ \quad C_T(t), & \text{otherwise} \\ \quad \text{else} & \\ \quad 1, & \end{cases} \quad (25)$$

$$\text{Carrier } 2(t) = \begin{cases} \text{if } C_L(t) = C_T(t) & \\ \quad 1, & \\ \text{else if } C_L(t) > C_T(t) & \\ \quad C_L(t), & \text{if } C_T(t) \le 0.5 \\ \quad 1, & \text{if } C_L(t) \ge \sqrt{3}/2 \\ \quad C_L(t), & \text{otherwise} \\ \quad \text{else} & \\ \quad C_T(t), & \text{if } C_L(t) \le 0.5 \\ \quad 1, & \text{if } C_T(t) \ge \sqrt{3}/2 \\ \quad C_L(t), & \text{otherwise} \end{cases} \quad (26)$$

The negative versions can be generated through appropriate change of signs.

Figure 36:
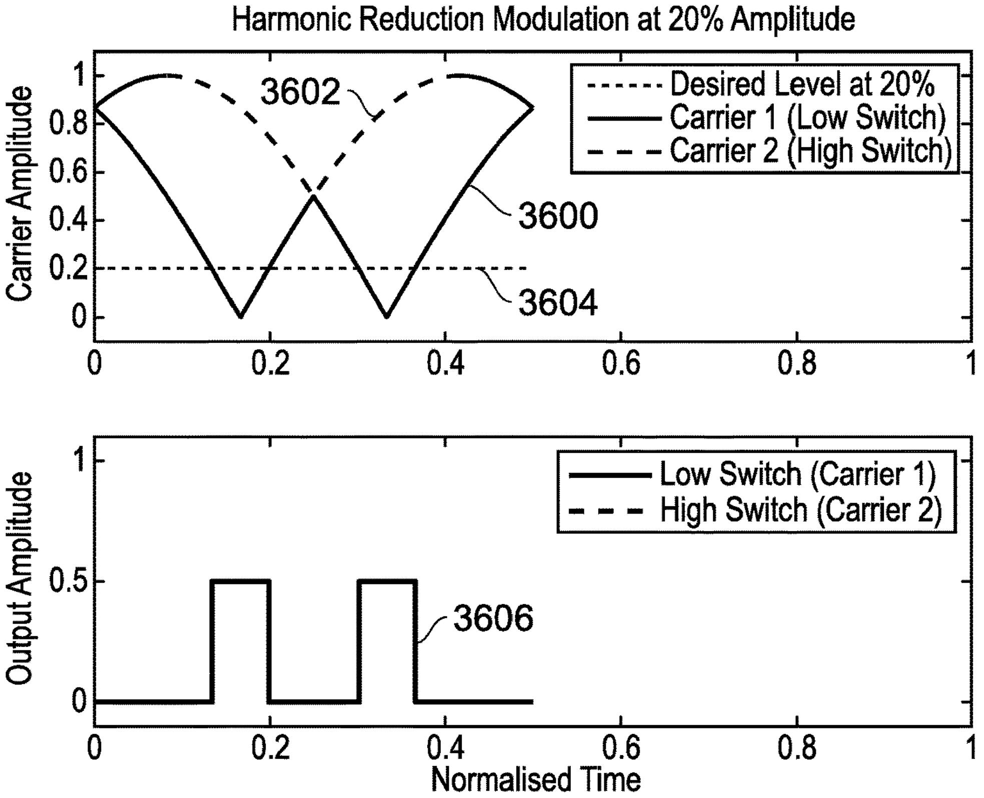
FIGS. 36 to 40 illustrate variation of a pulsed drive signal with a DC modulating signal applied to positive constituents of a carrier signal generated from the two rectified cosine signals of FIG. 35, with the DC modulating signal amplitude set to 20%, 40%, 60%, 80% and 100% of its maximum respectively.
Figure 37:
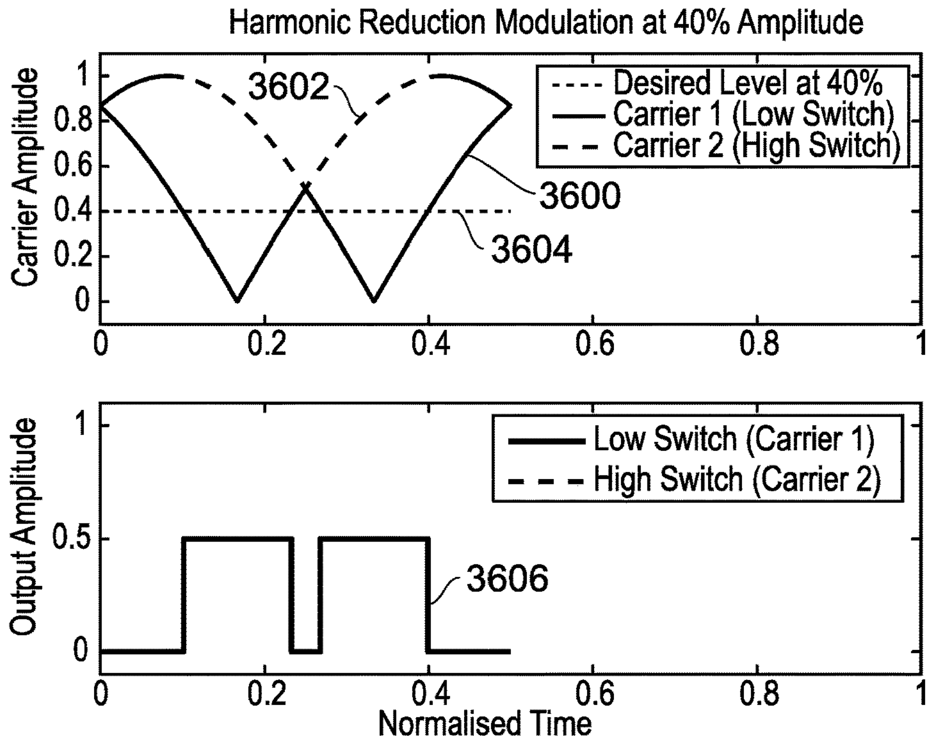
Figure 38:
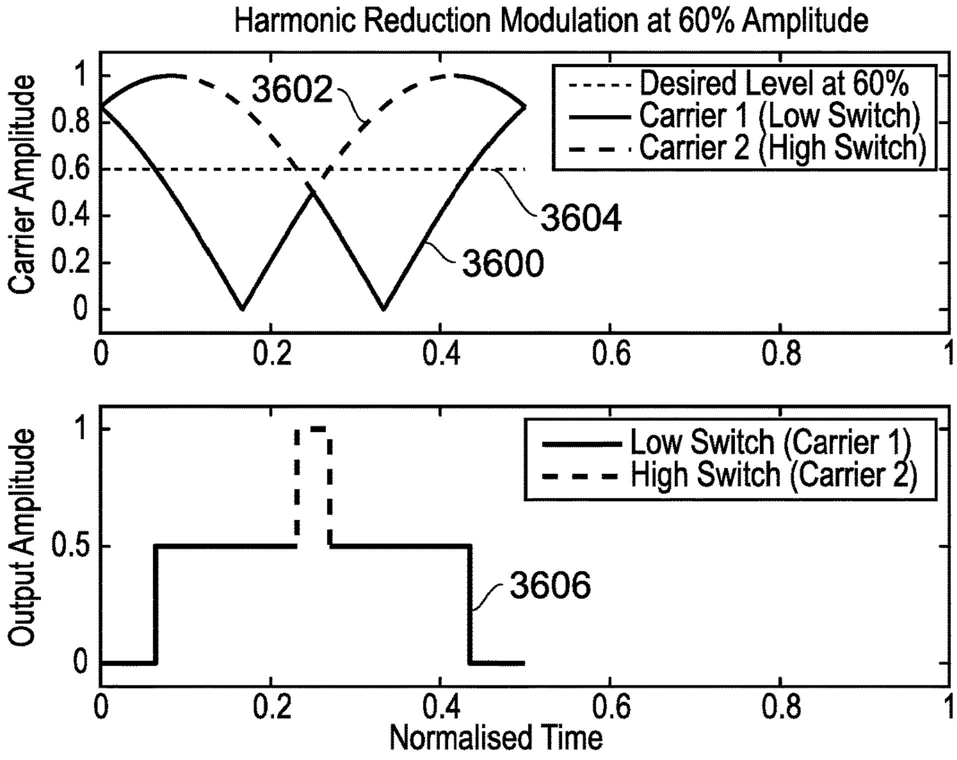

With reference to FIG. 36, Carrier 1a and Carrier 1b are used to form both parts of the solid line 3600, whilst Carrier 2 is used to describe the dashed link 3602. PWM sequences can be modulated using a carrier comparison method which compares against Carrier 1 (both Carrier 1a and Carrier 1b) and Carrier 2. Carrier 1 modulates the low switch, whilst Carrier 2 modulates the high switch. The contribution from each switch is modulated separately and the outputs summed as described below.

Modulation for the low switch, $PWM_L(t)$—equation (27):

$$PWM_L(t) = \begin{cases} \text{if } s(t) \ge 0 & \\ \text{if } m_{POS}(t) < \sqrt{3}/2 & \\ \quad 0, & m_{POS}(t) \le \text{Carrier } 1a(t) \\ \quad 0.5, & \text{otherwise} \\ \quad \text{else} & \\ \quad 0.5, & m_{POS}(t) \le \text{Carrier } 1b(t) \\ \quad 0, & \text{otherwise} \\ \quad \text{else} & \\ \text{if } m_{NEG}(t) > -\sqrt{3}/2 & \\ \quad 0, & m_{NEG}(t) \ge -\text{Carrier } 1a(t) \\ \quad -0.5, & \text{otherwise} \\ \quad \text{else} & \\ \quad -0.5, & m_{NEG}(t) \ge -\text{Carrier } 1b(t) \\ \quad 0, & \text{otherwise} \end{cases} \quad (27)$$

Modulation of the higher switches, $PWM_H(t)$—equation (28):

$$PWM_H(t) = \begin{cases} \text{if } s(t) \ge 0 & \\ \quad 0, & m_{POS}(t) \le \text{Carrier } 2(t) \\ \quad 0.5, & \text{otherwise} \\ \text{else} & \\ \quad 0, & m_{NEG}(t) \ge -\text{Carrier } 2(t) \\ \quad -0.5, & \text{otherwise} \end{cases} \quad (28)$$

Summation of the low switch and high switch to generate PWM(t)—equation (29):

$$PWM(t)=PWM_L(t)+PWM_H(t) \quad (29)$$

Referring to FIGS. 36 to 40, these show the positive carrier signal components 3600 and 3602 for a single half cycle of the carrier signal (represented by normalised time 0 to 0.5, where 1 is a full cycle). In each of FIGS. 36 to 40 a DC desired output level 3604 (the modulating signal) is given. The resulting drive signal 3606 from the intersection of carrier components 3600, 3602 and the output level 3604 is shown. In FIG. 36 the desired output level 3604 is shown at 20%, which increases by 20% for each successive Figure. In FIG. 36 the drive signal 3606 comprise two separate pulses at half the maximum output level spaced apart around time 0.25 (equivalent to a phase of π/2). The pair of pulses is a result of the desired output level 3604 intersecting the low switch carrier signal component 3600 at two points. As the desired output signal 3604 increases the pair of output pulses expand and merge to form a single pulse, which continues to expand. For the 60% desired output level of FIG. 38 it can be seen that a second narrow pulse at the full output level is superimposed upon the broader half output level pulse. As the desired output level 3604 is increased further the half output level pulse continues to expand until the desired output level 3604 reaches 86.6% of its maximum, at which point it starts to reduce in width, while the full output level pulse continuously broadens. This narrowing of the intermediate level pulse as the modulating signal increases is counterintuitive and contrary to what is experienced for conventional PWM. This is a surprising result of the reduction of the third harmonic content in accordance with embodiments of the present invention.

Embodiments of the present invention described above allow the third harmonic component to be selectively reduced or eliminated for a five level pulsed output signal, defined by a switching angle path for the first and second switching angles required to define a five level pulsed signal. The skilled person will readily understand that the same techniques may be extended to pulsed output signals with an increased number of output levels or switching events defined by an increased number of switching angles, thus allowing the additional selective elimination of the fifth harmonic component (and higher order harmonic components).

It will be appreciated that while selective elimination of harmonic content, in combination with output power control has been described above in connection with a carrier comparison technique, the same effect may be achieved with an appropriate direct modulation scheme. Indeed, none of the above described embodiments of the invention are limited to any specific technique for producing a pulsed drive signal.

The SHE techniques for amplitude control described above may be readily combined with the shaping of the carrier signal components to provide a linear (or arbitrary) relationship between the modulating signal and the ultrasound output pressure) as noted above. Additionally, the SHE techniques for amplitude control may be applied to embodiments of the present invention described in connection with 7 to 11 to provide frequency modulation of the carrier signal, by frequency modulating the carrier signal shown in FIGS. 36 to 40. In particular, frequency modulation can be applied to the SHE techniques by using frequency coded versions of the waveforms 3500 and 3502 shown in FIG. 35. These waveforms provide frequency coded versions of the carrier shown in FIGS. 36 to 40.

Figure 41:
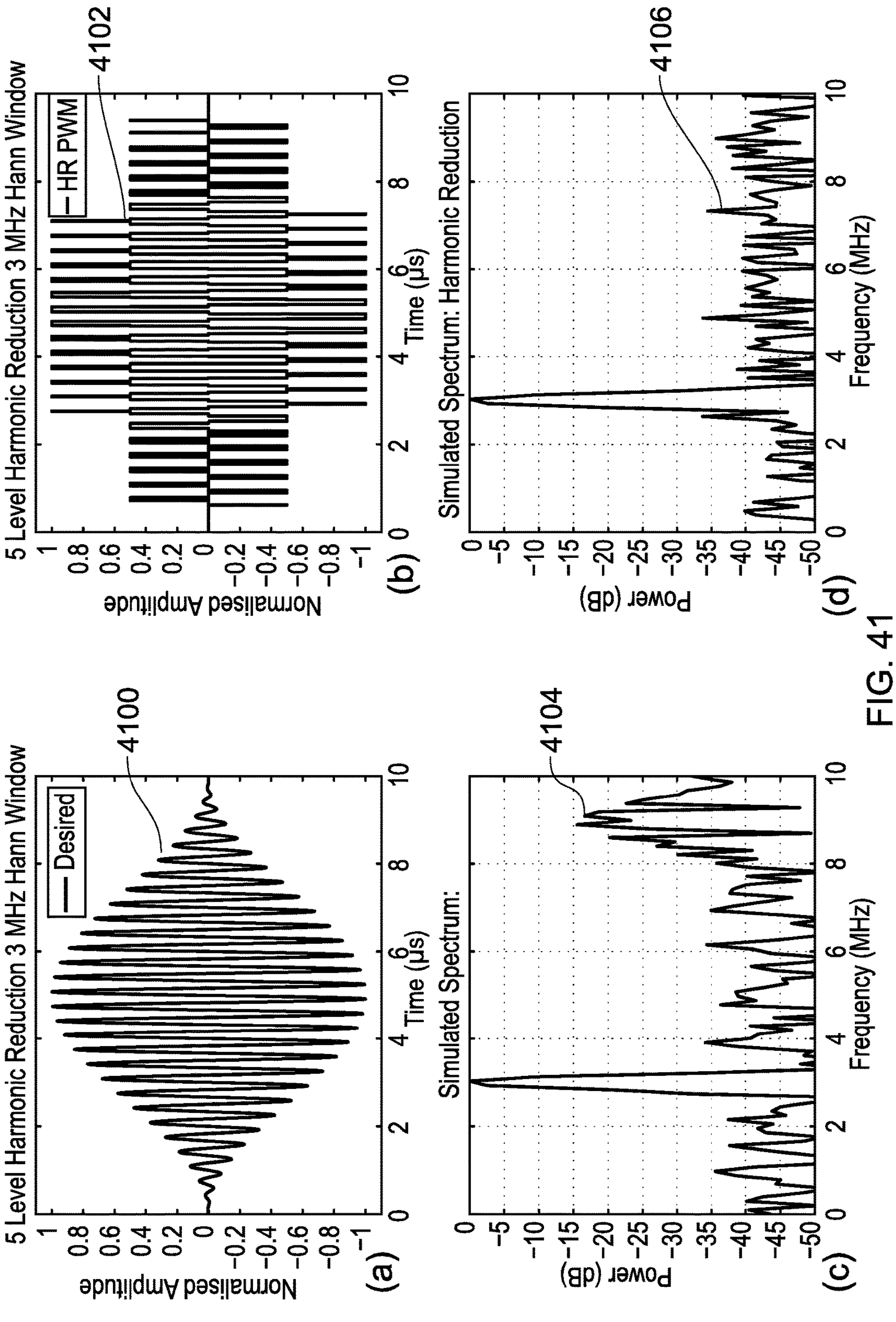
FIG. 41 at part (a) shows a 3 MHz, 10 μs duration Hann windowed tone modulating signal; at part (b) a five level pulsed drive signal generated using the modulating signal of part (a) in accordance with an embodiment of the present invention, including with a shaped carrier signal corresponding the performance of an ultrasound transducer and a frequency matched to the modulating signal, and optimised to reduce the amplitude of the third harmonic; at part (c) the spectrum of a five level pulsed drive signal generated using the modulating signal of part (a) and similar to the drive signal of part (b), but without harmonic reduction; and at part (d) the spectrum of the five level pulsed drive signal of part (b)
Figure 44:
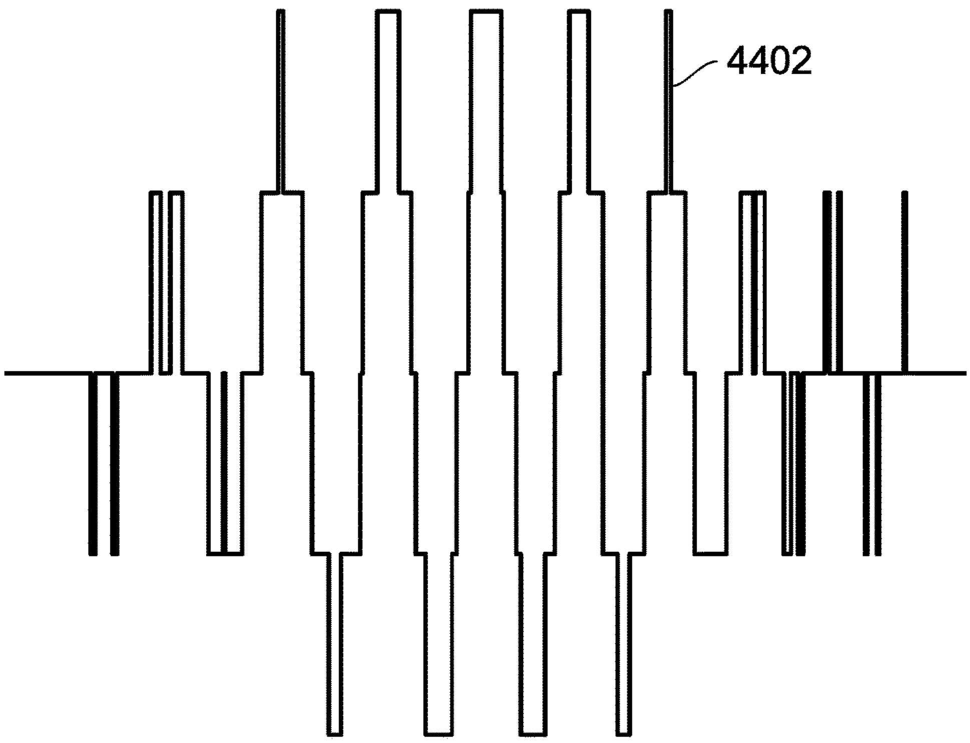
FIG. 44 illustrates a five level pulsed drive signal generated using the modulating signal of FIG. 10 according to an embodiment of the present invention optimised to reduce the amplitude of the third harmonic.

Referring now to FIG. 41, this illustrates at part (a) a 3 MHz, 10 μs duration Hann windowed tone modulating signal 4100. Part (b) illustrates a five level pulsed drive signal 4102 generated using the modulating signal 4100 of part (a) in accordance with an embodiment of the present invention and optimised to reduce the amplitude of the third harmonic. The drive signal 4102 of part (b) includes the optimisations described above to ensure that the carrier signal is shaped to take into account the performance of a particular ultrasound transducer and to ensure that the frequency of the carrier signal is matched to that of the modulating signal. The pulse widths at each level and the pulse positions vary with the amplitude of the modulating signal 4100 of part (a) in accordance with the variation shown in FIGS. 36 to 40. In particular, the start and the end of the drive signal 4102 of part (b) some of the pulses are shown as double pulses in accordance with FIG. 36, though this is not clearly visible due to the scale of FIG. 41 and in the middle of the drive signal of part (b) the intermediate level pulses can be seen to narrow. The appearance of double pulses and the reduction in width of the intermediate pulses can be seen in FIG. 44, which is a five level pulsed drive signal 4402 generated using the amplitude modulated chirp waveform of FIG. 10 as the modulating signal, using the same techniques as for FIG. 41, in order to reduce the amplitude of the third harmonic. It can be seen that towards the start and end of the pulsed drive signal double pulses appear corresponding to low amplitude portions of the modulating signal. In the centre of the pulsed drive signal the reduction of the intermediate level pulses can be clearly seen. To determine the effectiveness of the reduction of the third harmonic, at part (c) the spectrum 4104 is shown of a five level pulsed drive signal in accordance with embodiments of present invention similar to that of part (b) but without the harmonic reduction optimisation, and at part (d) the spectrum 4106 is shown of the five level pulsed drive signal 4102 of part (b). It can clearly be seen that the third harmonic is reduced from approximately −15 dB (of the power of the fundamental frequency) to less than −35 dB. This amounts to the third harmonic being effectively eliminated, and is comparable to background noise at other frequencies.

Figure 42:
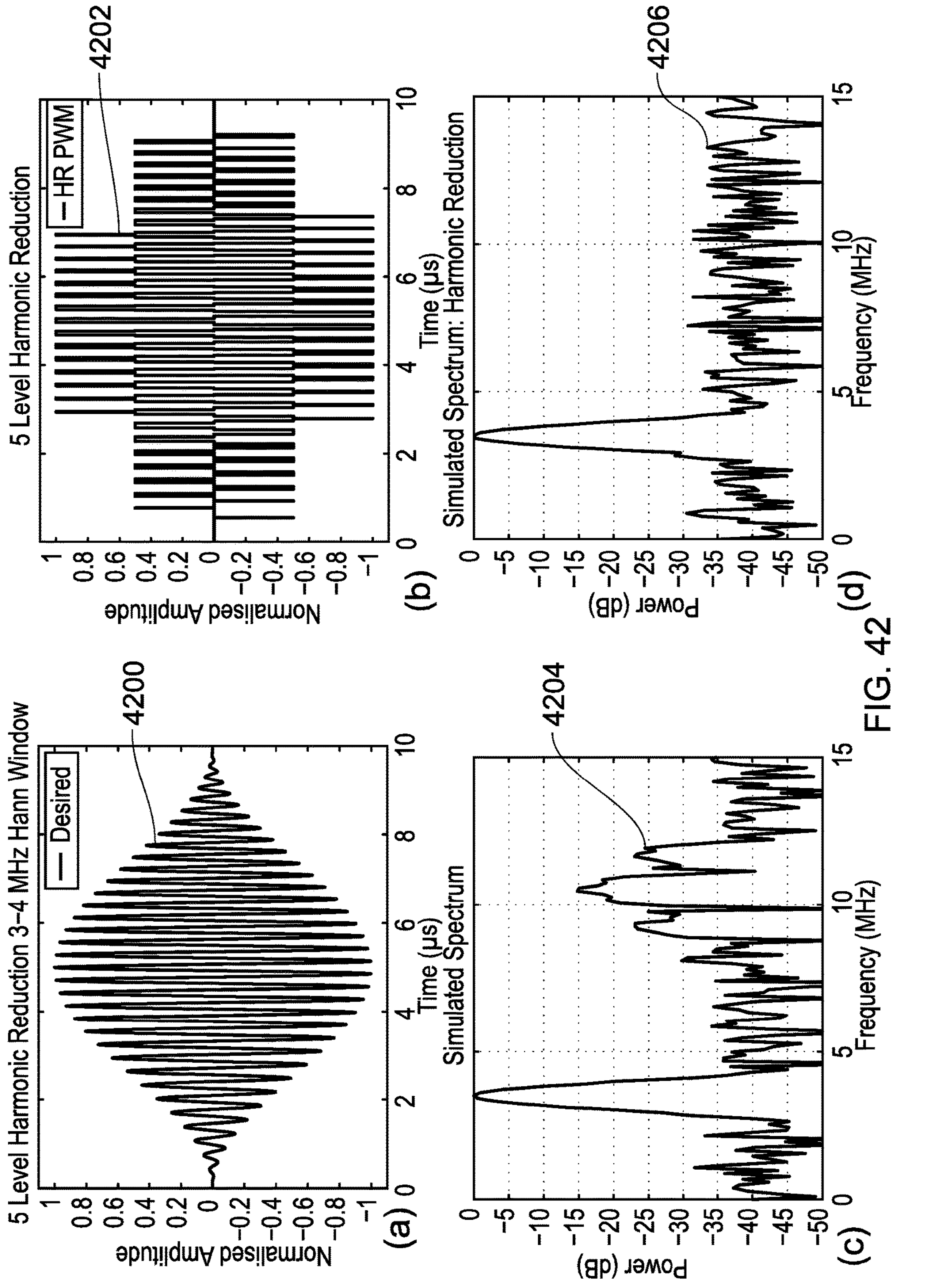
FIG. 42 at part (a) shows a 3-4 MHz, 10 μs duration Hann windowed chirp modulating signal; at part (b) a five level pulsed drive signal generated using the modulating signal of part (a) in accordance with an embodiment of the present invention, including with a shaped carrier signal corresponding the performance of an ultrasound transducer and a frequency matched to the modulating signal, and optimised to reduce the amplitude of the third harmonic; at part (c) the spectrum of a five level five level pulsed drive signal generated using the modulating signal of part (a) and similar to the drive signal of part (b), but without harmonic reduction; and at part (d) the spectrum of the five level pulsed drive signal of part (b)

FIG. 42 is similar to FIG. 41, differing only in that the modulating signal 4200 at part (a) shows a 3-4 MHz, 10 μs duration Hann windowed chirp modulating signal. Again, it can be seen from spectra 4204, 4206 that the pulsed drive signal 4202 of part (b) has effectively eliminated the third harmonic.

For the above described embodiments of the invention which relate to output drive signals with multiple levels, the present invention is not limited to output levels being equally spaced. While, for a five level pulsed drive signal, it may be desirable for the levels to be positioned at −1, −0.5, 0, 0.5 and 1, this is not the only option. The levels may be at any arbitrary positions, with carriers scaled between arbitrary positions to reflect this.

For embodiments of the present invention implemented through a carrier comparison technique, it is not necessary that level shifted carriers are used. The alternative of using phase shifted carriers (which may span the full amplitude range of the modulating signal) will be well understood by the appropriately skilled person.

Figure 43:
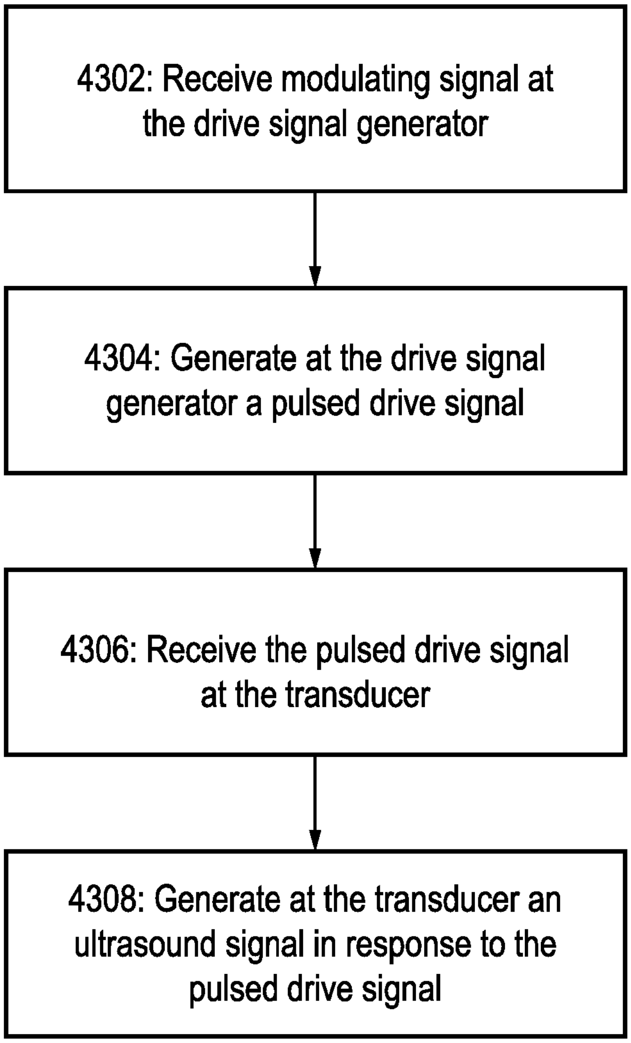
FIG. 43 is a flowchart giving an overview of the method of generating ultrasound in accordance with embodiments of the present invention.

Referring now to the flow chart of FIG. 43, a method of generating ultrasound in accordance with the above embodiments of the invention will now be described. At step 4302 the drive signal generator 102 shown in FIG. 1 receives a modulating signal. At step 4304 the drive signal generator 102 generates a pulsed drive signal. The generation of pulsed drive signal is in accordance with the signal generation techniques described above in accordance with embodiments of the invention. At step 4306 the pulsed drive signal is supplied to transducer 110. As noted above, this may be via a separate transmitter circuit to switch the high current necessary to drive an ultrasound transducer. At step 4308 the transducer generates an ultrasound output signal in response to the pulsed drive signal.

The above described embodiments of the invention to generate optimised drive signals are widely applicable to the generation of ultrasound in both medicinal and industrial applications. In particular, such improved drive signals are expected to be of particular benefit for ultrasound applications, for instance ultrasound imaging, including B-mode, M-mode etc., coded imaging (with linear and non-linear frequency modulation), contrast imaging, and Doppler imaging. Other than ultrasound imaging, the present invention is also applicable to improved ultrasound transmit power control, transmit array apodisation, power modulation, compensation for transducer frequency characteristics, dual frequency excitation, High Intensity Focused Ultrasound (HIFU), ultrasound communications, shear measurement and industrial non-invasive flow measurement. Further potential areas of application will be readily apparent to the appropriately skilled person.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers and characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

It will be appreciated that embodiments of the present invention can be realized in the form of hardware, software or a combination of hardware and software. Any such software may be stored in the form of volatile or non-volatile storage, for example a storage device like a ROM, whether erasable or rewritable or not, or in the form of memory, for example RAM, memory chips, device or integrated circuits or on an optically or magnetically readable medium, for example a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium, for example a communication signal carried over a wired or wireless connection and embodiments suitably encompass the same.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An ultrasound generator comprising:

a signal generator arranged to receive, generate or calculate when instructed a modulating signal with a magnitude that varies within a first range and to generate a pulsed drive signal having a predefined first relationship to the modulating signal, the pulsed drive signal having at least a zero output level, a positive output level and a negative output level, wherein the pulsed drive signal comprises a series of alternating positive half cycles and negative half cycles, wherein for a cycle of the pulsed drive signal comprising a positive half cycle and a negative half cycle, the position and width of pulses of the pulsed drive signal in each of the positive and negative half cycles are defined by at least first and second switching angles; and a transducer arranged to generate ultrasound in response to the pulsed drive signal;

wherein the first relationship is selected such that within at least part of the range of magnitude of the modulating signal the first and second switching angles are adjusted simultaneously to provide for an increase or decrease in the magnitude of the fundamental frequency of the pulsed drive signal corresponding to an increase or decrease in the magnitude of the modulating signal; and wherein the first relationship is selected such that a selected harmonic component of the generated pulsed drive signal is maintained below a level of at least one higher order harmonic component; and wherein the first relationship is selected such that throughout part of the range of magnitude of the modulating signal one switching angle increases while the other switching angle decreases simultaneously to provide for an increase or decrease in the magnitude of the fundamental frequency of the pulsed drive signal corresponding to an increase or decrease in the magnitude of the modulating signal.

2. An ultrasound generator according to claim 1, wherein the pulsed drive signal has at least one additional intermediate positive output level and at least one additional intermediate negative output level.

3. An ultrasound generator according to claim 1, wherein the first relationship is selected such that the third harmonic of the fundamental frequency of the pulsed drive signal is maintained below the level of the at least one higher order harmonic component.

4. An ultrasound generator according to claim 1, wherein the first relationship is further selected such that the magnitude of the fundamental frequency of the pulsed drive signal is proportional to the magnitude of the modulating signal.

5. An ultrasound generator according to claim 1, wherein the signal generator is arranged to generate the pulsed drive signal by comparing the modulating signal to a carrier signal.

6. An ultrasound generator according to claim 1, wherein the modulating signal magnitude varies over time, and wherein the first relationship is selected to be a function of measured or simulated variation of the magnitudes of the fundamental component and the selected harmonic content of the transducer output with a linear increase of pulse width of the pulsed drive signal.

7. An ultrasound generator according to claim 1, wherein the modulating signal is frequency coded and wherein the first relationship is selected such that the position of pulses and the number of pulses for each positive and negative half cycle of the pulsed drive signal are functions of frequency coding of the modulating signal.

8. A method of generating ultrasound comprising:

receiving, generating or calculating when instructed a modulating signal at a signal generator, the modulating signal having a magnitude that varies through a first range;

generating, at the signal generator, a pulsed drive signal having a predefined first relationship to the modulating signal, the pulsed drive signal having at least a zero output level, a positive output level and a negative output level, wherein the pulsed drive signal comprises a series of alternating positive half cycles and negative half cycles, wherein for a cycle of the pulsed drive signal comprising a positive half cycle and a negative half cycle, the position of pulses of the pulsed drive signal in each of the positive and negative half cycles are defined by at least first and second switching angles;

receiving the pulsed drive signal at a transducer; and generating, at the transducer, ultrasound in response to the pulsed drive signal;

wherein the first relationship is selected such that within at least part of the range of magnitude of the modulating signal the first and second switching angles are adjusted simultaneously to provide for an increase or decrease in the magnitude of the fundamental frequency of the pulsed drive signal corresponding to an increase or decrease in the magnitude of the modulating signal; and wherein the first relationship is selected such that a selected harmonic component of the generated pulsed drive signal is maintained below a level of at least one higher order harmonic component; and wherein the first relationship is selected such that throughout part of the range of magnitude of the modulating signal one switching angle increases while the other switching angle decreases simultaneously to provide for an increase or decrease in the magnitude of the fundamental frequency of the pulsed drive signal corresponding to an increase or decrease in the magnitude of the modulating signal.

9. A method according to claim 8, wherein the modulating signal magnitude varies over time, wherein the first relationship is selected to be a function of measured or simulated variation of the magnitudes of the fundamental component and the selected harmonic content of the transducer output with a linear increase of pulse width of the pulsed drive signal.

10. A method according to claim 8, wherein the modulating signal is frequency coded and wherein the first relationship is selected such that the position of pulses and the number of pulses for each positive and negative half cycle of the pulsed drive signal are functions of frequency coding of the modulating signal.

* * * * *